(12) United States Patent
Fraelich et al.

(10) Patent No.: US 11,110,760 B2
(45) Date of Patent: Sep. 7, 2021

(54) SYSTEMS AND METHODOLOGIES FOR CAPTURING TIRE TEMPERATURES WITH A TEMPERATURE SENSING INSTRUMENT

(71) Applicant: Fresnel Technologies, Inc., Forth Worth, TX (US)

(72) Inventors: Margaret Ree Fraelich, Fort Worth, TX (US); Nelson E. Claytor, Fort Worth, TX (US); Denise L. Merkle, Fort Worth, TX (US); Nicola Cappelletti, Powder Springs, GA (US)

(73) Assignee: Fresnel Technologies, Inc., Fort Worth, TX (US)

( * ) Notice: Subject to any disclaimer, the term of this patent is extended or adjusted under 35 U.S.C. 154(b) by 0 days.

(21) Appl. No.: 15/878,408

(22) Filed: Jan. 23, 2018

(65) Prior Publication Data
US 2018/0208004 A1 Jul. 26, 2018

Related U.S. Application Data

(60) Provisional application No. 62/449,521, filed on Jan. 23, 2017.

(51) Int. Cl.
*B60C 1/00* (2006.01)
*B60C 23/20* (2006.01)
(Continued)

(52) U.S. Cl.
CPC .............. *B60C 23/20* (2013.01); *A41D 1/002* (2013.01); *A41D 19/0027* (2013.01);
(Continued)

(58) Field of Classification Search
CPC .. B60C 23/061; A41D 1/002; A41D 19/0027; A41D 2600/20; G01K 1/026; G01K 3/14; G01K 13/00
(Continued)

(56) References Cited

U.S. PATENT DOCUMENTS

| | | | | |
|---|---|---|---|---|
| 6,232,875 B1 * | 5/2001 | DeZorzi | .............. | B60C 23/0408 116/34 R |
| 6,313,742 B1 * | 11/2001 | Larson | .................. | B60C 23/061 340/438 |

(Continued)

*Primary Examiner* — Daryl C Pope
(74) *Attorney, Agent, or Firm* — John A. Fortkort; Fortkort & Houston PC

(57) ABSTRACT

A method is provided for measuring the temperature of a tire. The method comprises (a) providing a temperature measuring instrument which is equipped with a plurality of temperature probes, wherein each of the plurality of temperature probes sense the temperature of a surface they come into contact with; (b) providing a software program installed on a mobile technology platform, wherein said mobile technology platform is equipped with a display and is in wireless communication with the temperature measuring instrument, and wherein the software program operates in conjunction with said mobile technology platform and the temperature measuring instrument to capture temperature readings sensed by the plurality of temperature probes; (c) receiving user input from a user of said mobile technology platform, the user input specifying tire parameters for a set of tires on which temperature readings are to be captured, wherein the tire parameters identify (a) a set of tires, (b) a vehicle that the set of tires are to be used in conjunction with, and (c) a track at which the vehicle will be operated when the temperature readings are captured; (d) creating a tire temperature measurement record from said user input; (e) capturing a plurality of temperature readings from said temperature measuring instrument after said plurality of temperature probes have been placed into contact with the external surface of at least one member of said set of tires; (f) adding the captured temperature readings to the tire temperature measurement record such that each captured temperature reading is associated with a tire, from the set of tires, that the captured temperature reading originated from;

(Continued)

and (g) displaying, on the display of the mobile technology platform, a summary of temperature readings captured for a vehicle.

8 Claims, 71 Drawing Sheets

(51) Int. Cl.
    *G01K 1/02*          (2021.01)
    *G01K 3/14*          (2006.01)
    *A41D 19/00*        (2006.01)
    *A41D 1/00*         (2018.01)
    *G01K 13/00*        (2021.01)

(52) U.S. Cl.
    CPC ............... *G01K 1/026* (2013.01); *G01K 3/14* (2013.01); *G01K 13/00* (2013.01); *A41D 2600/20* (2013.01)

(58) Field of Classification Search
    USPC .......... 340/438, 442, 443, 444, 447
    See application file for complete search history.

(56) References Cited

U.S. PATENT DOCUMENTS

2014/0011455 A1*   1/2014   Hsu ................... B60C 23/0479
                                                                                   455/41.3
2014/0067193 A1*   3/2014   Gokyu ................ B60C 11/246
                                                                                   701/31.9

\* cited by examiner

| | | |
|---|---|---|
| No Service | 9:23 AM | |
| Back | Tracks | Filter |

Antioch Speedway
Antioch, CA  US

Auto Clearing Motor Speedway
Saskatoon, SK  CA

Black Hills Speedway
Rapid City, SD  US

Calistoga Speedway
Calistoga, CA  US

Houston Motorsports Park
Houston, TX  US

I-90 Speedway
Hartford, SD  US

Motorsports Ranch
Cresson, TX US

Sonoma Raceway
Sonoma, CA US

Texas Motor Speedway
Fort Worth, TX  US

Texas Raceway
Kennedale, TX  US

*FIG. 47*

SYSTEMS AND METHODOLOGIES FOR CAPTURING TIRE TEMPERATURES WITH A TEMPERATURE SENSING INSTRUMENT

FIELD OF THE DISCLOSURE

The present disclosure pertains generally to temperature sensing devices, and more particularly to systems and methodologies for capturing tire temperatures from a vehicle with a temperature sensing instrument.

BACKGROUND OF THE DISCLOSURE

Success in high-speed motor sports is frequently attributed to driver skill. However, the proper set-up of a race vehicle is an important factor in these events. The failure to optimize vehicle performance to current racing conditions may create an obstacle to success that even a highly skilled driver may be unable to overcome.

In light of the foregoing, many aspects of a vehicle are subject to scrutiny and adjustment based on track conditions, both prior to and during a race. These adjustments may be based, for example, on driver perception, weather conditions, track conditions, or even the skill level of competitors. Particular attention is typically paid to the elements of the suspension system of a vehicle, since these elements directly affect the driver's control over the vehicle.

Tire temperature is one important metric utilized by pit crews to evaluate the performance of a suspension system. In particular, pit crews frequently measure the distribution of temperatures across the surface of a tire to glean information about the affect of wheel camber, wheel caster and toe settings on vehicle performance. In some cases, tire temperatures may also suggest a need to modify these parameters or to replace or repair shocks, struts, control arms, tie rods, or other components of a vehicle or its handling or suspension systems. Moreover, tire pressure, which may be derived from tire temperatures, also has a significant impact on vehicle handling and performance, and hence is another metric closely monitored by pit crews.

In light of the foregoing, several tire temperature gauges and probes have been developed in the art, some of which are currently in use in performance motor sports applications. Unfortunately, many of the devices currently known to the art are not conducive to the demands of motor sports racing.

In particular, during a typical race, tire temperatures must be read quickly and accurately, without interfering with the many operations which must be performed on a vehicle within the very limited window of opportunity afforded by a pit stop. Ideally, these measurements should be taken at multiple points across the surface of each tire (and preferably at the inside edge, middle, and outside edge of the tire), since a tire may heat up unevenly during use, and since the tire temperatures prevailing at each of these points may provide useful diagnostic information about the performance of particular vehicle components.

Unfortunately, many existing temperature gauges and probes require too much time for set-up or for taking temperature readings, or interfere with other operations which must be conducted during a pit stop. Moreover, the distance between the points on the surface of the tire at which temperatures are measured can vary from one set of measurements to the next due to variability in the placement of the temperature probe, thus increasing error in the resulting data.

Recently, a temperature sensing glove has been developed. This glove is described in U.S. Pat. No. 8,001,620 (Merkle et al.) and U.S. Pat. No. 8,276,215 (Merkle et al.), both of which are entitled "Temperature Sensing Glove For Automotive Applications" and both of which are incorporated herein by reference in their entirety. The foregoing glove comprises a thermally insulated glove equipped with one or more temperature sensors. The temperature sensors are adapted to read the surface temperature of a tire in one or more locations (and possibly at multiple points in time) when the temperature sensors are activated and the glove is placed against the surface of the tire. The glove is preferably equipped with a data storage device for storing data generated by the temperature sensors, and is also preferably equipped with a toggling means for toggling between memory locations so that the temperature data recorded on a particular tire of a vehicle can be stored in a file or location associated with that tire. The temperature data is also preferably chronologically stamped so that multiple readings can be made (by the same or different temperature sensor) on a given tire during the course of a race, and can be differentiated and stored for later retrieval and manipulation.

SUMMARY OF THE INVENTION

In one aspect, a method is provided for measuring the temperature of a tire. The method comprises (a) providing a temperature measuring instrument which is equipped with a plurality of temperature probes, wherein each of said plurality of temperature probes sense the temperature of a surface they come into contact with; (b) providing a software program installed on a mobile technology platform, wherein said mobile technology platform is equipped with a display and is in wireless communication with said temperature measuring instrument, and wherein said software program operates in conjunction with said mobile technology platform and said temperature measuring instrument to capture temperature readings sensed by said plurality of temperature probes; (c) receiving user input from a user of said mobile technology platform, said user input specifying tire parameters for a set of tires on which temperature readings are to be captured, wherein said tire parameters identify (a) a set of tires, (b) a vehicle that the set of tires are to be used in conjunction with, and (c) a track at which the vehicle will be operated when the temperature readings are captured; (d) creating a tire temperature measurement record from said user input; (e) capturing a plurality of temperature readings from said temperature measuring instrument after said plurality of temperature probes have been placed into contact with the external surface of at least one member of said set of tires; (f) adding the captured temperature readings to the tire temperature measurement record such that each captured temperature reading is associated with a tire, from the set of tires, that the captured temperature reading originated from; and (g) displaying, on the display of the mobile technology platform, a summary of temperature readings captured for a vehicle.

In another aspect, in combination with a temperature measuring instrument that communicates wirelessly with a mobile technology platform, a software program is provided which is installed on said a tangible memory device associated with said mobile technology platform which operates in conjunction with said temperature measuring instrument to capture temperature readings sensed by said plurality of temperature probes, said software containing suitable programming instructions which, when executed by at least one computer processor, perform the steps of (a) receiving input from a user of said mobile technology platform, said input specifying data for a tire temperature measurement record in which captured temperature readings will be stored, said data including
  (i) vehicle identification data which uniquely identifies a vehicle,
  (ii) a set of tires associated with said vehicle and from which temperature readings will be captured,
  (iii) tire identification data for each member of said set of tires which uniquely identifies that member,
  (iv) a track on which the vehicle will be driven and at which the temperature readings will be captured, and
  (v) a driver identification of a driver who will operate the vehicle on said track,
(b) creating a tire temperature measurement record from said user input,
(c) capturing temperature readings from said plurality of temperature probes after said plurality of temperature probes are placed into contact with the external surface of at least one member of said set of tires,
(d) adding each captured temperature reading to the tire temperature measurement record such that each captured temperature reading is associated with the member from the set of tires from which the reading was captured, and
(e) in response to user input on said mobile technology platform, displaying an image of a vehicle with a summary of temperature readings captured for that vehicle.

BRIEF DESCRIPTION OF THE DRAWINGS

FIGS. 3-37 are screen captures of the software program of FIG. 1.

FIGS. 44-50 are enlarged versions of the screen captures depicted in FIG. 43.

DETAILED DESCRIPTION

While the temperature sensing glove described in U.S. Pat. No. 8,001,620 (Merkle et al.) and U.S. Pat. No. 8,276,215 (Merkle et al.) is a notable improvement in the art, further improvements in this technology are required. In particular, capture of tire temperature data by the glove itself, while very important, is only of limited use to a racing team, since the person wearing the glove (typically a member of the pit crew charged with changing tires) is not always in a position to act on the information and, in any event, is not the only team member that could benefit from ready access to the tire temperature readings. Moreover, the actual tire temperature readings at any point in time may be less important for some purposes than the trends reflected in those temperatures, or the context in which the temperature data was captured.

It has now been found that the foregoing issues may be addressed with the systems, methodologies and software disclosed herein. These systems leverage a mobile technology platform (such as, for example, a mobile phone or laptop) which is in wireless communication with a temperature sensing instrument (such as, for example, the temperature sensing glove of Merkle et al.), and upon which is installed a software program for capturing tire temperatures registered by the temperature sensing instrument, as well as data related to the captured tire temperatures. The software permits captured tire temperature data to be accurately stored, displayed and correlated with various vehicle parameters and environmental factors to provide a more holistic understanding of vehicle performance. Moreover, use of the software permits the rapid dissemination, to all parties of interest, of the tire temperature data, the factors and parameters correlated with it, and various analytical results which may be gleaned from it.

Figure 1:
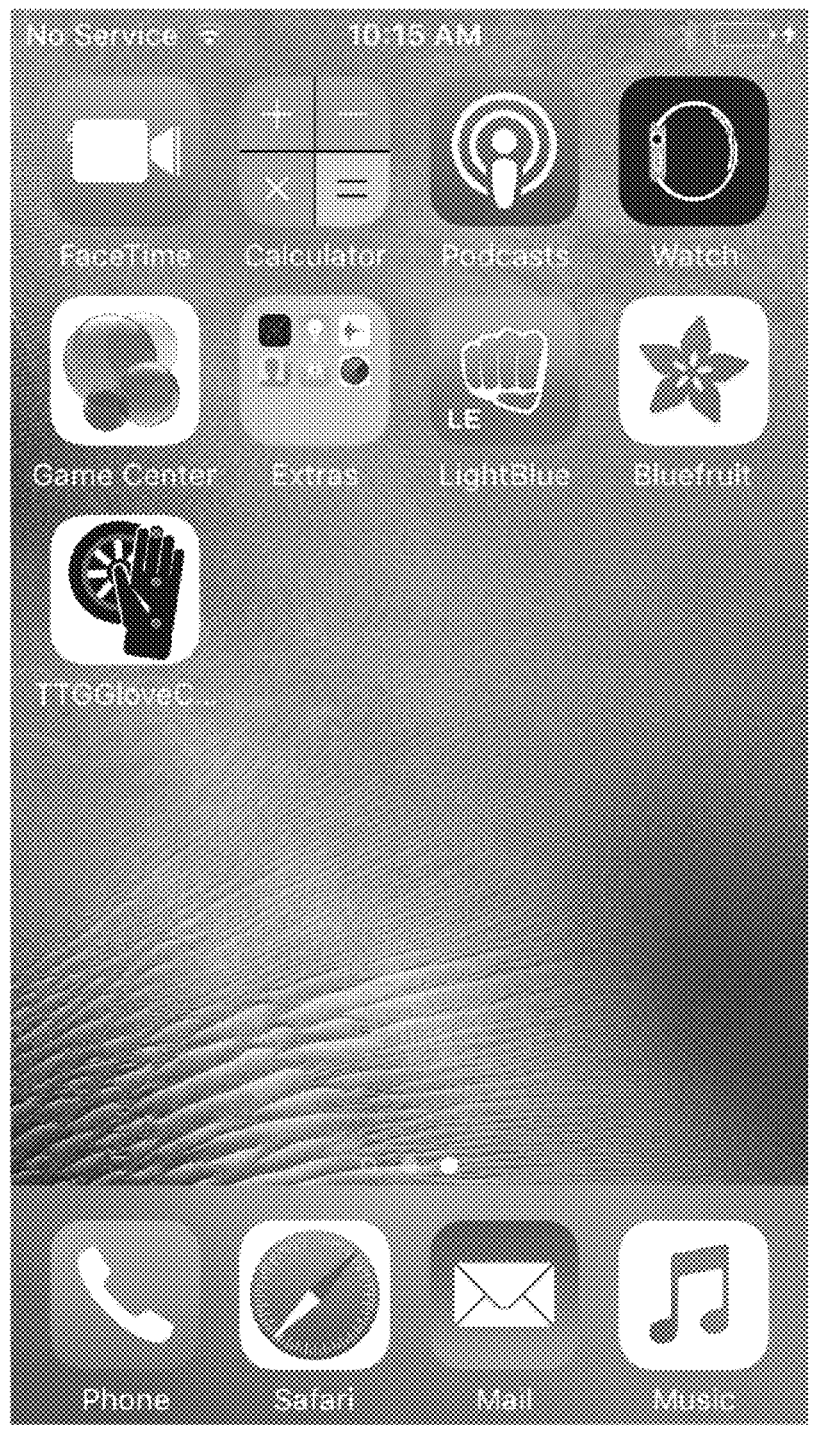
FIG. 1 is a screen capture of a mobile technology platform with a first embodiment of a software program in accordance with the teachings herein installed thereon.
Figure 66:
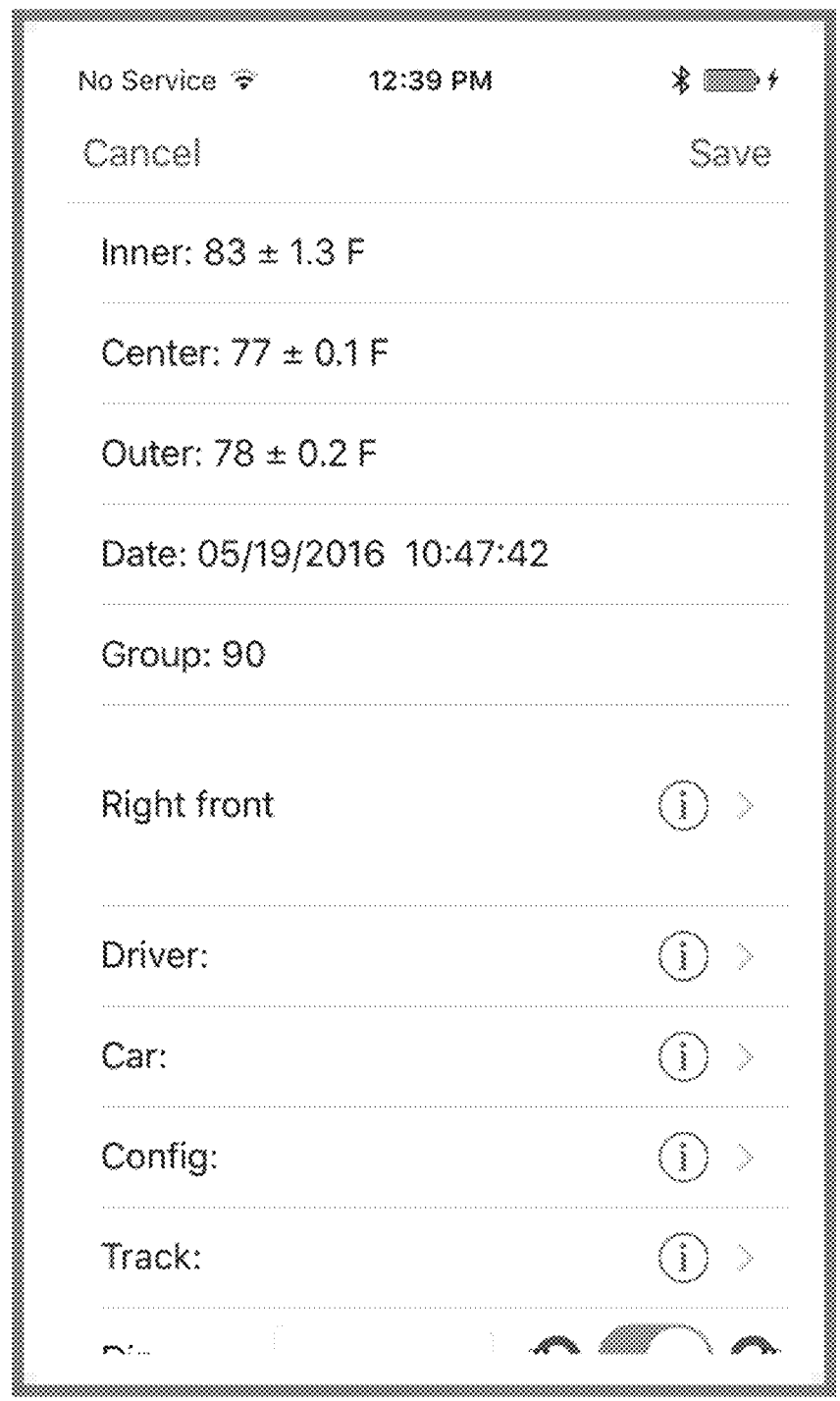

The systems, methodologies and software disclosed herein may be further understood with reference to the particular, non-limiting embodiment disclosed in FIGS. 1-66 herein. FIG. 1 thereof is a screen capture 101 of a mobile technology platform having a particular, non-limiting embodiment of a software application installed thereon which may be utilized to implement some of the systems and methodologies disclosed herein. The software application in the depicted embodiment may be launched by appropriately selecting the desktop icon 3 entitled "TTGGloveConnect".

The software application may take various forms. Thus, for example, the software application may be a standalone application. The software application may also be a distributed application with a client component installed on a plurality of client devices, and a server component installed on one or more servers that communicate with the plurality of client devices. Preferably, the software application is made available for download to a mobile technology platform from one or more websites such as, for example, Apple's App Store or any of its Android counterparts. The software may also be packaged with the temperature sensing instrument.

The software application connects with a temperature sensing instrument via suitable wireless technology (such as, for example, Bluetooth® Low Energy wireless technology) to collect real-time data from the instrument, and to allow a user to configure the instrument's settings and operation. The software also manages a database of temperature measurements, vehicles, drivers, tracks, and tires. This makes it possible, for example, for a racing team to store multiple tracks, vehicles, drivers and tires, and to link them to particular measurements. The result is a richer data record for the temperature measurements acquired by the instrument, and a better contextual understanding of the resulting data.

In use, the software operates in conjunction with the temperature glove or other temperature sensing instrument to generate temperature measurement records based on captured temperature measurements. Preferably, these records include a set of tire temperatures measured on the center of the tire, on or near the outer wall of the tire, and on or near the inner wall of the tire. These measurements may be made through direct contact between the temperature sensing instrument and the tire as described, for example, in U.S. Pat. No. 8,276,215 (Merkle et al.) and U.S. Pat. No. 8,001,620 (Merkle et al.), both of which are incorporated herein by reference in their entirety. Alternatively, the temperature sensing instrument may be in wired or wireless communication with one of more temperature probes used to capture the tire temperatures (in one particular, non-limiting embodiment, such probes may be on the end of sticks to allow contact with the tire from a safe distance).

Figure 2:
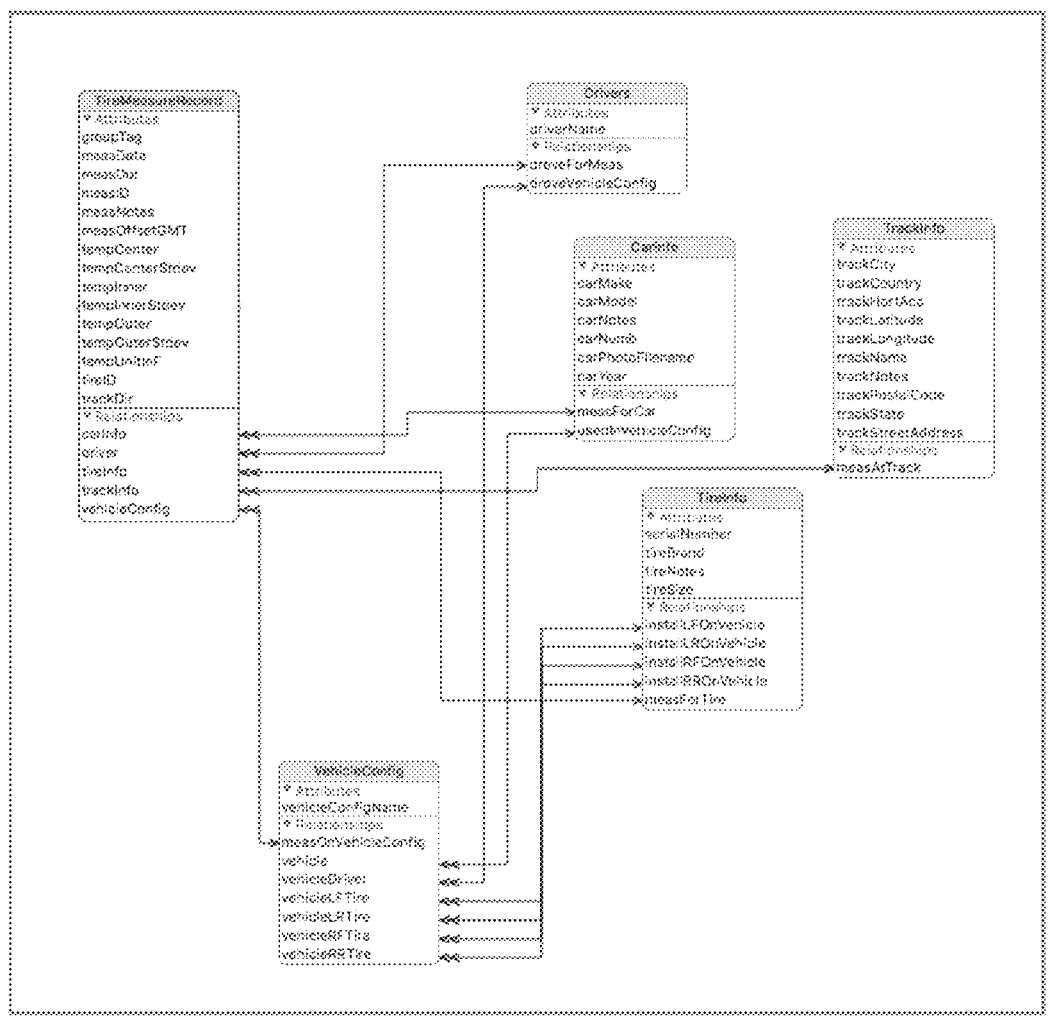
FIG. 2 is a graphical illustration of a preferred embodiment of a database model which may be employed with the software of FIG. 1, and which depicts the various software objects and relationships between them.

The software develops a variety of records related to the measurements made through use of the temperature sensing instrument. In the particular embodiment depicted (see, e.g., FIG. 2), these records 10 include tire measurement records 11, driver records 13, car records 15, track information records 17, tire information records 19 and vehicle configuration records 21. Each record has a first set of variables which describe attributes of the record, and a second set of variables which define relationships between that record and other records in the database created by the software. The interrelationship between these various records is illustrated in FIG. 2 for a preferred embodiment of the software, and the details of these records are described in greater detail below. Of course, it will be appreciated that various embodiments of the software, systems and methodologies disclosed herein may utilize various numbers and types of records having various attributes and various relationships to other records.

Still referring to FIG. 2, the Tire Measure Record 11 is the main database structure. It includes as attributes the variables designated as tempInner, tempCenter and tempOuter. These variables correspond, respectively, to the measured temperature values captured near the inner wall, at the center, and near the outer wall of the tire. Other variables in the Tire Measure Record 11 specify the standard deviations, tire position, measurement group, date and time of data acquisition, offset of local time zone from GMT, tire record, driver record, car record, track record, track direction, vehicle configuration record, and user notes. The inner, center and outer tire temperatures and standard deviations, as well as the tire position, measurement group, date and time, may be unique to each measurement.

The Tire Measure Record 11 also contains database records designated as carInfo, driver, tireInfo, trackInfo and vehicleConfig which identify the vehicle, the driver, the tire, the track, and the vehicle configuration. These records are broken out in FIG. 2 to reveal their component variables and the relationships between them.

In the particular embodiment depicted in FIG. 2, the Tire Information Record 11 is a database record which includes as attributes a serial number, brand and size of the tire it corresponds to, as well as any notes pertaining to the tire (for example, its condition at time of use). The Tire Information Record 11 has five parameters with relationships to other records. The first four of these parameters (installLFOnVehicle, installLROnVehicle, installRFOnVehicle and installRROnVehicle) correspond, respectively, to the installation dates/times for the left front tire, left rear tire, right front tire, and right rear tire. Each of these four parameters has a relationship as indicated to the vehicle configuration record 21. The fifth parameter (measForTire) has a relationship to the tire measure record 19 as indicated.

The Car Information Record 15 in the embodiment of FIG. 2 is a database record which includes as attributes the make, model, year, car number, vehicle photograph or image, and user notes. The Car Information Record 15 further includes as relational parameters the measurements made on the vehicle (measForCar, which are linked to the Tire Measure Record 19) and the configuration used for the vehicle (usedInVehicleConfig, which is linked to the Vehicle Configuration Record 21).

The Driver Record 13 in the embodiment of FIG. 2 is a database record which, in the particular embodiment depicted, includes the driver's name as an attribute. The Driver Record further includes as relational variables the tire temperature measurements (droveForMeas) taken while the driver specified by the variable driverName was operating the vehicle, and the vehicle configuration (droveVehicleConfig) being utilized at that time. These relational variables are linked to the Tire Measure Record and the Vehicle Configuration Record, respectively.

The Vehicle Configuration Record 21 in the embodiment of FIG. 2 is a database record which, in the particular embodiment depicted, includes as an attribute the particular configuration of a vehicle at a given event. This record contains as relational parameters the vehicle, driver, install tires and locations, and configuration name. This information is then linked to various tire measurement records. The Vehicle Configuration Record 21 allows the race team to preconfigure multiple vehicles for a single event. Team members may then easily and rapidly switch between configurations as different vehicles arrive in the pit.

The Track Information Record 17 in the embodiment of FIG. 2 is a database record which, in the particular embodiment depicted, includes as attributes the race track name, address, GPS coordinates, and user notes, and is linked to various tire measurement records within the Tire Measure Record 11. The Track Information Record 17 includes as a relational variable measAtTrack, which is the set of measurements captured at the track identified by the attributes of the record, and which is linked to the Tire Measure Record 11. The data for the Track Information Record 17 may be created by coding the GPS coordinates acquired at the track, or may be manually entered by the user. Preferably, they allow the user to search the database for tracks that are in proximity to the user's location. It is also preferred that the track is selected prior to the event and remains static until changed by the user.

The track direction parameter (trackDir) in the tire measure record 11 of FIG. 2 is preferably a record of both length and direction of the track, to accommodate tracks with multiple configurations. It is preferably linked to various tire measurement records. The track direction may be configured prior to the event, and preferably remains static until changed by the user.

Figure 5:
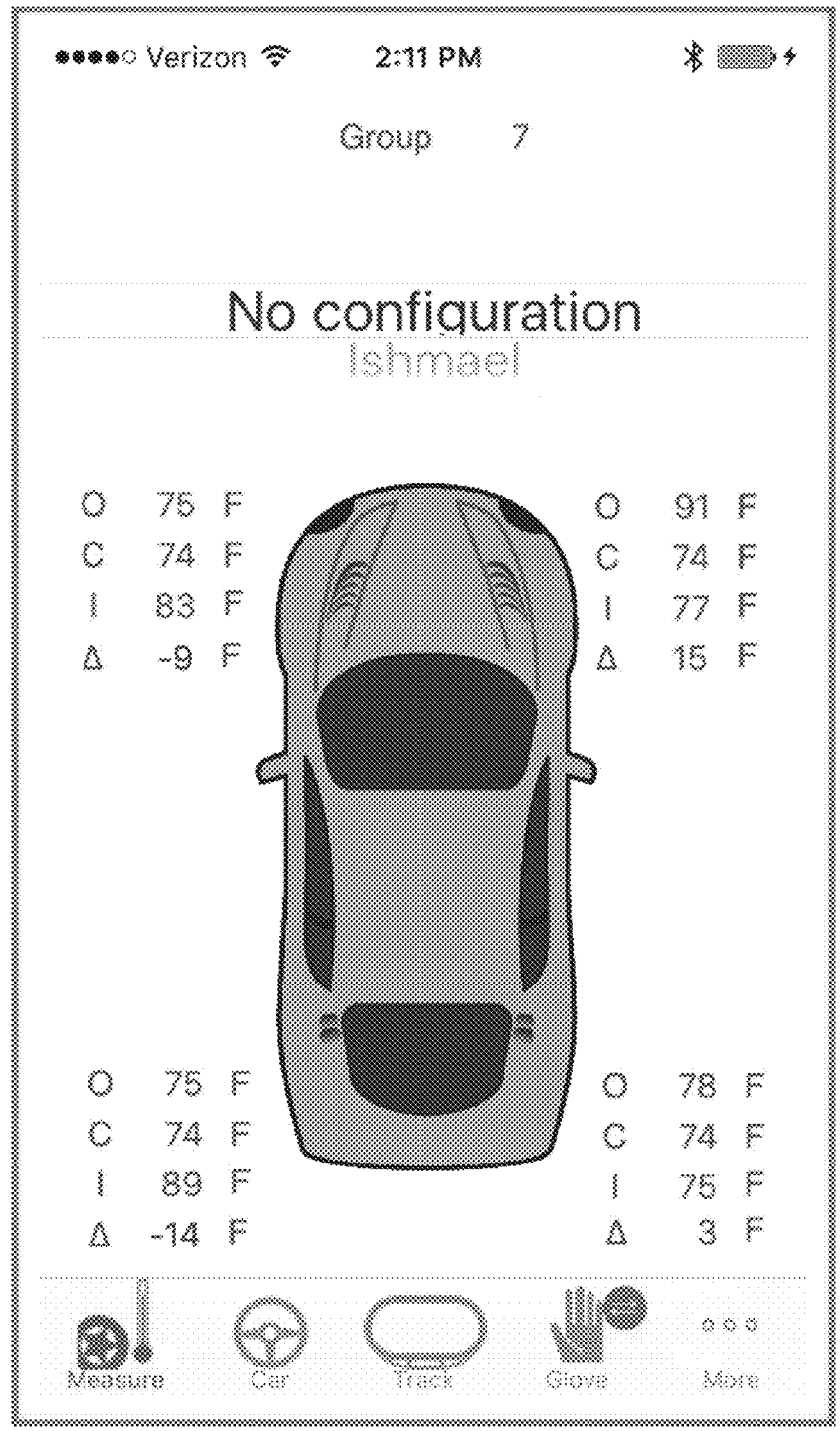

The software in the particular embodiment depicted is configured to provide a graphical representation of tire temperature data so that the data may be readily assimilated by the user. Thus, for example, as seen in FIG. 5, selection of the measure tab 31 displays a window containing the real-time tire temperature measurements and the temperature difference between the outer and inner sensors next to the tire position on a graphical depiction of the vehicle (this graphical depiction of the vehicle may be an actual picture of the vehicle, or merely an artistic representation of it). Selection of the measure tab 31 also displays the measurement group number. The picker wheel 33 disposed above the graphical depiction of the vehicle on the measure tab allows the rapid selection of various vehicle configurations.

Figure 6:
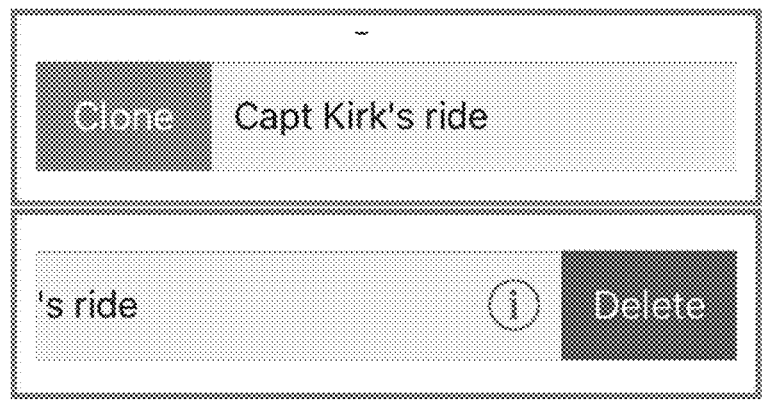

The measure tab 31 can be utilized to display a list of available vehicle configurations. Swiping across the cell to the right reveals a Clone button 35 (see FIG. 6), which may be selected to duplicate the chosen configuration. Swiping to the left reveals a delete button which removes the selected configuration from the database.

Figure 3:
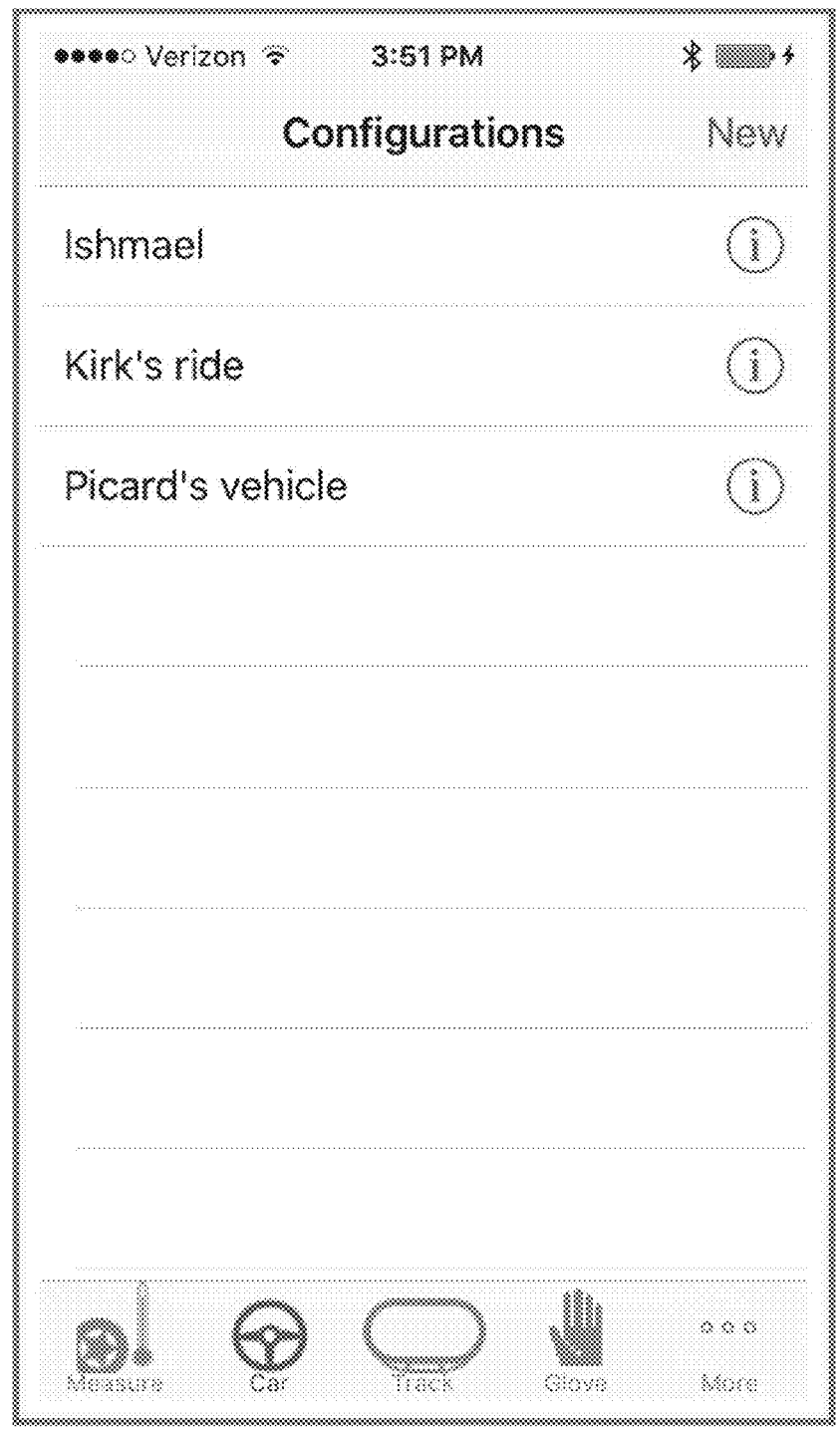
Figure 4:
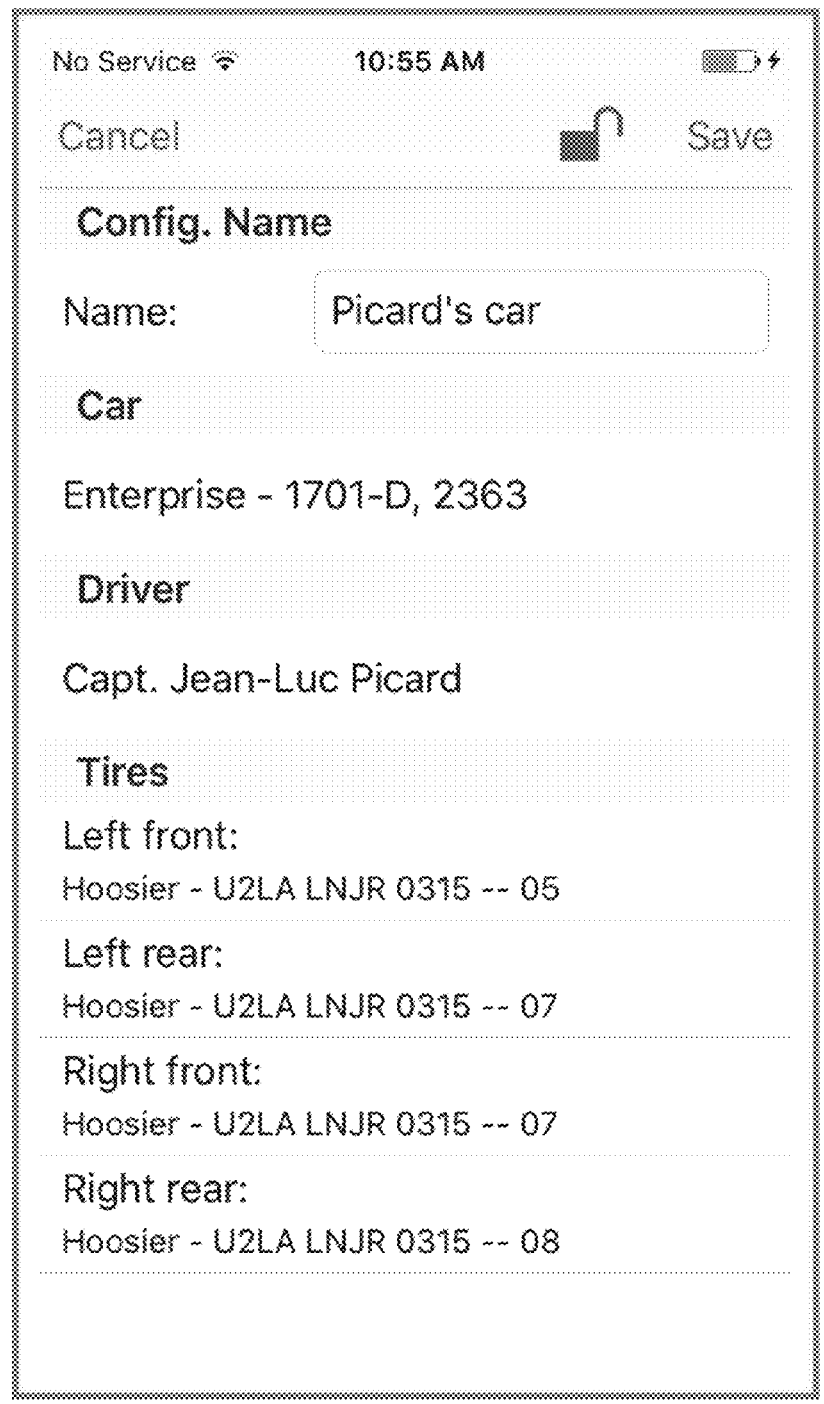
Figure 7:
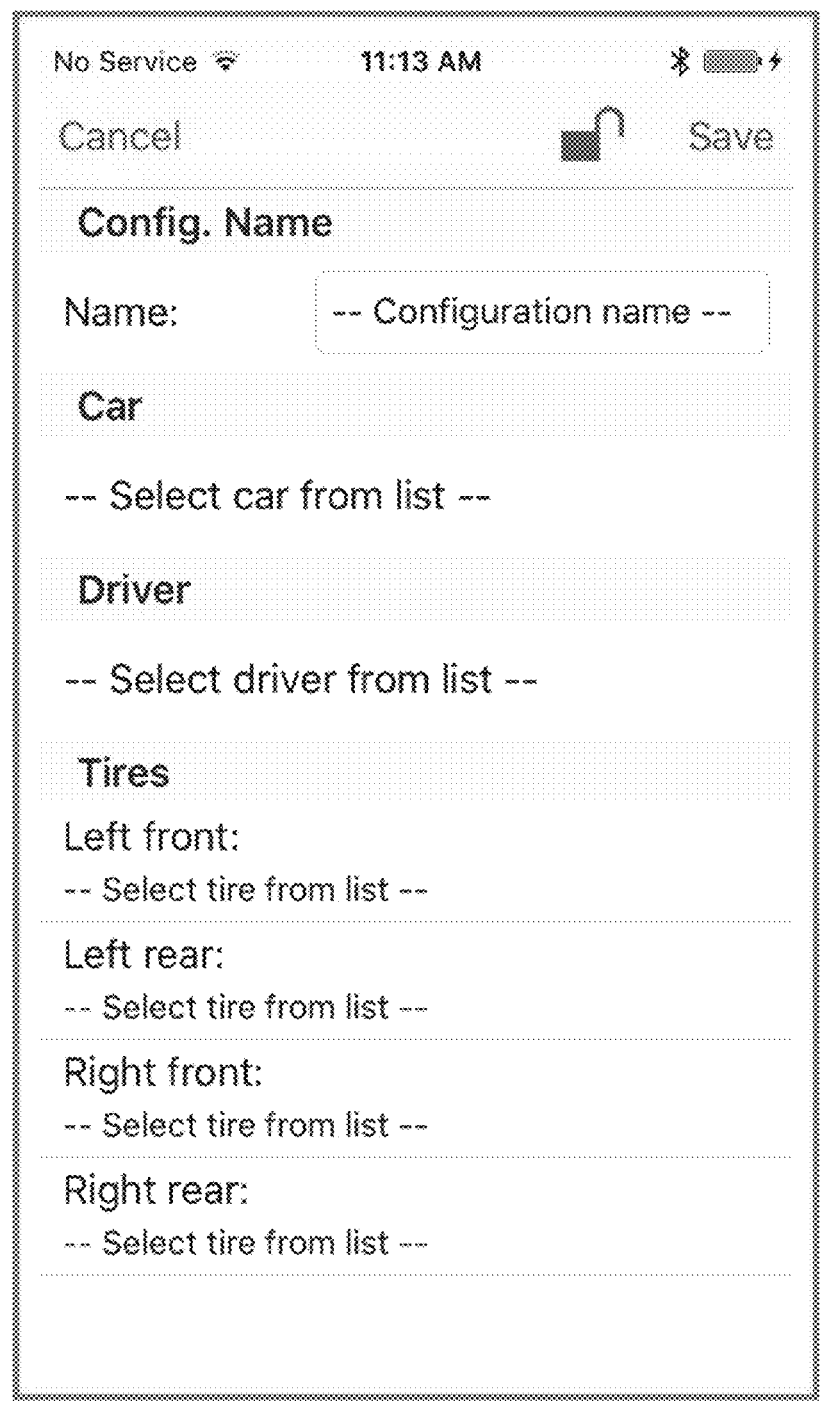

Selection of the detail disclosure button 39 on the right side of the cell opens a detail view of the configuration (see FIG. 7). The desired configuration is chosen by selecting the cell. The "New" button 37, in the upper right corner of the Configurations screen (see FIG. 3), opens an editable detail view of the configuration (see FIG. 4).

The car tab configuration detail screen (see FIG. 4) displays and/or allows the editing of various elements of a vehicle configuration record. The name field contains the configuration name displayed in the picker wheel 33 on the measurement tab of the measure icon 33 in the measure tab 31.

The other cells display car, driver and installed tire records. Swiping to the right reveals a Change button. Tapping this button opens a screen, listing of all the entries in the database for a particular record type. If this screen was opened by clicking the Clone 35 or New 37 buttons, it appears in an editable form. If opened from the detail disclosure button, it is locked. Clicking the lock icon 39 on the navigation bar at the top of the screen will unlock the record for editing.

Clicking Save button 41 stores changes to this record in the database. The Cancel button 43 may be utilized to remove the new or cloned records.

The tires record list (see FIG. 8) and the cars record list (see FIG. 9) show lists of existing records in the database. The details of these records can be viewed and/or edited by selecting the detail disclosure button on the right. The desired item is selected by tapping before exiting the screen by tapping the Back button.

Figure 8:
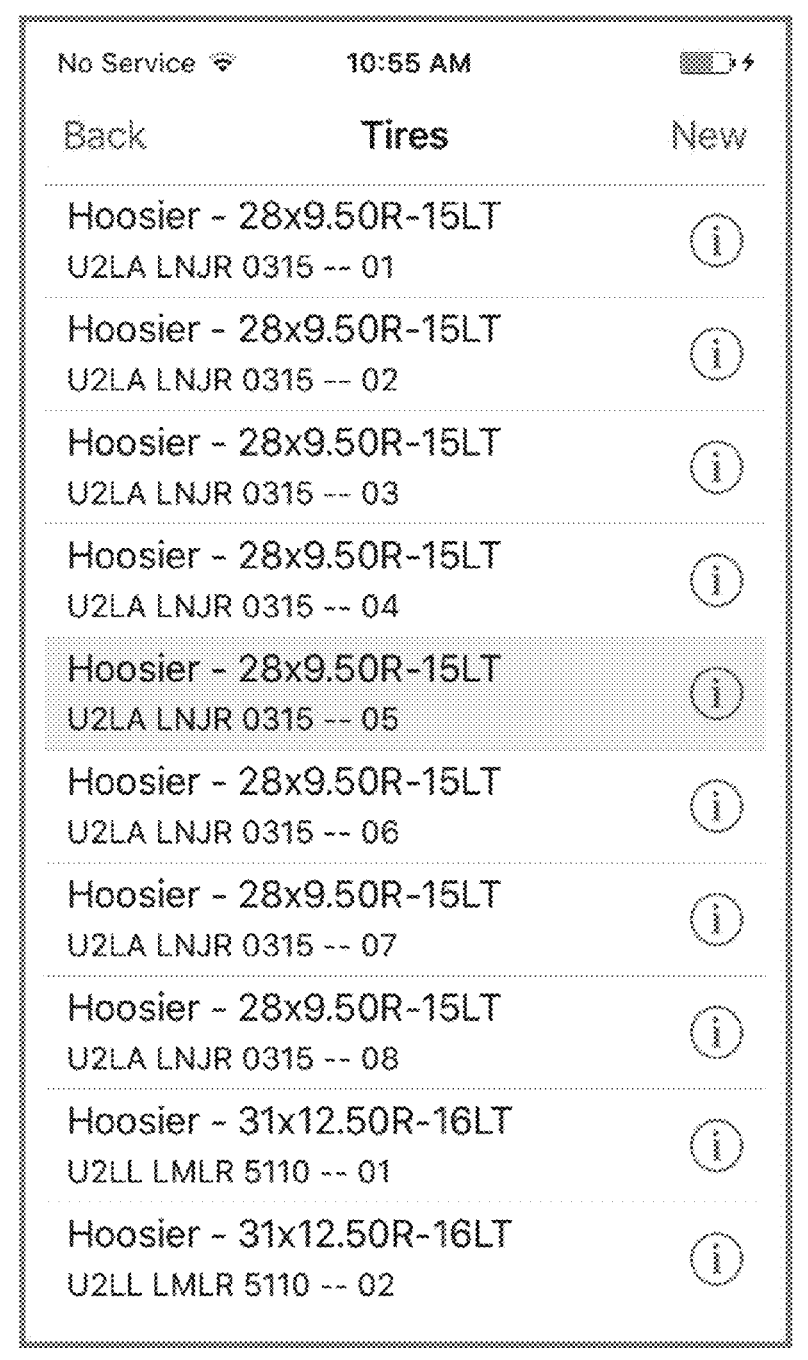
Figure 9:
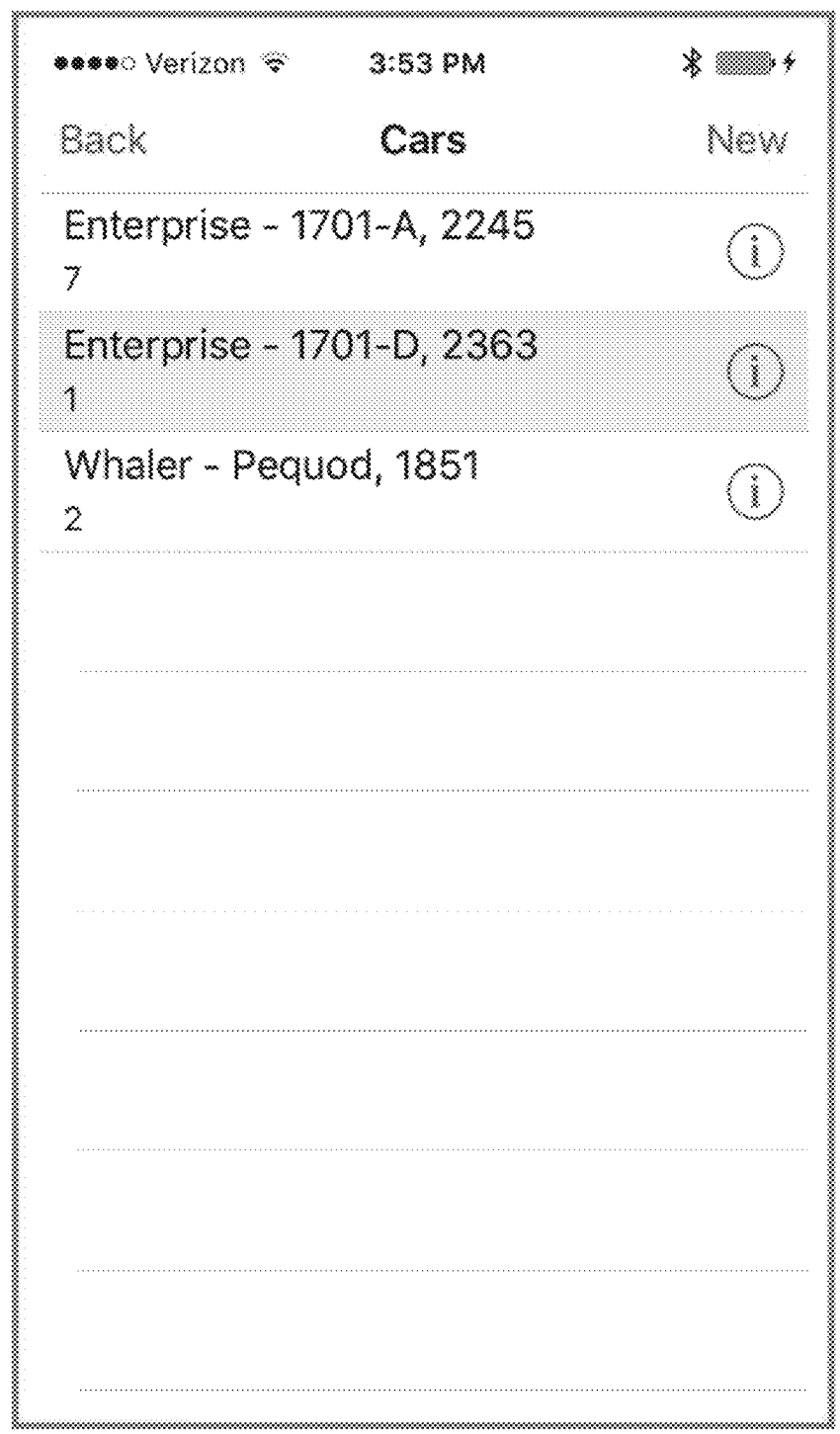

The New button 51, in the upper right corner of FIGS. 8-9, creates a blank record, which may then be completed by the user. Swiping to the right reveals a Clone button 35 (see FIG. 6), which duplicates the selected record. The clone feature is useful for creating items (such as tires) where several records may differ by only one attribute. Swiping to the left reveals a Delete button. The Back button 53, in the upper left corner of FIGS. 8-9, returns to the configuration screen. If changes have been made, the user is asked to confirm to commit the changes to the database.

Figure 11:

The car, tire or driver record detail viewer/editor of the car tab displays a list of the attributes of car, tire, or driver records, respectively. FIG. 11 depicts the record editor for the car record. The number and type of fields varies depending on the record type. Selection of the lock icon 55 at top of the screen unlocks the record for editing. The save button 57, at the top right of the window, stores the record to the database and returns to the record list. The Cancel button 59, at the top left of the window, discards any changes and returns to the record list. Selection of the detail disclosure button in the photo field of the car record editor permits the user to take a picture of the car with the onboard camera of the host device.

Figure 10:
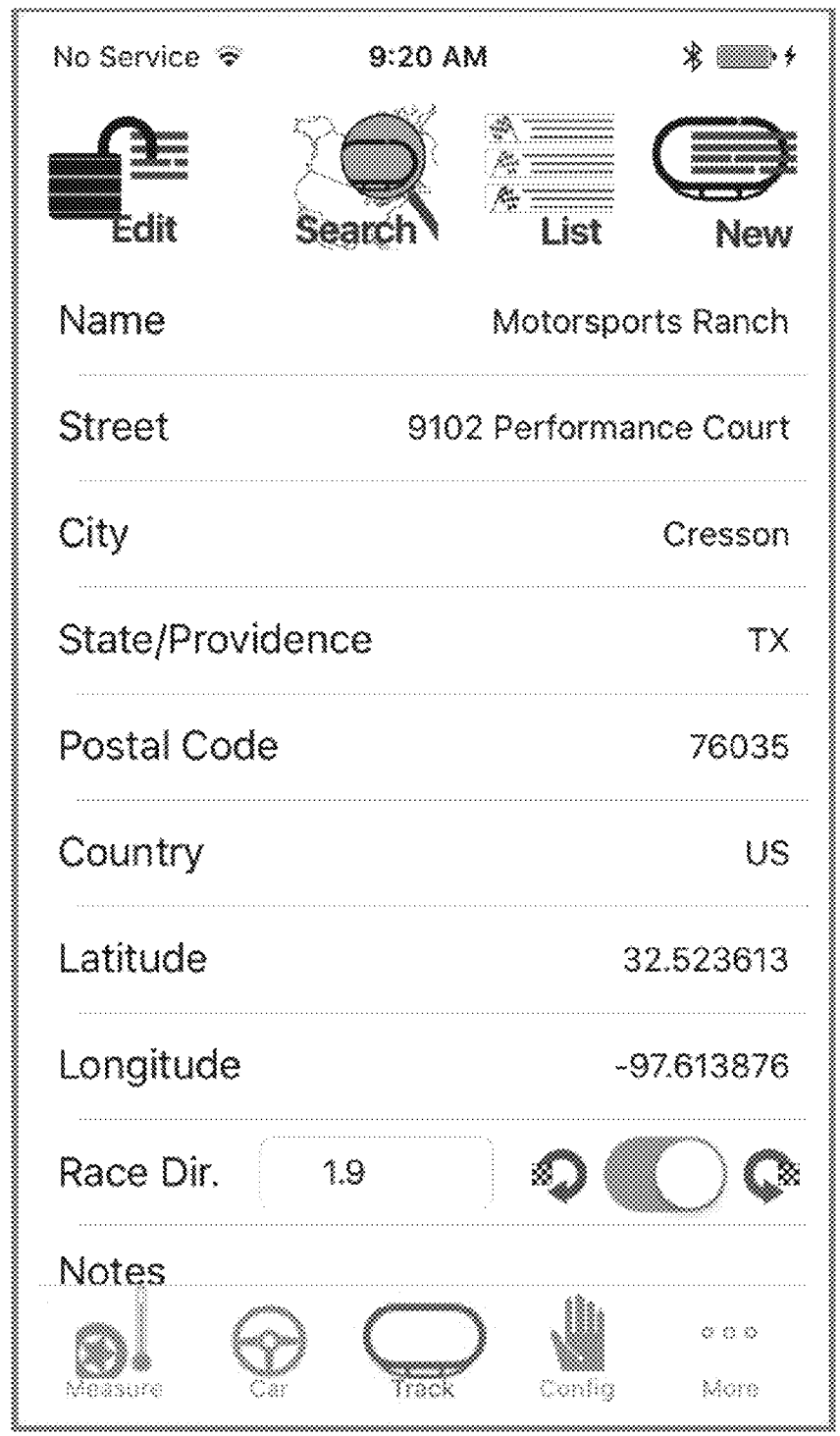

The track tab 61 (see FIG. 10) displays the currently selected track record. Only the track direction and length can be directly modified in this window. The Edit button 63, in the upper left corner of the window, opens the track record editor (see FIG. 12), enabling editing of the displayed track record. The adjacent Search button 65 searches for tracks near the user's current location. The List button 67 opens a listing of tracks stored in the database. The New button 69 creates a new track record and opens it in the editor.

The editor is accessed by selecting the Edit button 63 on the main screen of the track tab. The editor allows the user to change the stored information for the track and to add notes. The Replace Address With Current Location button at the bottom of the window uses GPS coordinates obtained from the location awareness functionality of the host device to determine the current location and address, and replaces the address and coordinates with this GPS data. The foregoing service may utilize a mapping service (such as, for example, Apple Maps), and may require wireless access or cell data to function properly.

The track tab 61 may be utilized to search for tracks in proximity to the user's location (or more precisely, the location of the host device). Selecting the Search button 65 opens the track search window (see FIG. 14). From this window, the user may find tracks in the database which are within a specified radius of the user's currently location. This radius is entered into the "Tracks within" field 71. To preserve the battery life of the host device, the GPS location is preferably not requested upon opening the screen. Instead, a stored location is preferably used, which may therefore be inaccurate. Selection of the Current button 73 updates this stored location.

Figure 14:
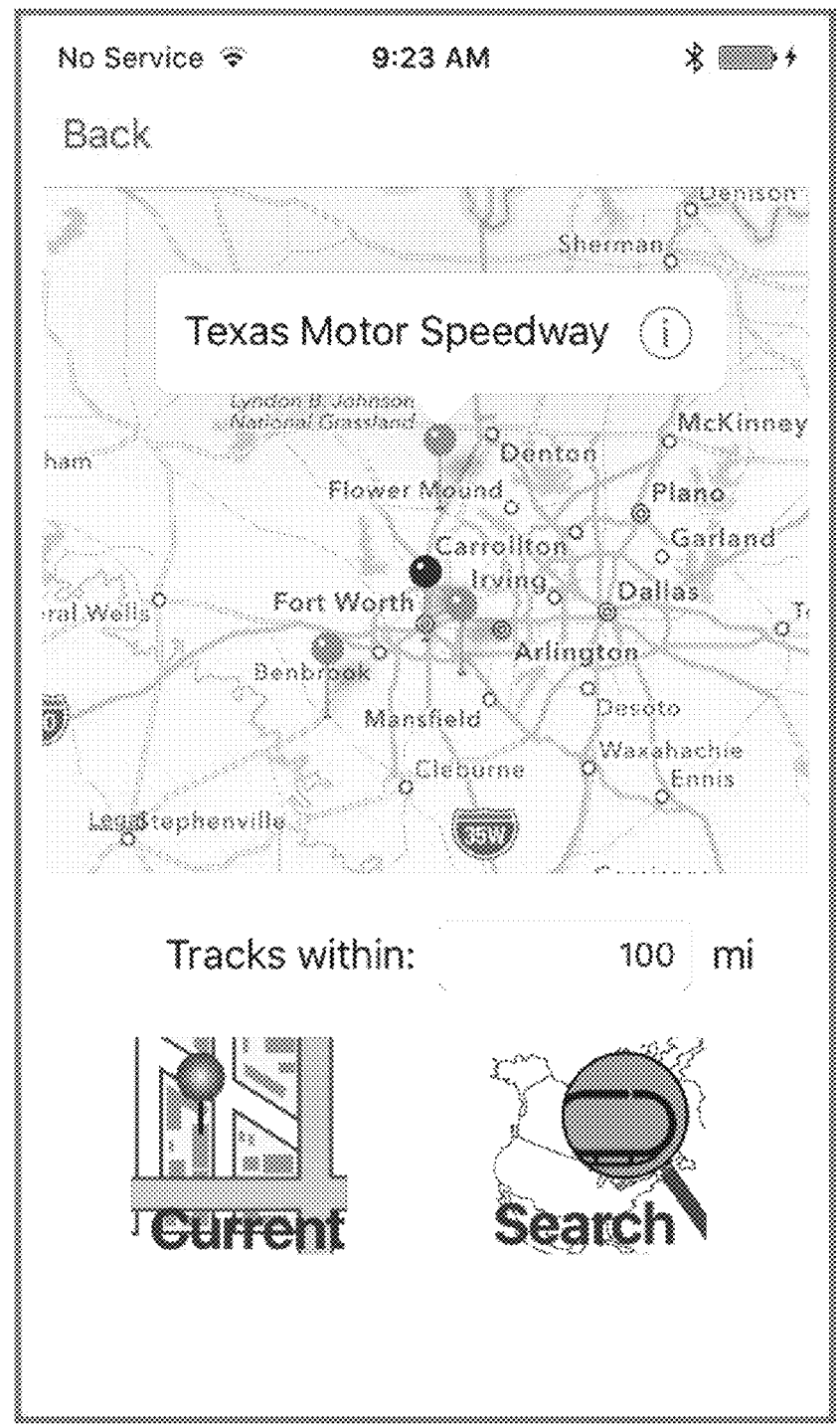

The Search button 75 in the window of FIG. 14 initiates the retrieval of track records. In a preferred embodiment, this process only utilizes records already entered in the database, although embodiments are also possible in which the software queries one or more suitable services or resources (such as, for example, a mapping service) for this information.

As seen in FIG. 14, the user's current location is displayed on the map 77 as a dark red pin 79, and the nearby tracks are displayed as green pins 81. Selection of a green pin 81 displays the track name in a pop-up window. Selecting the pop-up window selects the corresponding track, and returns the software to the opening screen.

Figure 13:
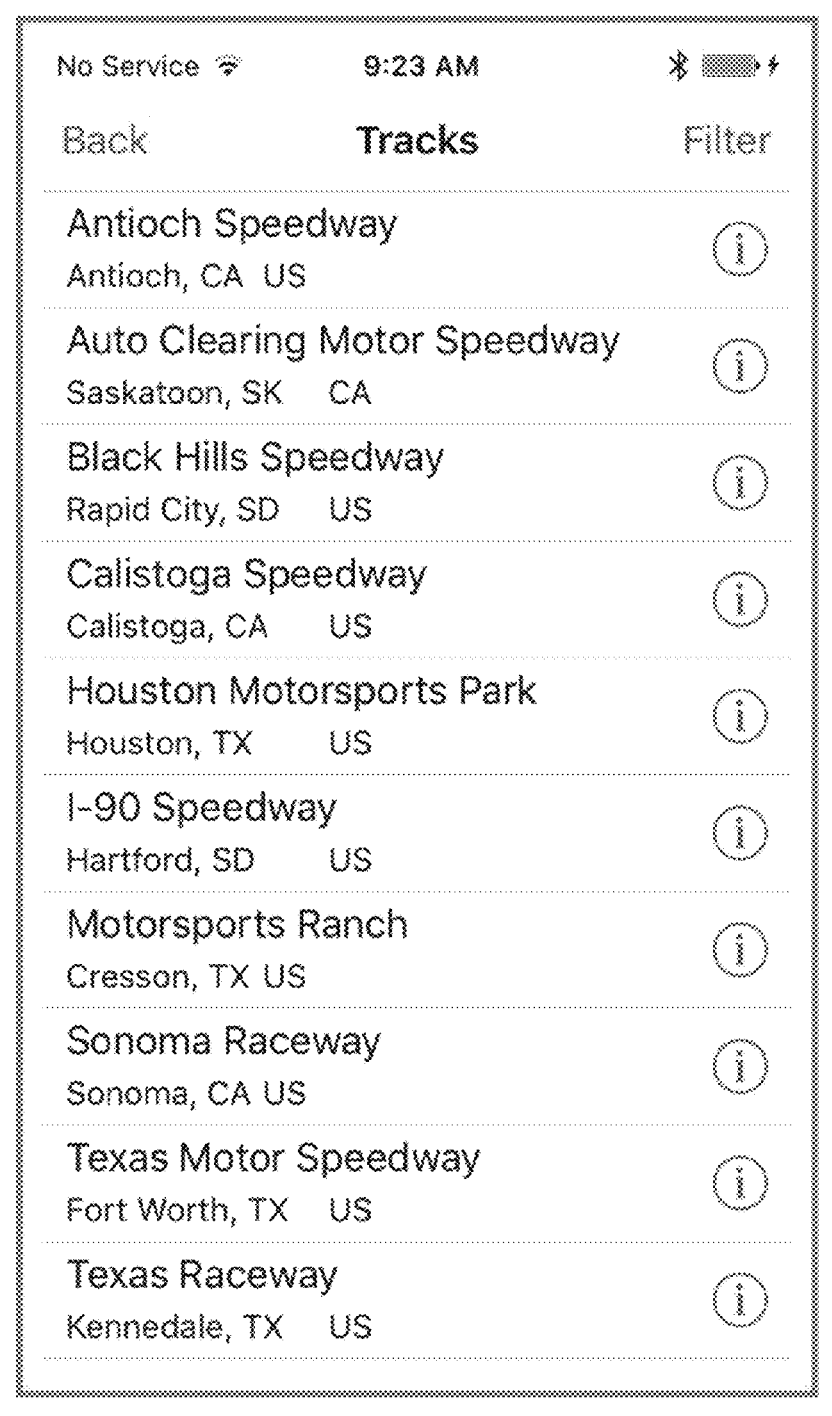

The track tab list (see FIG. 13) displays the lists of tracks in the database. Swiping the cell to the right reveals a Clone button (not shown), and swiping to the left reveals a Delete button (not shown). Both of these functionalities are described above.

Figure 15:
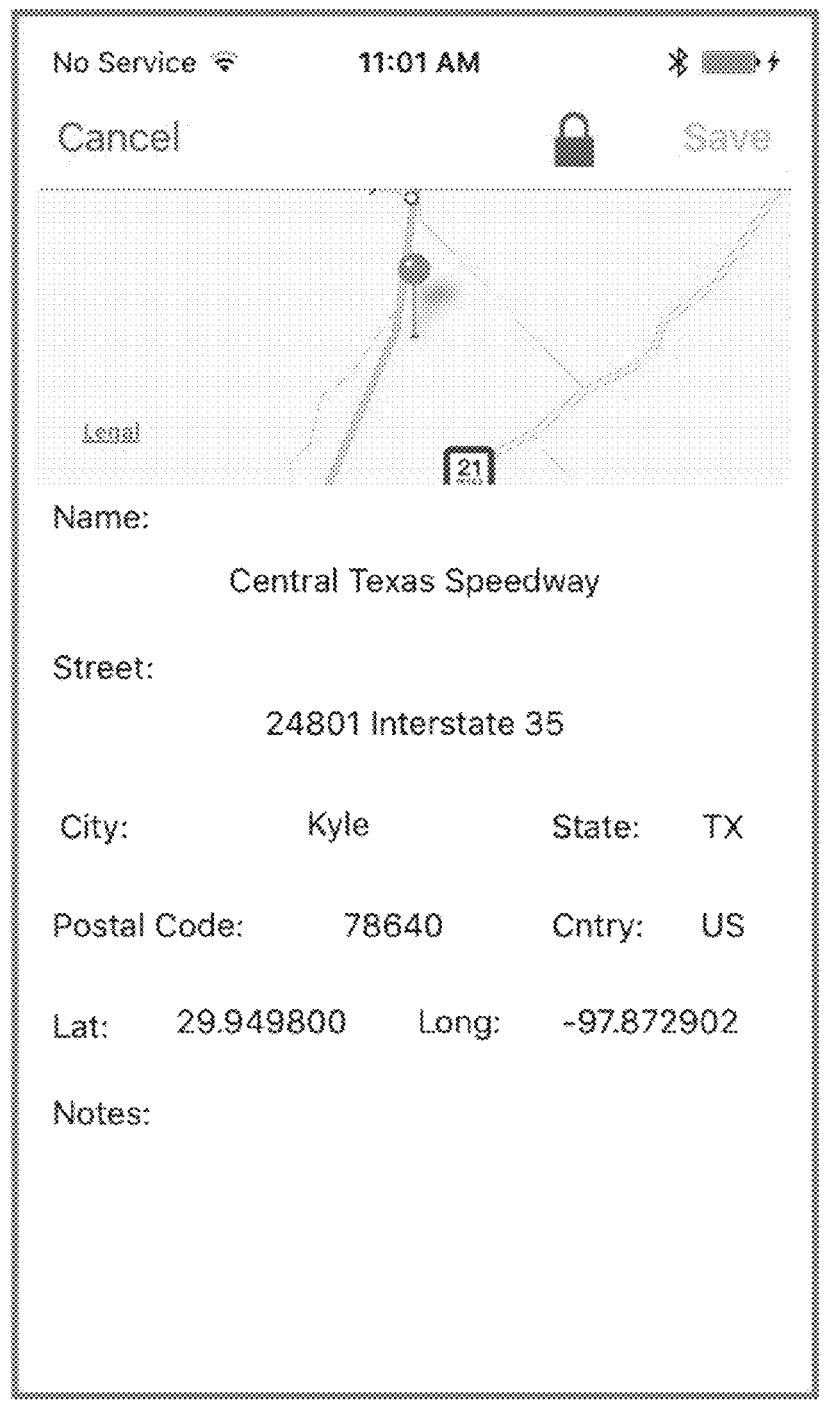
Figure 16:
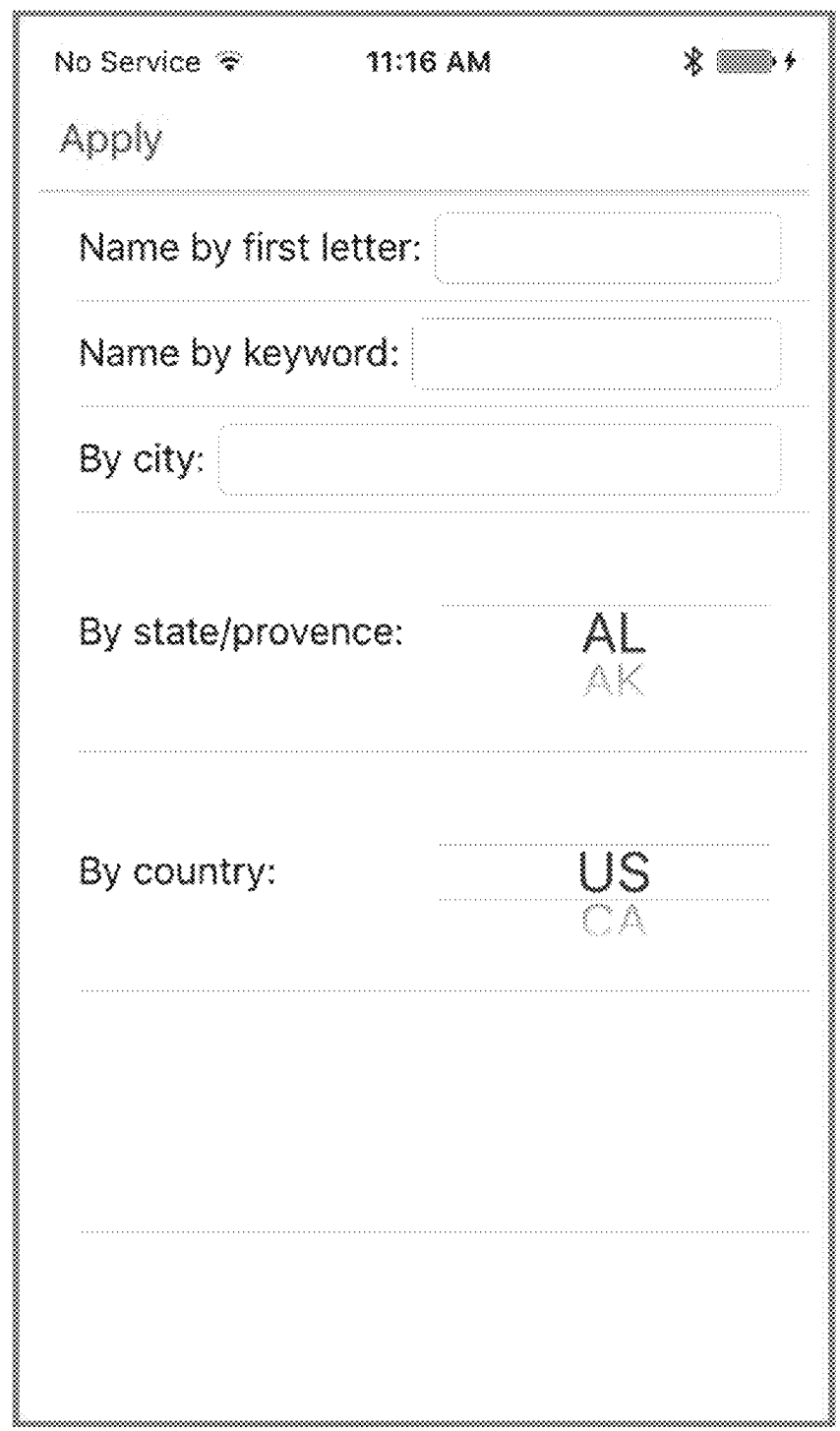

Selecting the detailed disclosure button 39 (see FIG. 3) opens the corresponding item in the track record editor (see FIG. 15). When the track record editor is opened, a lock icon 55 is displayed in the upper right, next to the Save button 57. Selecting the lock icon 55 unlocks the record for editing. The Filter button 83, at the upper right of the track tab list (see FIG. 13), opens another window (see FIG. 16) from which the user applies a selection of filters to the list, making it easier to locate the desired entry. Records may be filtered alphabetically, by keyword, geographically, or using other parameters of interest. Selecting the Apply button returns the now filtered track list.

Figure 12:
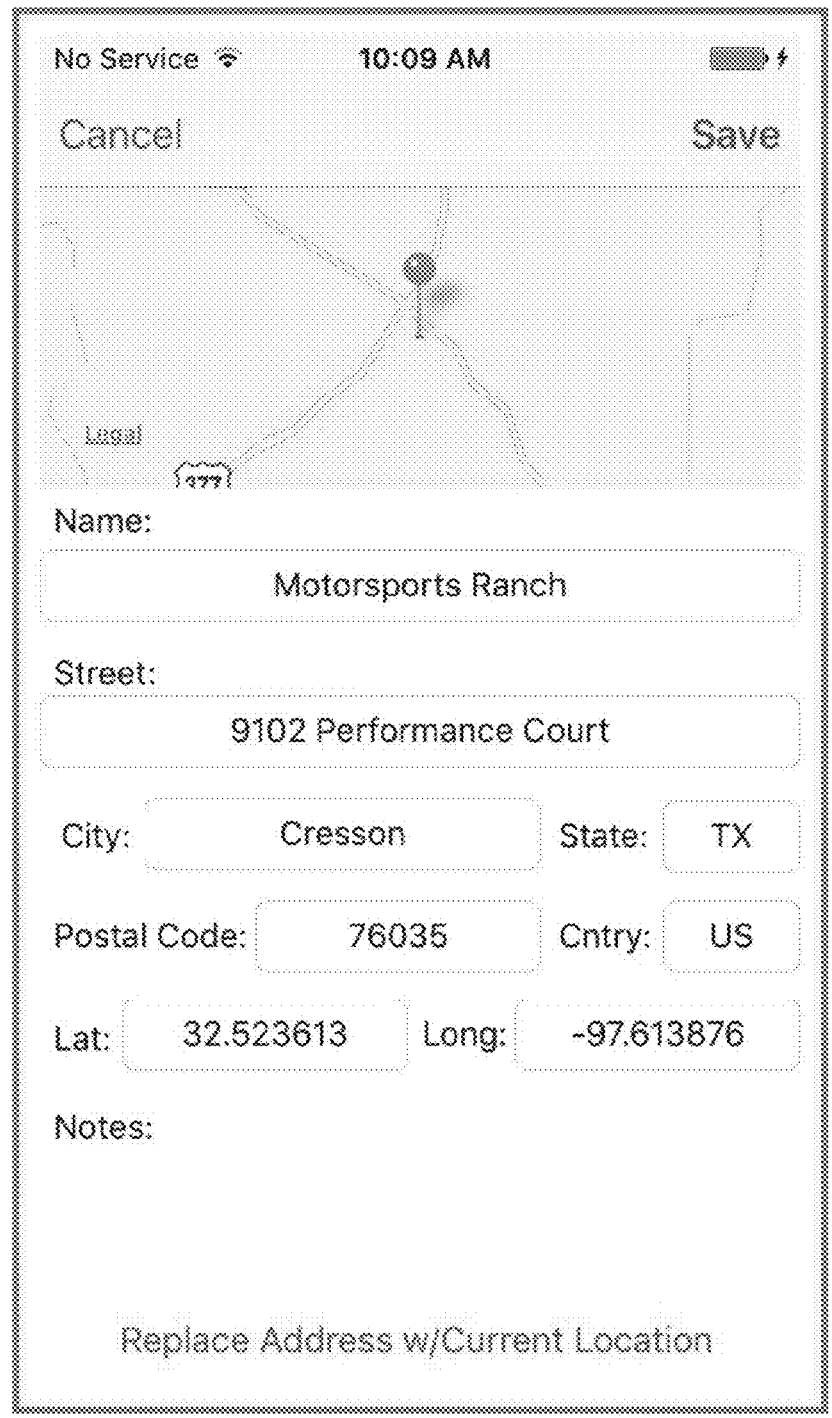

Selection of the New button 69 in the track tab 61 (see FIG. 10) creates a blank track record and opens it in the track record editor, within which some or all of the various fields in the track record may be completed (see FIG. 12).

The glove configuration tab 91 (see FIG. 10) allows the user to perform various glove hardware and application configuration tasks (similar tasks may be performed in embodiments featuring on other temperature sensing instruments). The red badge 93 next to the glove icon 91 in the tab bar (see FIG. 17) indicates that the application is connected to (that is, in communication with) the glove. In the Connection section, the "Glove list" cell opens a list (see FIG. 18) of the gloves discovered by the application.

Figure 17:
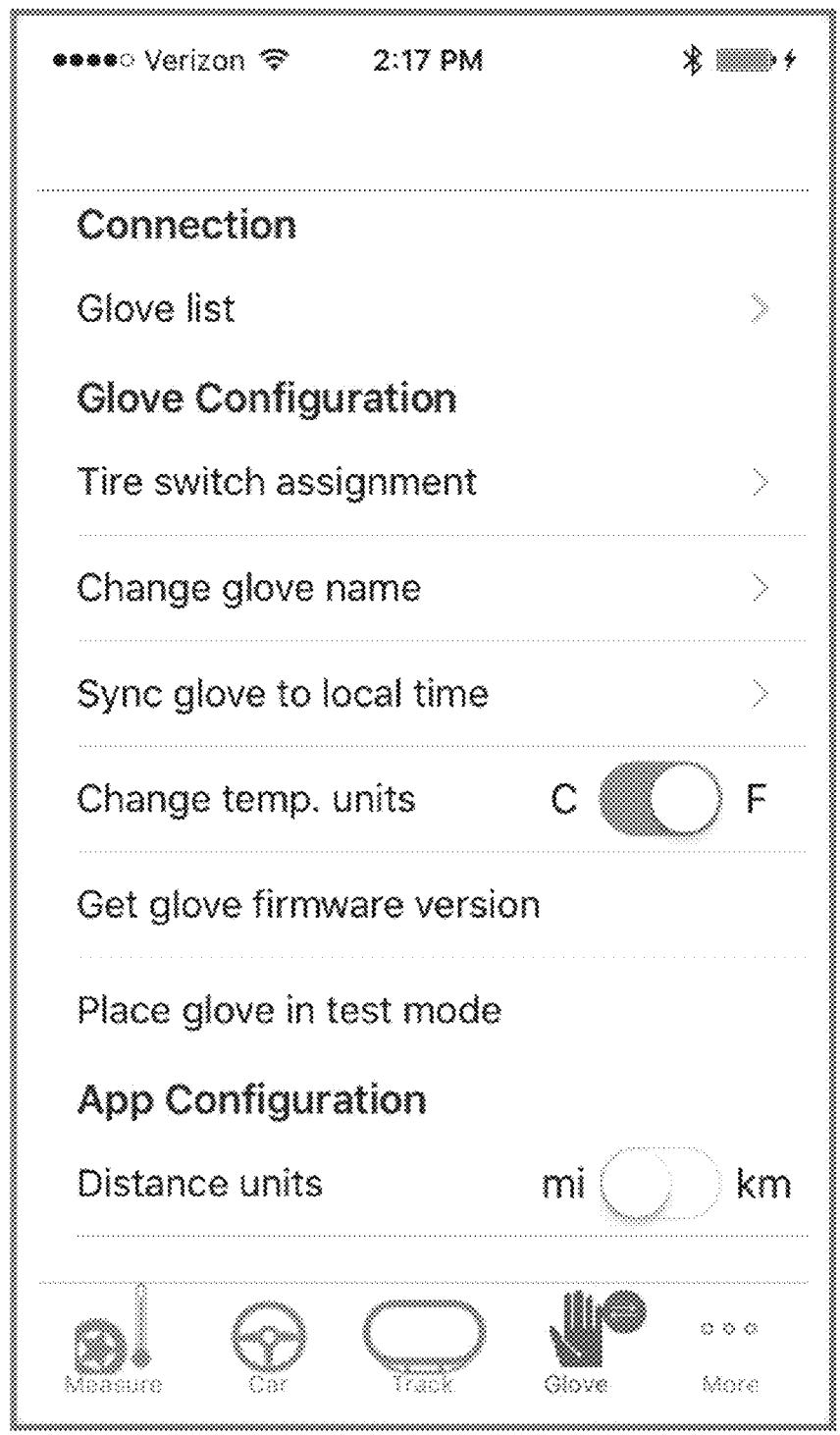
Figure 19:
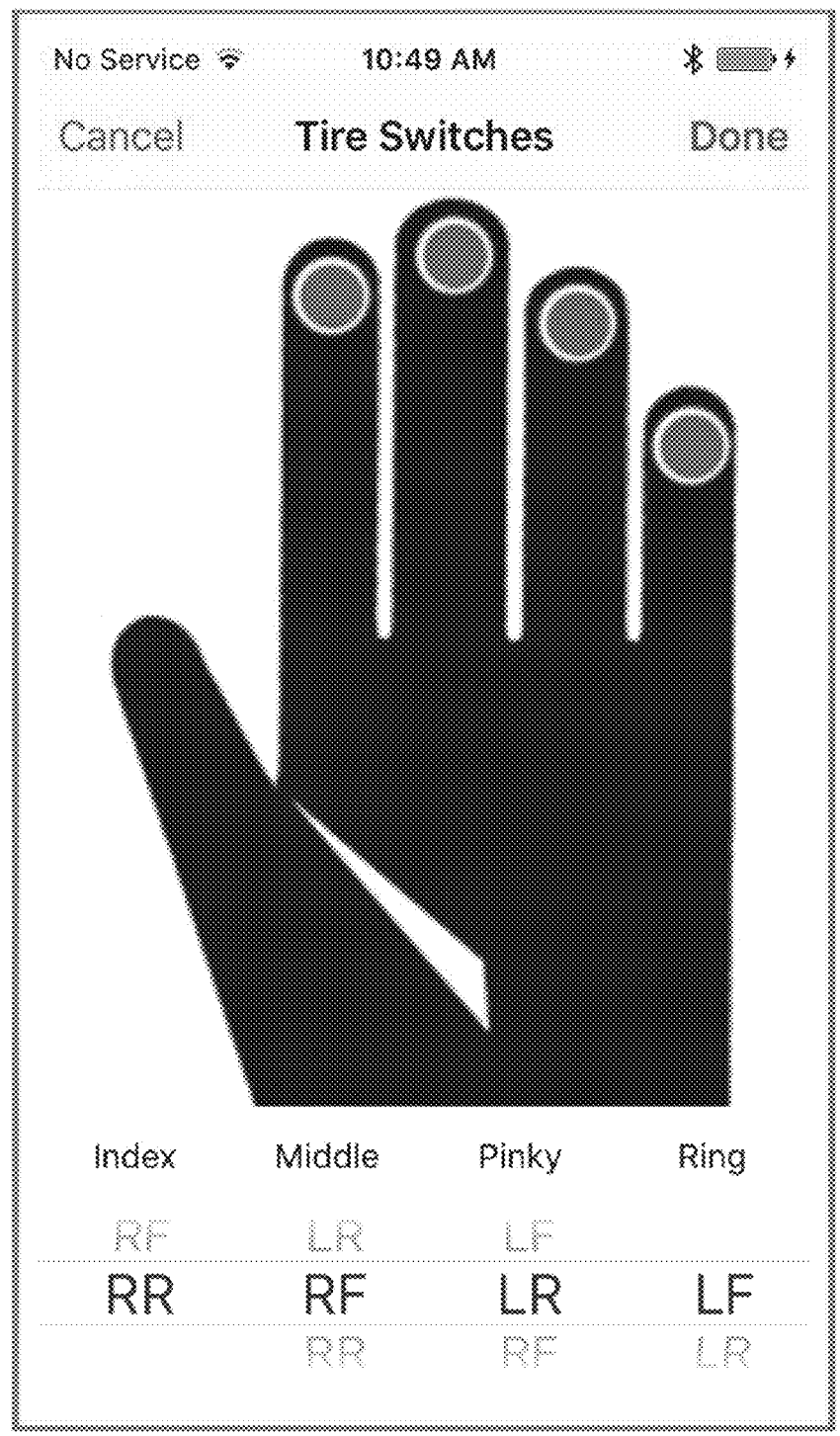

In the Glove Configuration section of the window in FIG. 17, the "Tire switch assignment" cell 201 launches a window from which the user may change the default assignment of the fingertip switches to different tire positions (see FIG. 19). The "Change glove name" changes the network name broadcast by the glove. The "Sync glove to local time" sets the real-time clock on the glove to the correct GMT and offset. The "Change temp. units" switch changes the temperature units for the measurement. The "Get glove firmware version" displays the glove firmware version.

Selecting the "Place glove in test mode" cell in the window of FIG. 17 disables the glove's internal checks on temperature measurements. While in test mode, the LED on the face of the glove blinks. Normal operations may be restored by disconnecting the application from the glove and rebooting the glove.

In the App Configuration section 205 of the window of FIG. 17, the "Distance units" switch changes desired distance units for the track record search.

Figure 18:

The glove list presented in the window of FIG. 18 displays all gloves discovered by the phone. For each glove it displays the network name of the glove and the (typically 128 byte) Universally Unique Identifier (UUID) used to identify individual Bluetooth® Low Energy devices.

The switch 207 next to the name and UUID in the window of FIG. 18 connects and disconnects the glove.

The tire switch assignment window of FIG. 19 displays the results of a query to the glove for the current switch assignments, and enables alteration of these assignments by changing the pickers below the different fingers.

Figure 20:
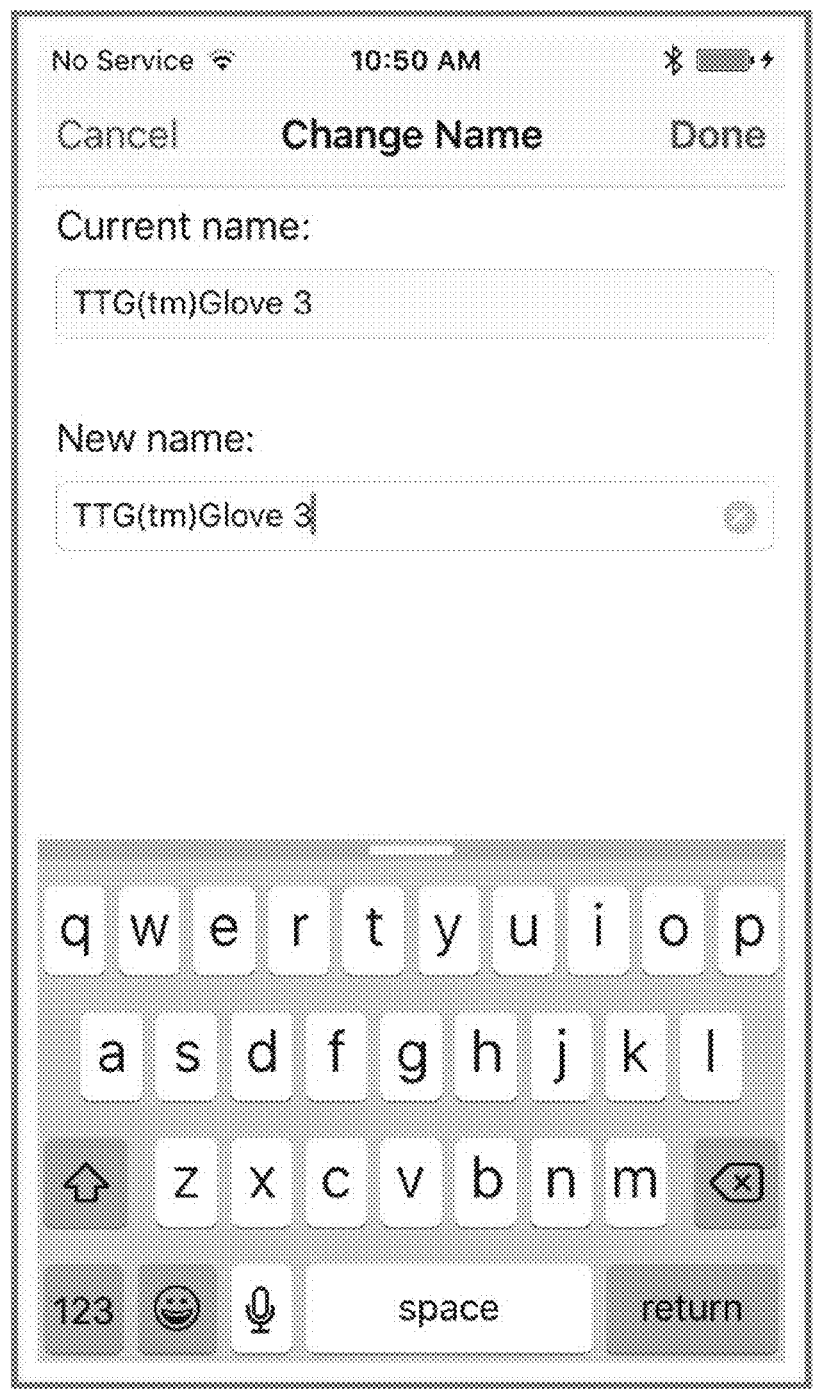
Figure 21:

The glove name window of FIG. 20 displays the current BLE network name of the device and allows the name to be changed. It should be noted that the new name may not immediately appear in the glove list.

Figure 22:
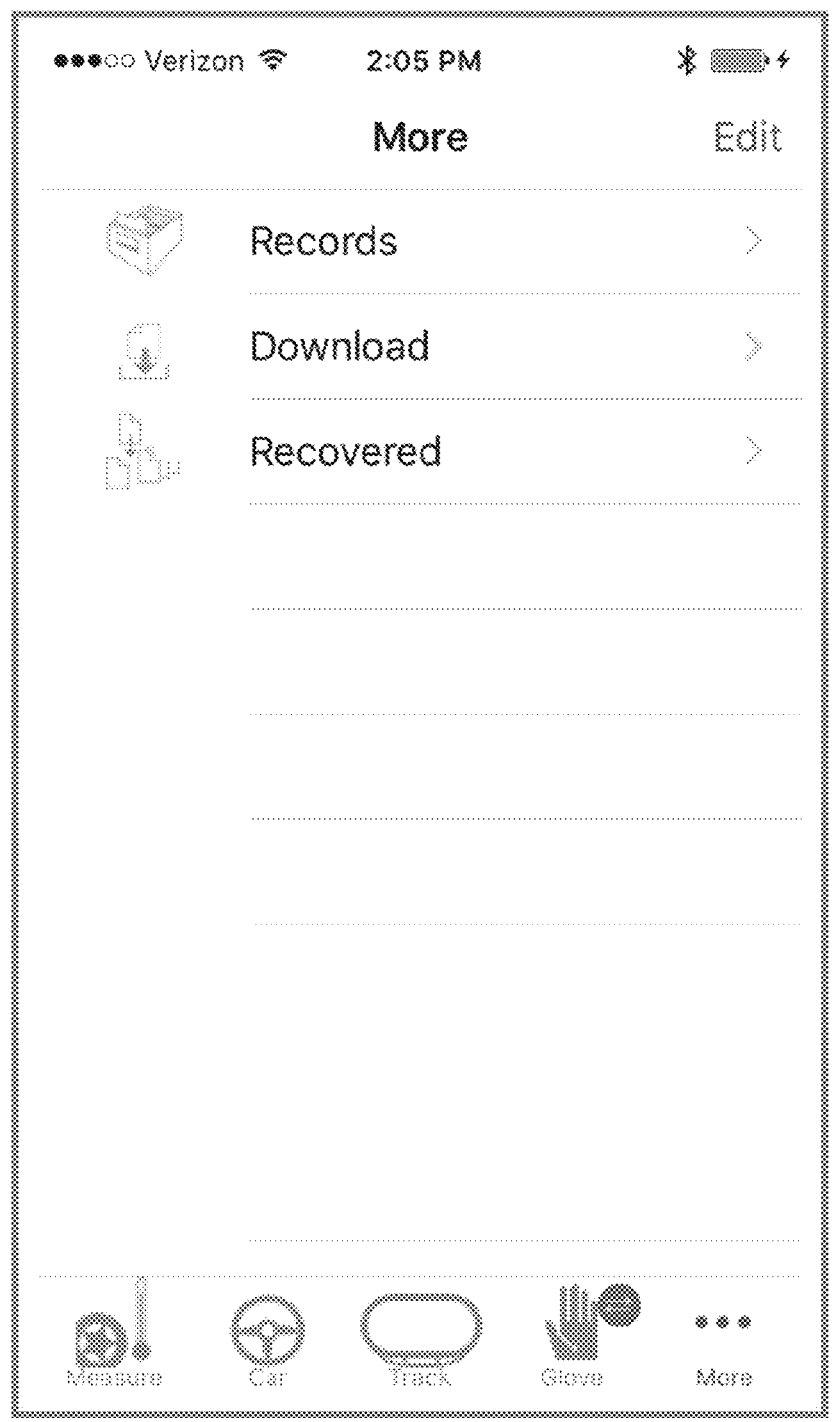

The More tab 209 in the window of FIG. 22 (which also displays the Records, Download and Recovered tabs) provides access to the other tab functions, which do not fit on the bottom tool bar.

The more editor (accessed by the Edit hyperlink 211 in the window of FIG. 22) provides access to the more editor, which may be used to change the selection of tabs displayed in the bottom tool bar.

The Records tab 213 in the window of FIG. 22 enables the user selection of a date range to display stored tire measurement records. The date range is set by adjusting the date pickers to bracket the desired range.

Figure 25:

The window of FIG. 25 depicts the group summary for the tire measurements and an individual tire measurement record. The groups are sets of all the temperature measurements that were taken between separate instances of a predetermined event (in a preferred embodiment, this event is a double click on the middle finger switch on the glove). The measurement group provides a method of delimiting sets of measurements, making the data easier to manage. Selection of the detail disclosure button opens a page display consisting of a summary sheet and sheets showing the details of each individual measurement.

Figure 23:
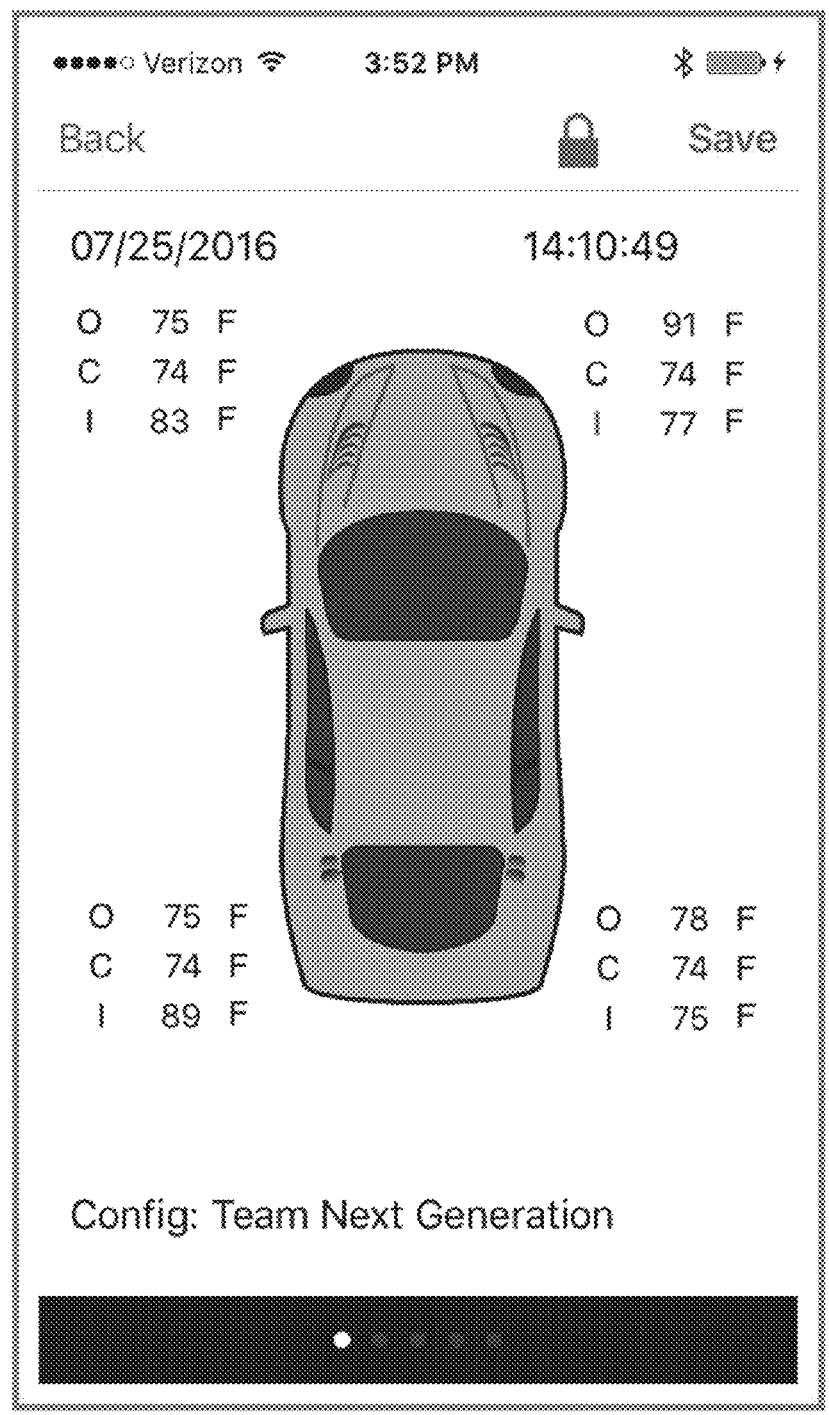
Figure 24:
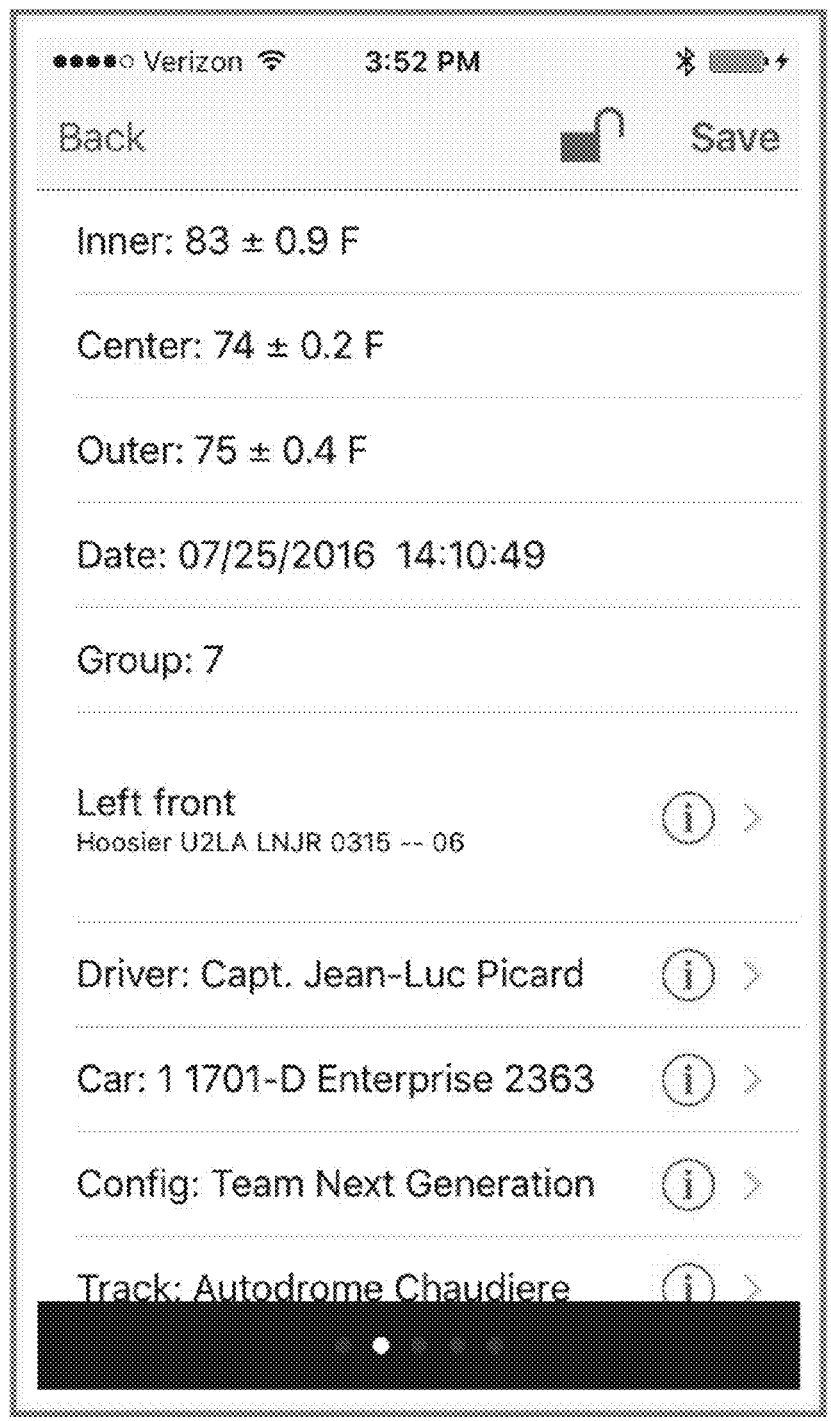
Figure 26:
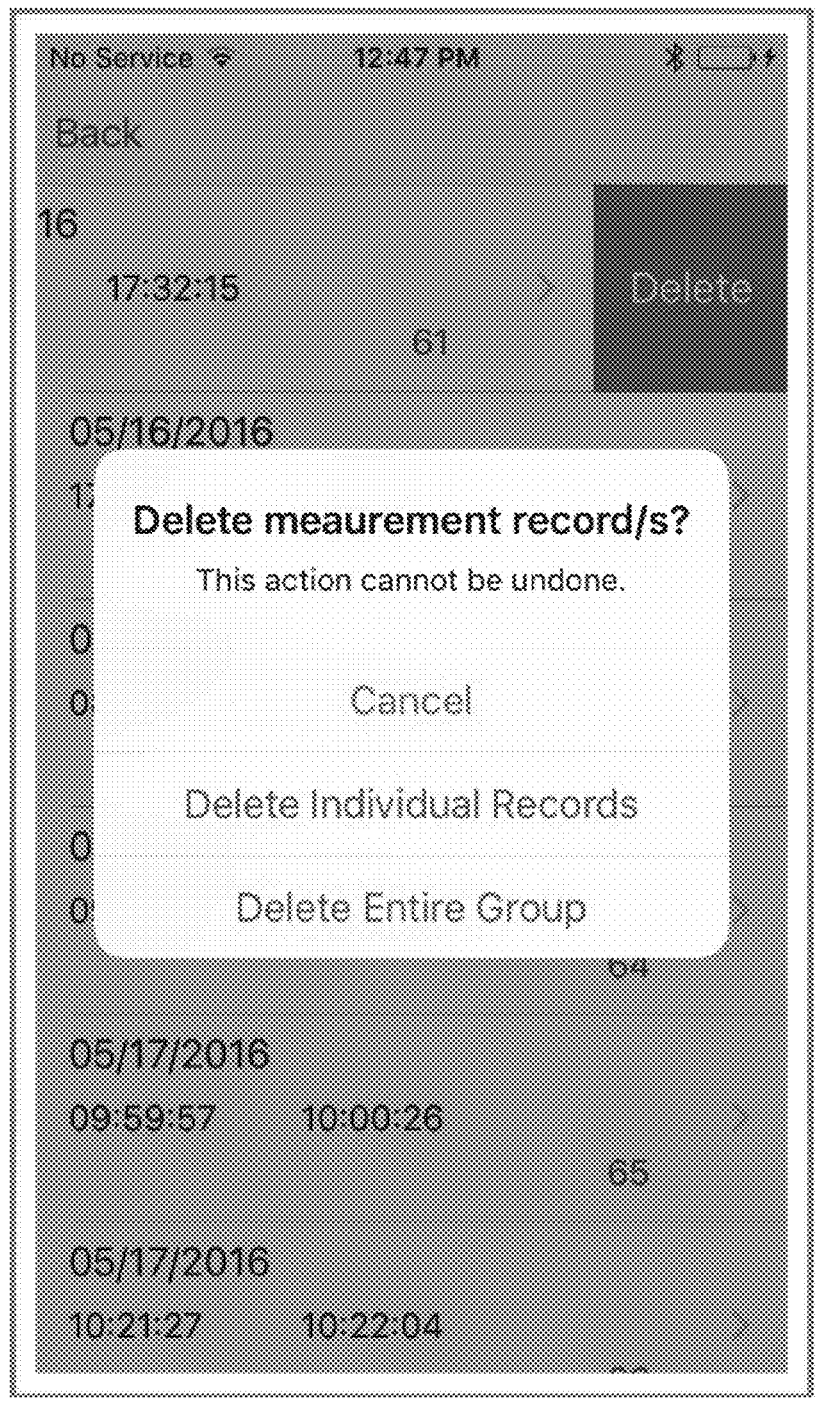

The summary page of FIG. 23 shows the temperatures for each tire zone next to the tire positions. In a preferred embodiment, if a duplicate measurement for a particular tire position exists within the group, a small red warning symbol—"—appears next to the tire position. The detail page (FIG. 24) displays the full record for each measurement, including the duplicates. Selecting lock icon opens the record for editing. Records are deleted by right swiping the cell for the desired group. Before the record group is deleted, a dialogue box (FIG. 26) will appear, offering the option to delete the entire group or delete individual records. These actions preferably cannot be undone.

To guard against the loss of data in the event of loss of communications with the glove, it preferably has a limited capability to store measurement data. Thus, for example, in a preferred embodiment, only ten measurements for each tire position (finger switch) are stored in the glove's memory. These records may be downloaded to the application at the user's convenience.

Figure 27:

Selection of the download button 215 in the upper right corner of the group summary list of FIG. 27 starts the download process, which takes a little over a minute. During the downloading process, a download tab 217 is displayed as shown in FIG. 27. When the process is complete, the data are compared to the tire records already stored in the application database. All duplicate records are eliminated, and the unique records are added to the database when the tab is closed. Preferably, the download process does not clear the glove memory. Rather, those records preferably remain in memory until they are overwritten by newer records.

Figure 28:
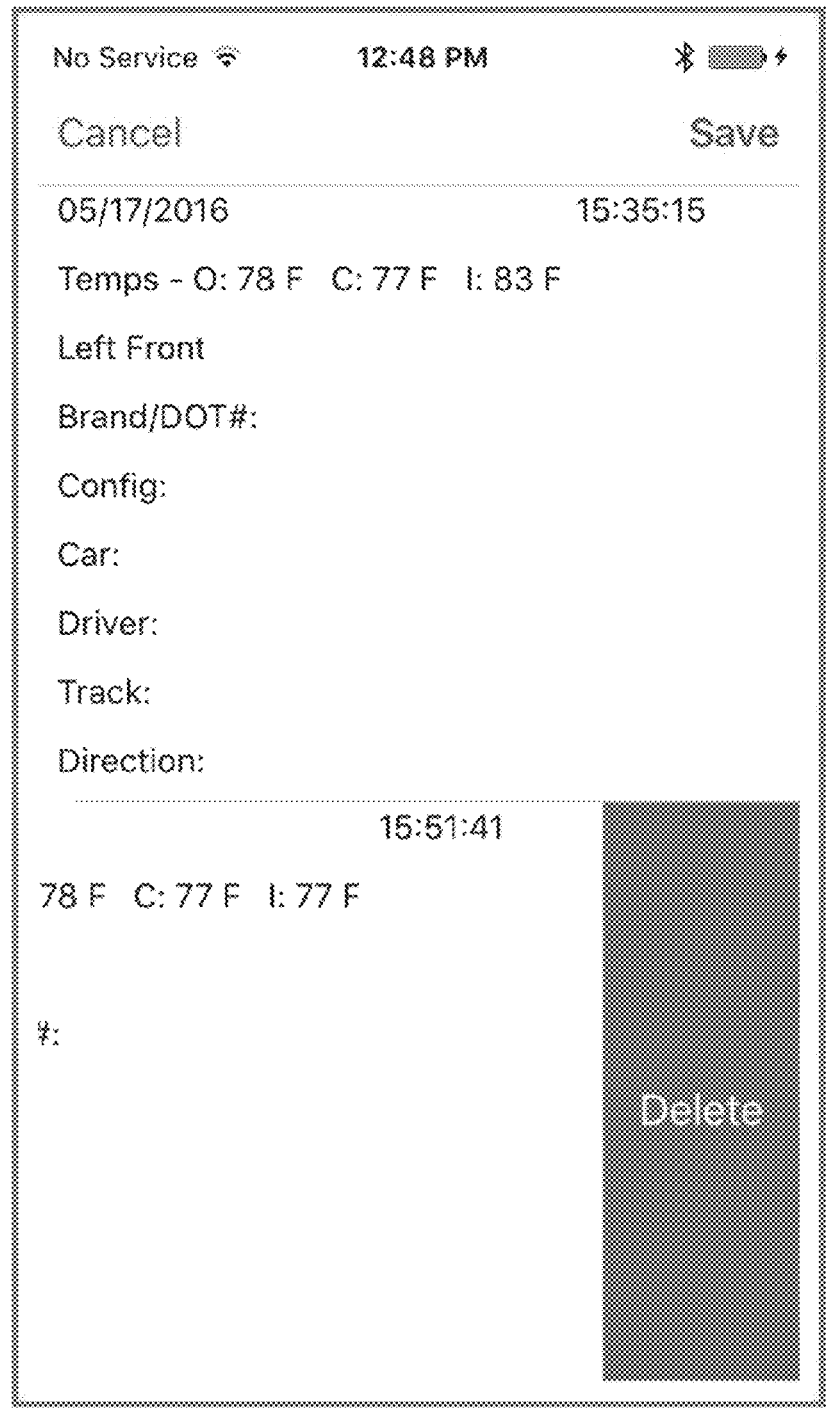
Figure 29:
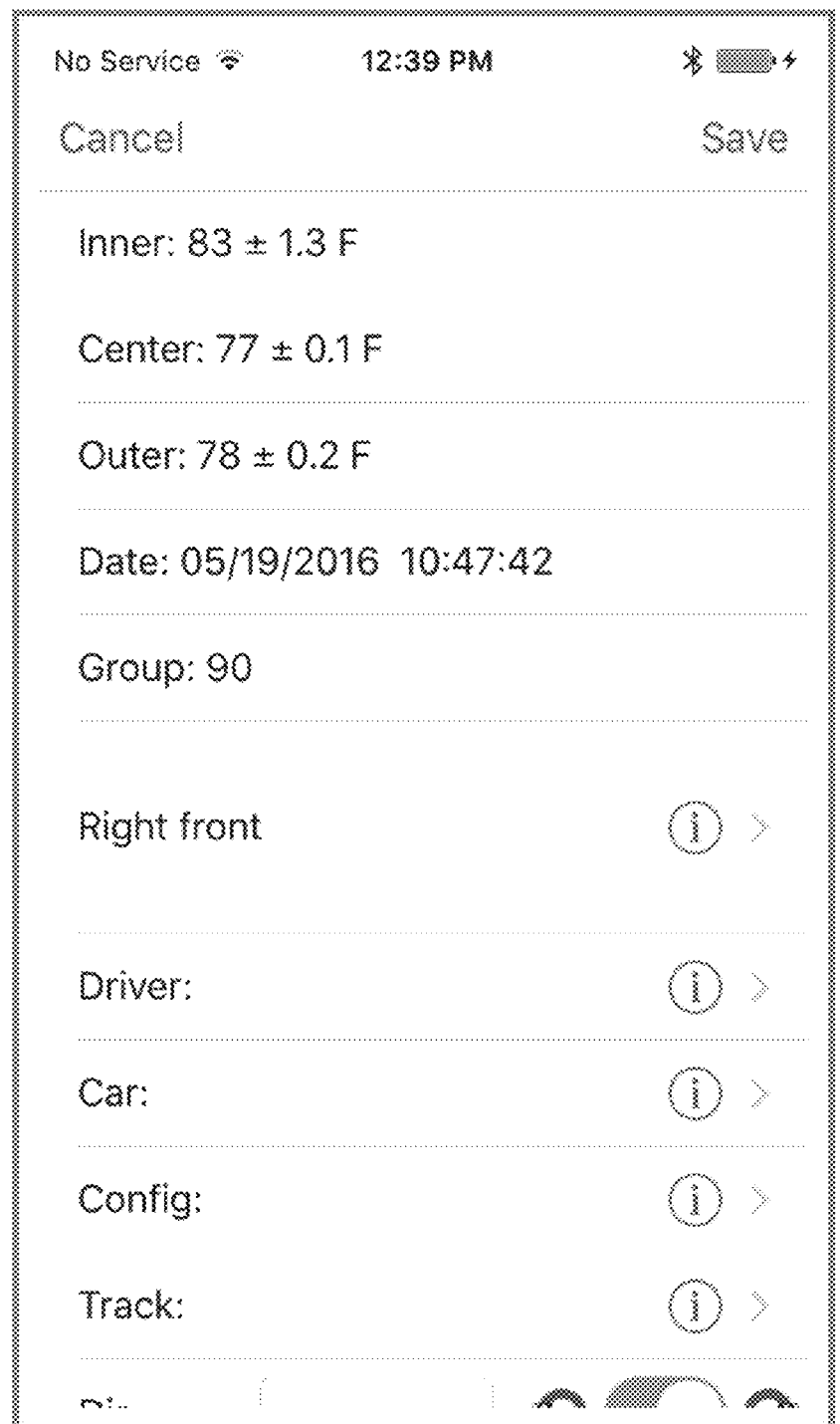

Selection of the detailed disclosure button of FIG. 25 opens a detailed view of an individual record, as seen in FIG. 28. The information from the glove in this case is rather basic, and includes temperatures, date, time, group and tire position. This screen permits the user to link a vehicle configuration, track and track direction to the new record (FIG. 29 shows the record of FIG. 28 in an editor). This is preferably the only place this information can be added to a downloaded record.

Selecting a configuration populates the driver, car, and tire fields. Once the tire, car and driver attributes for a tire measurement record are set, they are independent of the configuration. Therefore, if the tires on a vehicle are changed and the configuration is updated rather than replaced, the measurement record will remain linked to original tire. This link is only broken by deleting the tire from the database. The same is preferably true for the driver and car information.

Figure 30:
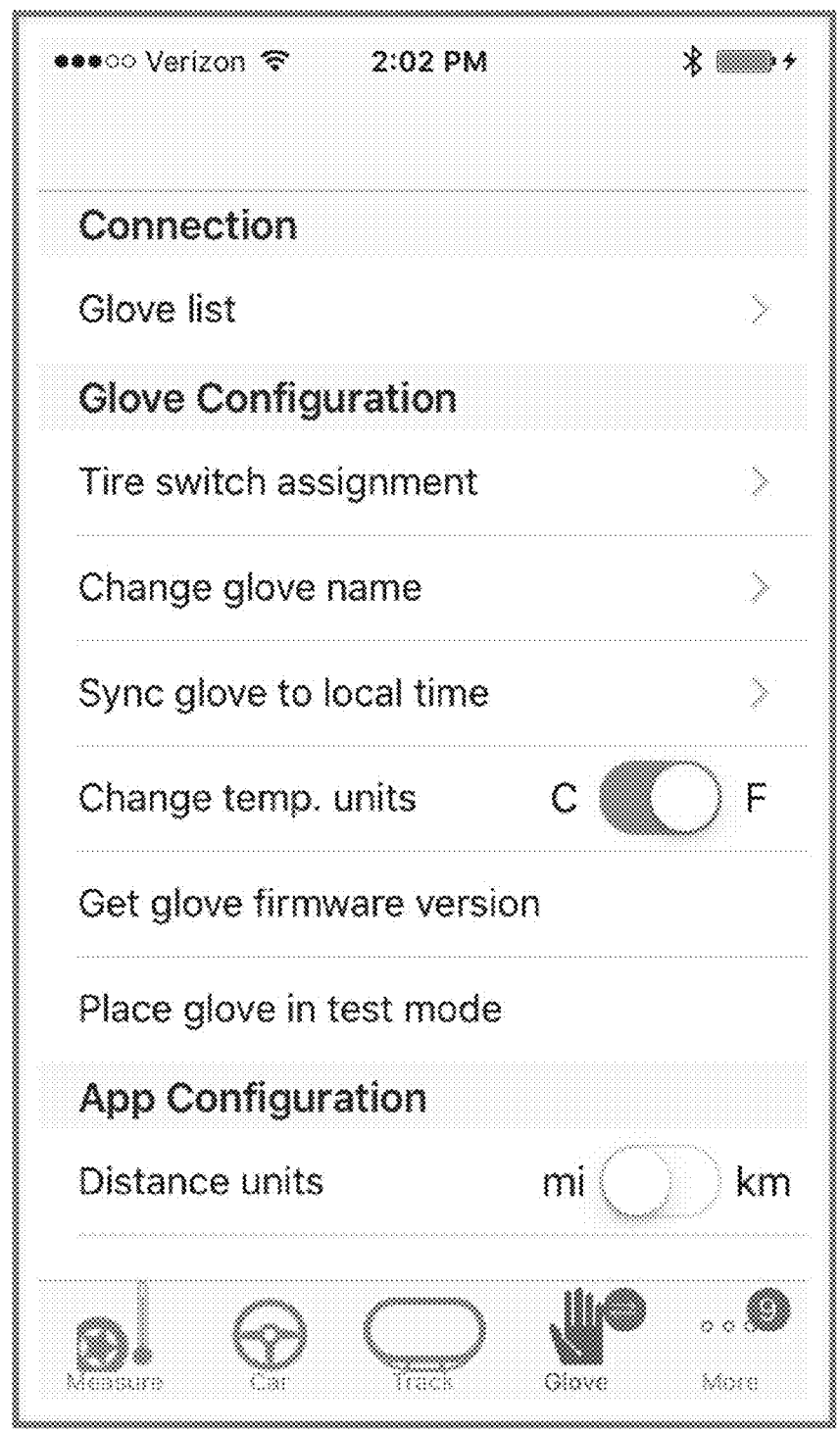

The glove and application have the ability to automatically recover a limited number of records taken while the glove is not in communications with the application. This preferably occurs via an independent background communications channel, so the measurements may be received some time after the app has reestablished communications with the glove. Preferably, a red badge or other suitable indicia will appear on the icon which displays the number of recovered records (see FIG. 30).

Figure 31:
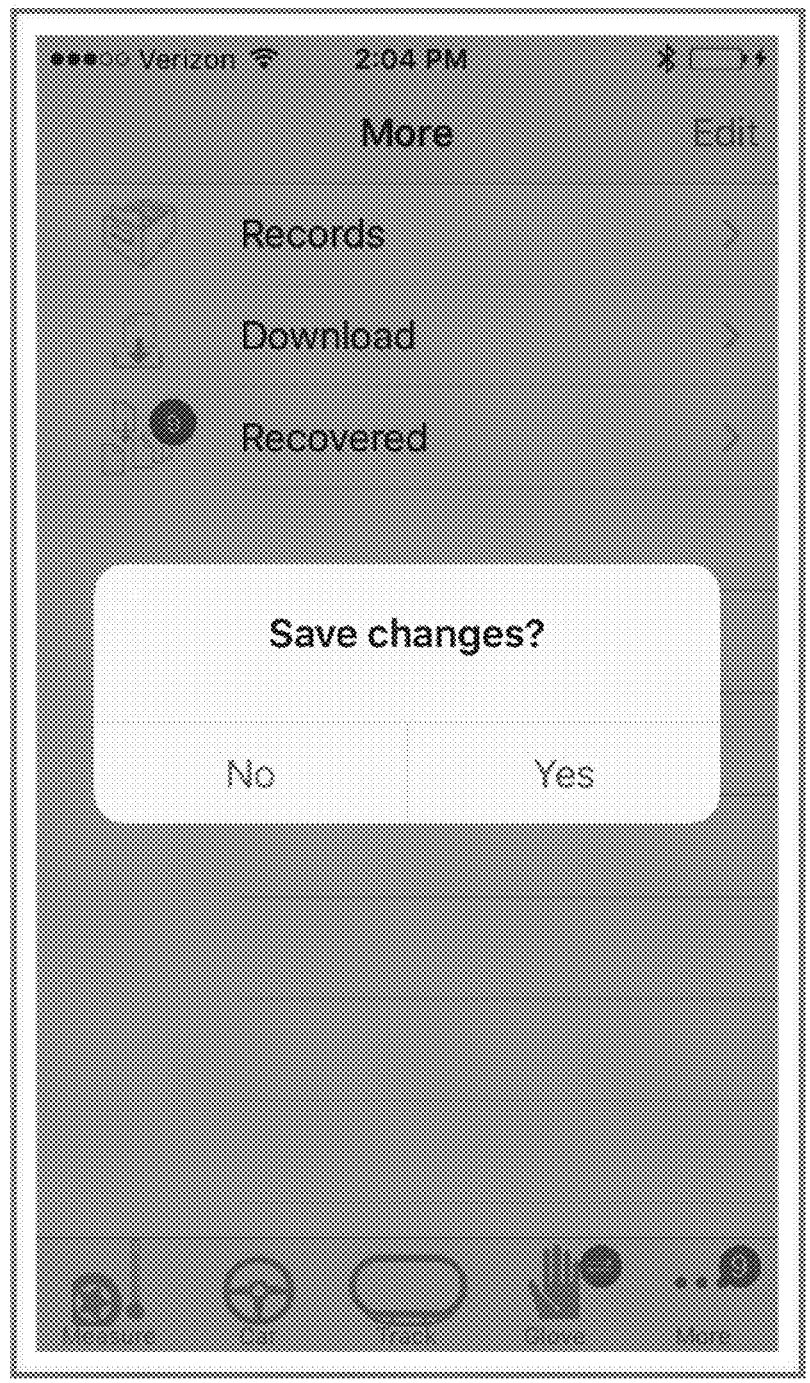
Figure 32:
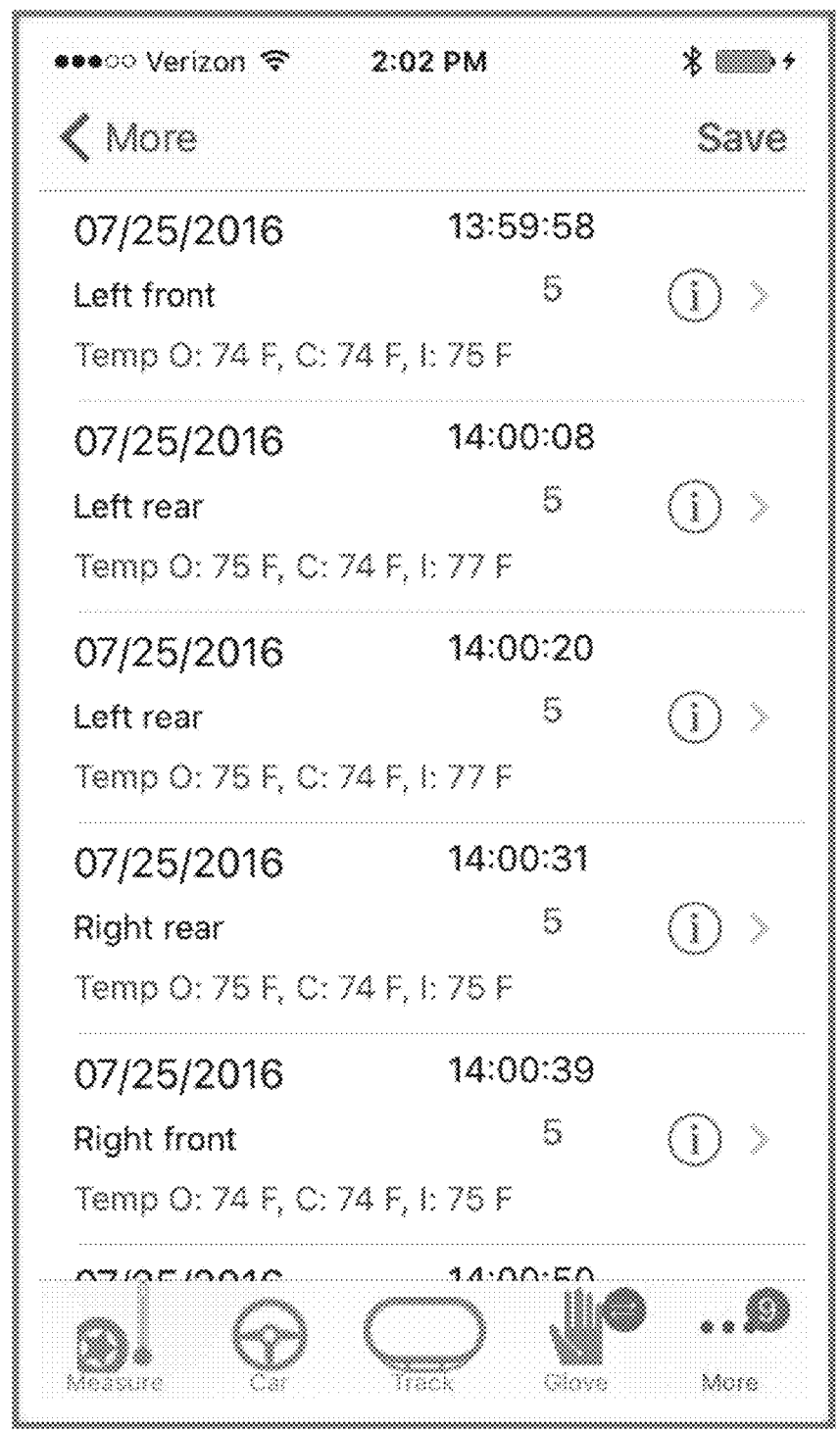
Figure 33:
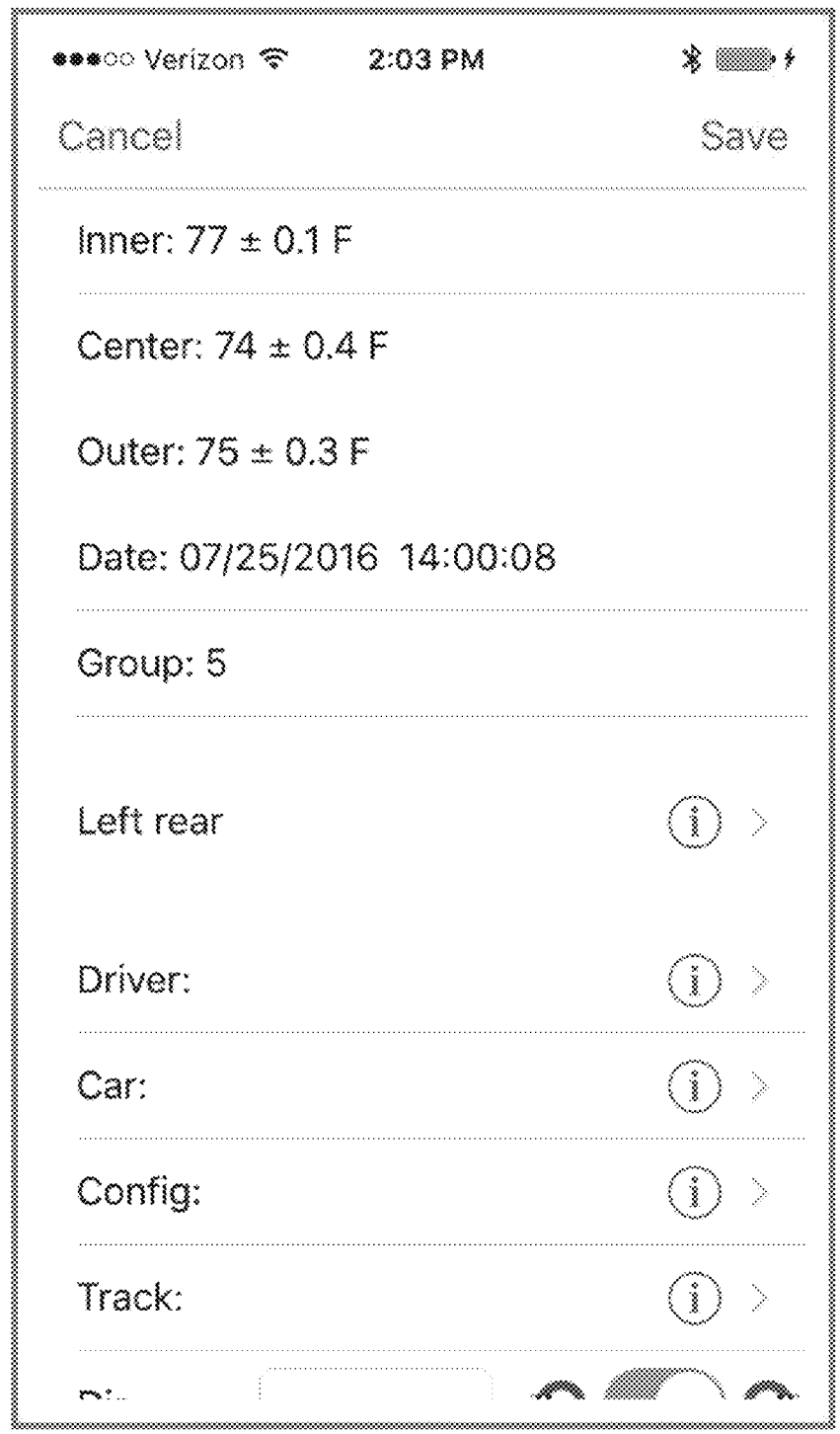

The recovered records are displayed in a list (see FIG. 32), which may be accessed by selecting the Recovered menu item. This list shows a summary of the individual measurement records. Selecting the detail disclosure button 217 on the right of the window will open the record in an editor (see FIG. 33). Once the records have been appropriately edited, selecting Selection of the save button 219 in the upper right will save the entire group of records to the database after the save is confirmed in the dialog box of FIG. 31.

In the particular embodiment depicted, these records are not linked to configuration and track information. However, embodiments are possible in which such linkages exist. For example, in such embodiments, codes corresponding to the last selected track record and vehicle configuration may be transferred to the glove and linked to the stored record on the glove. A pair of configuration codes may even be transferred to the glove, and one of the finger switches may be assigned to toggling between configurations.

Figure 34:
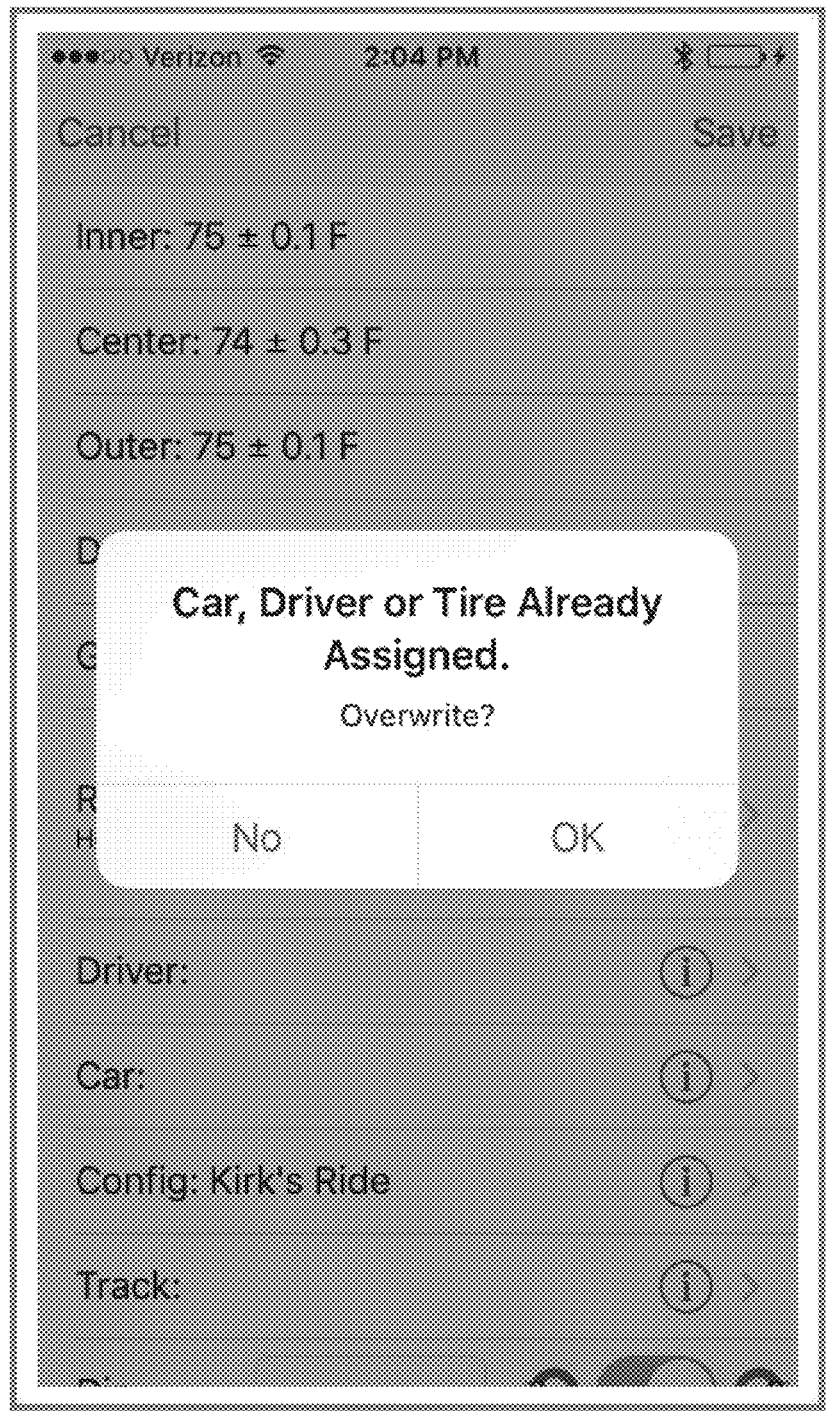

The foregoing details may be added or changed in the editor. Selecting the detailed disclosure buttons in the various entries will open lists of the various drivers, tires, configurations, and other available information. Selecting Save in the upper right, saves the changes to the individual records, but preferably does not commit the entire list to the database. If the user assigns a tire, driver or car to a record and then selects a configuration, the user will preferably be asked to approve the replacement of these selections with those from the vehicle configuration, as seen in FIG. 34.

Figure 35:
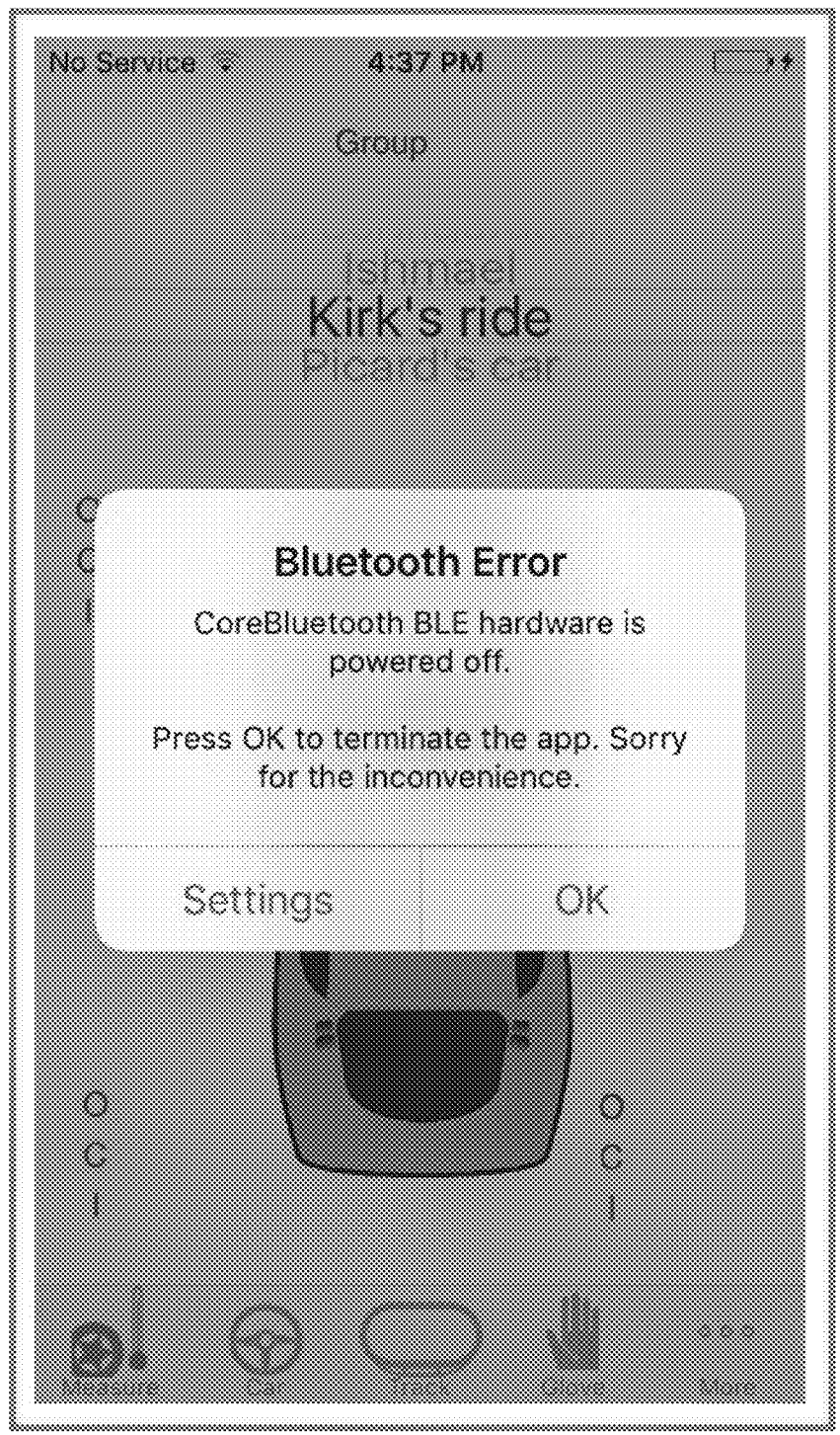
Figure 36:
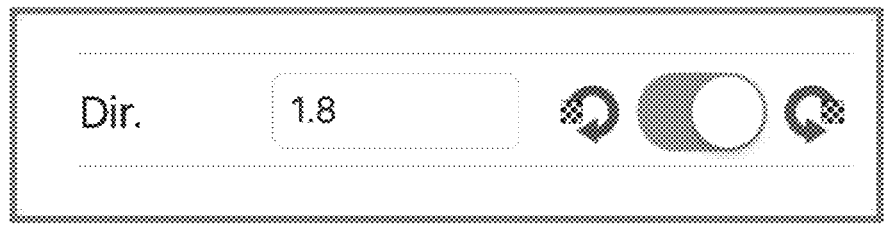
Figure 37:
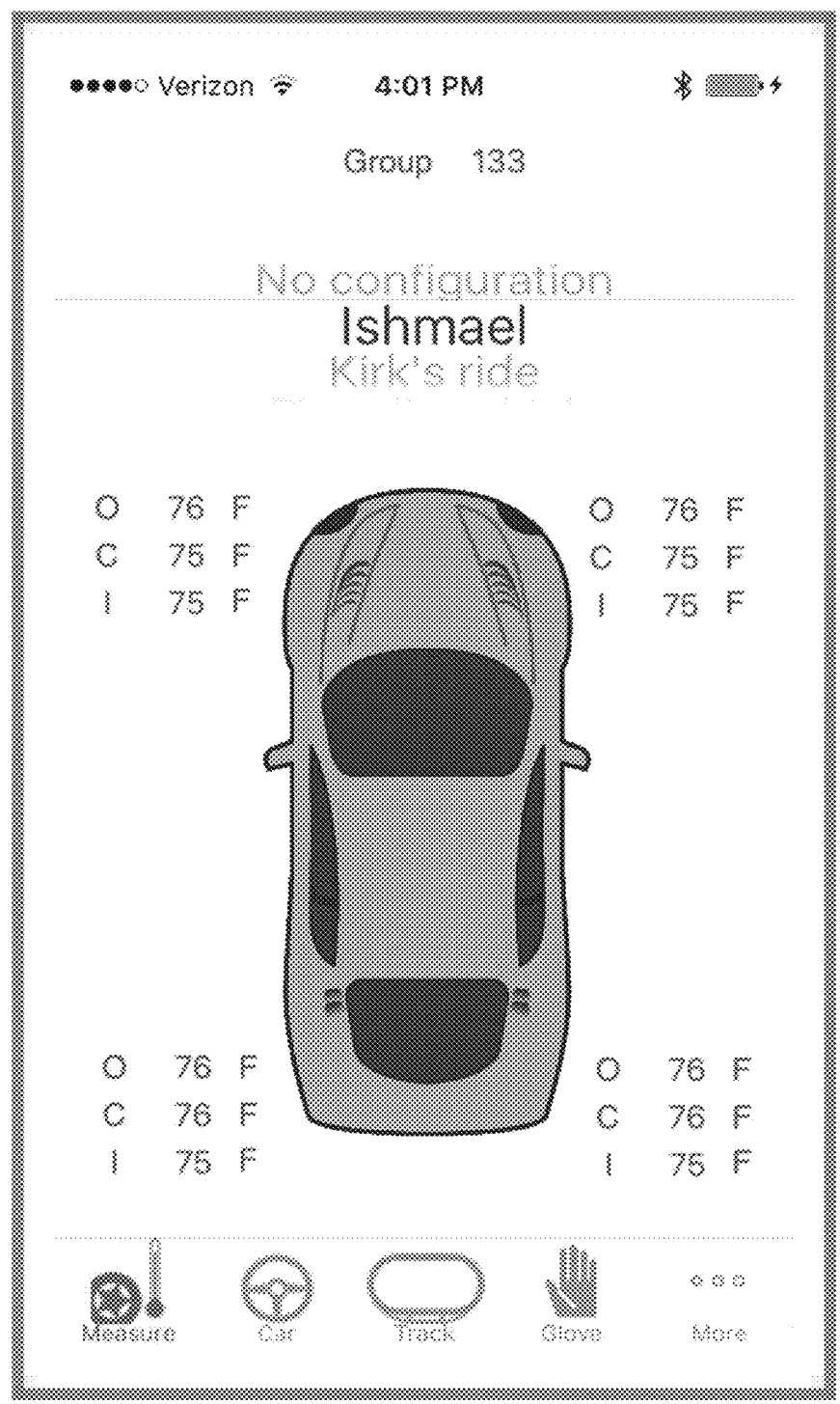
Figure 38:
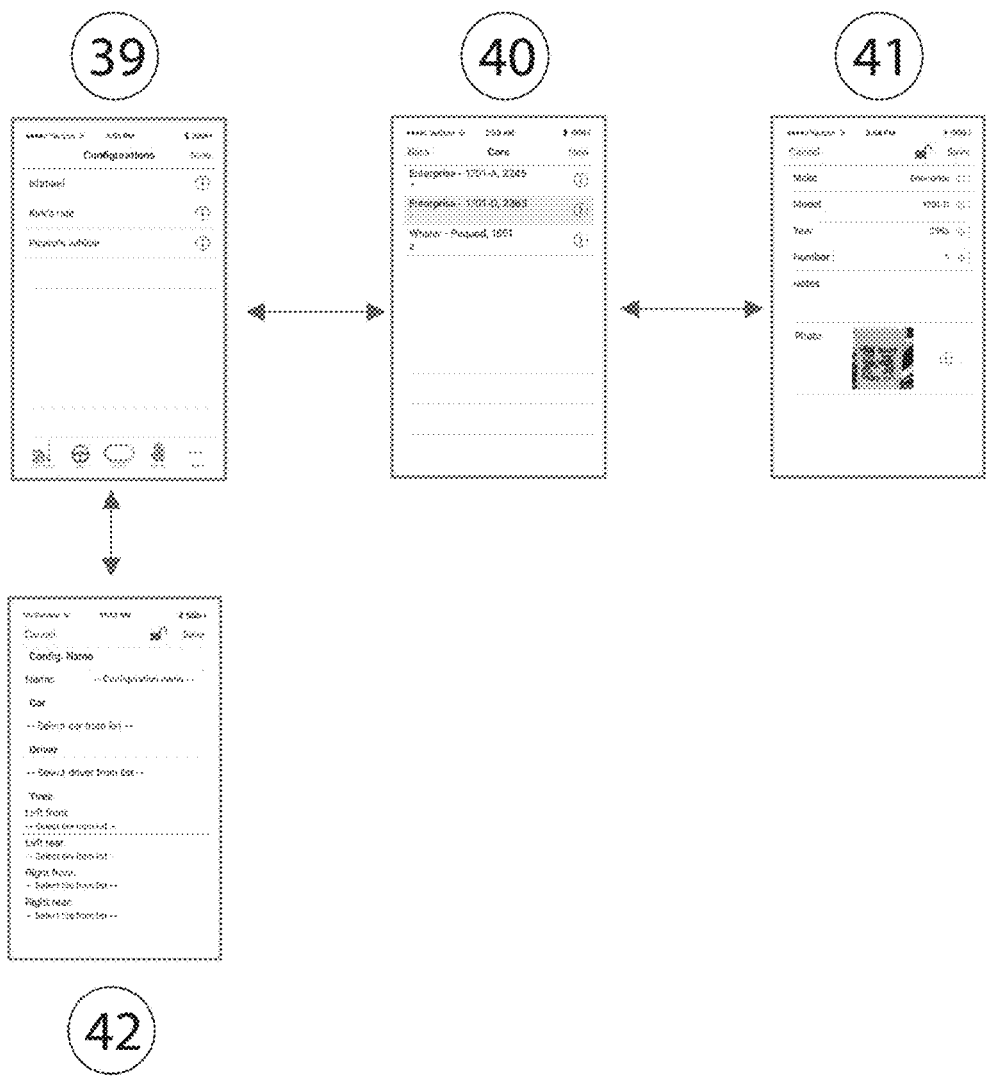
FIG. 38 is an illustration depicting the relationship between several screens in the software program of FIG. 1.
Figure 39:
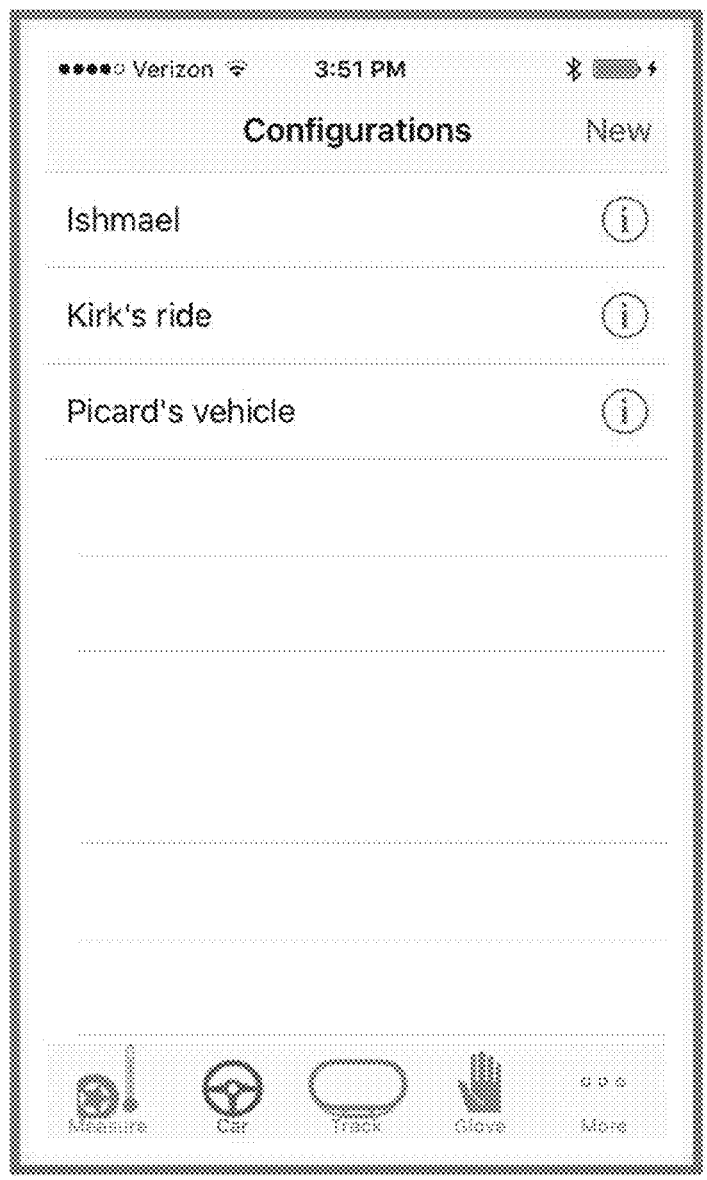
FIGS. 39-42 are enlarged versions of the screen captures depicted in FIG. 38.
Figure 40:
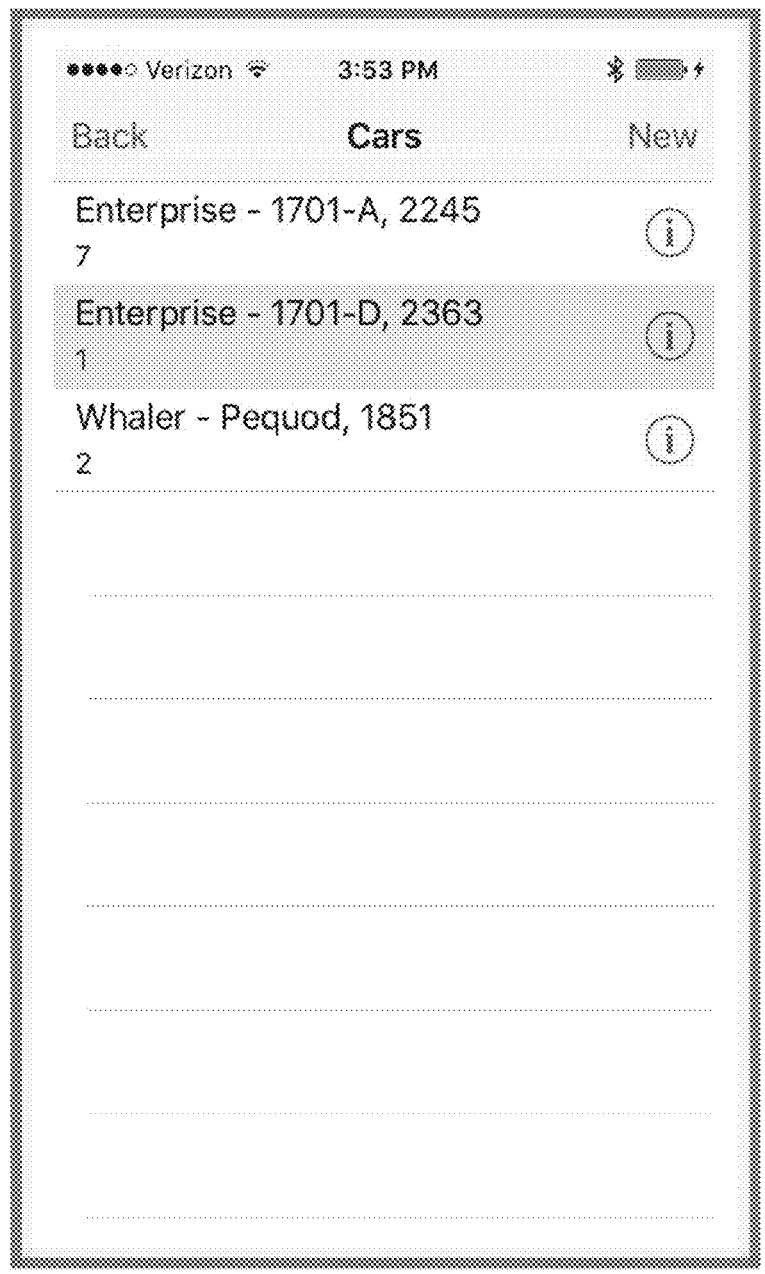
Figure 41:
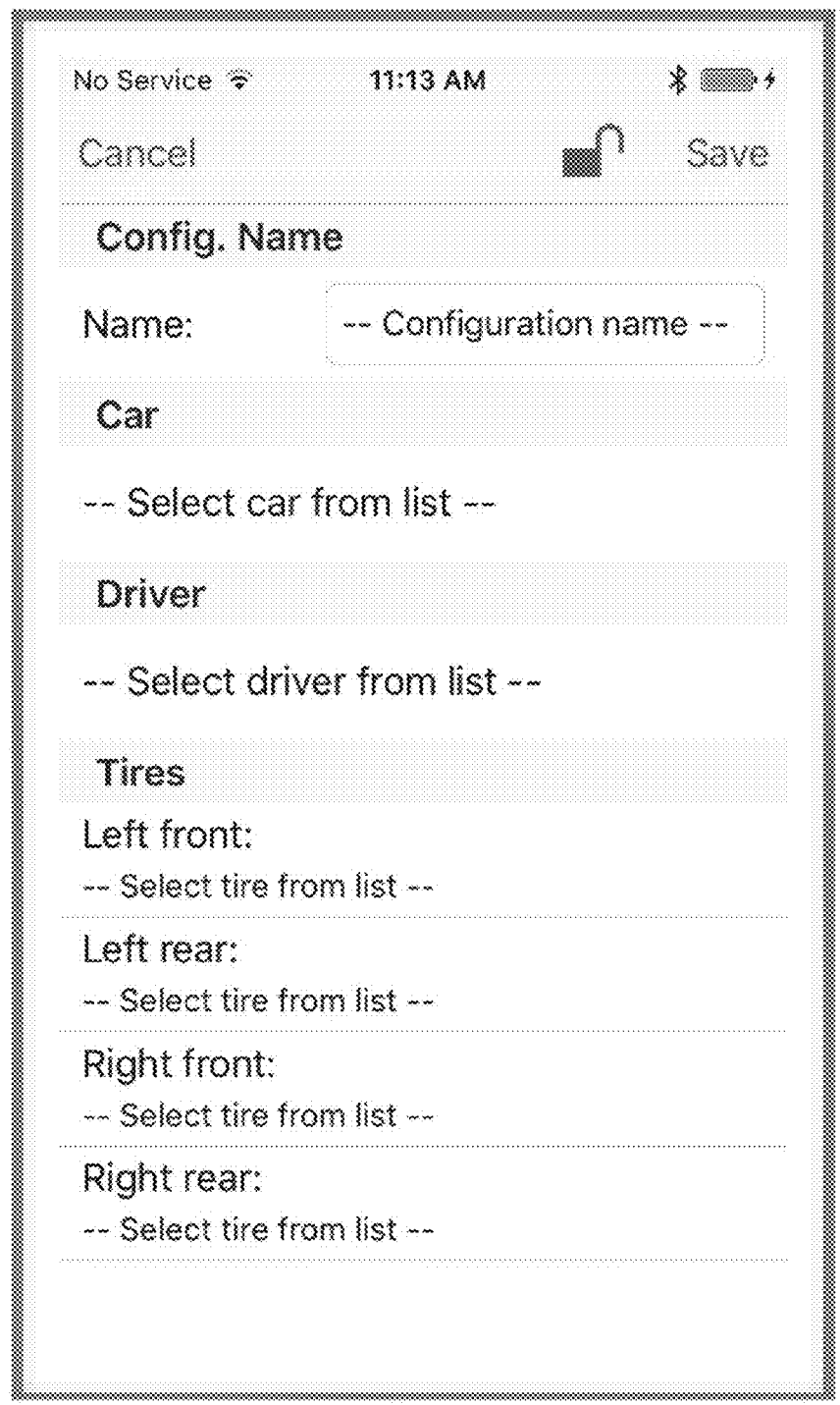
Figure 42:
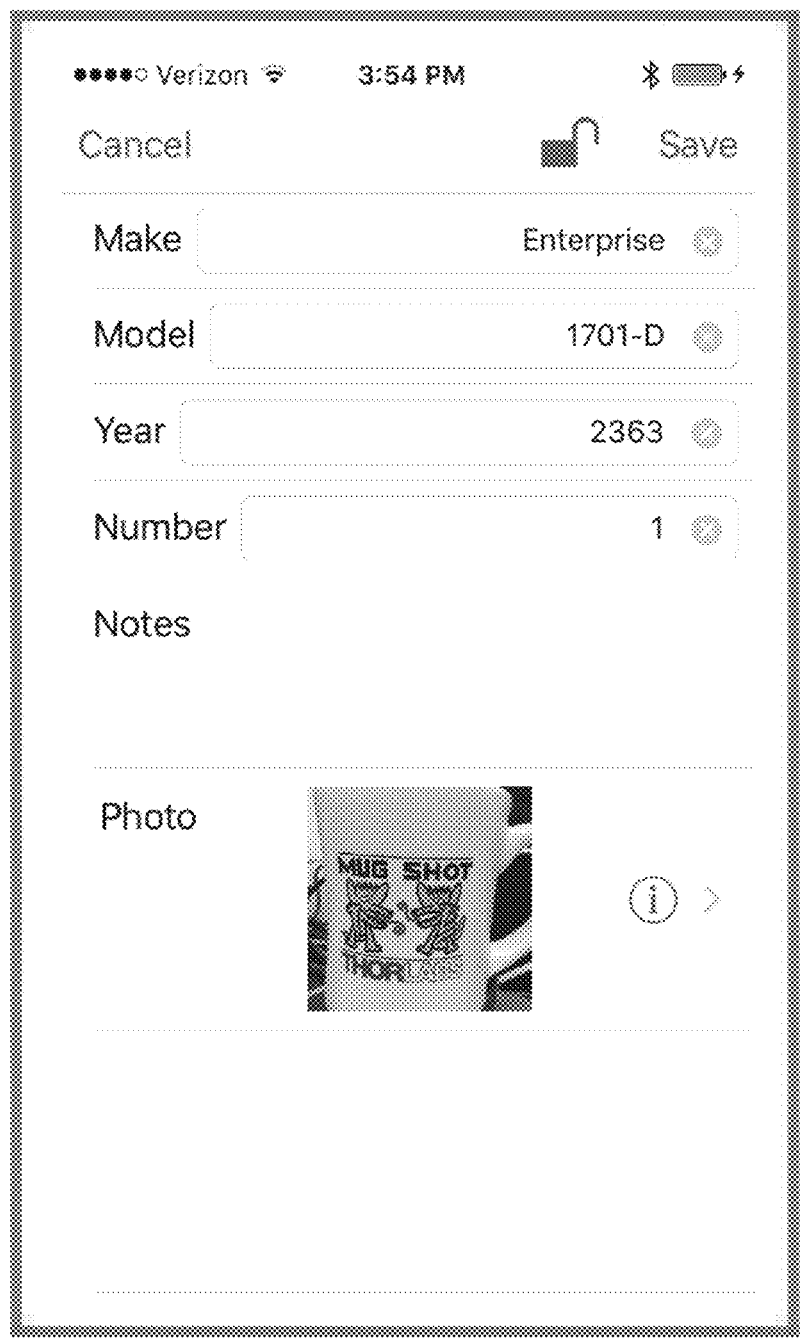
Figure 43:
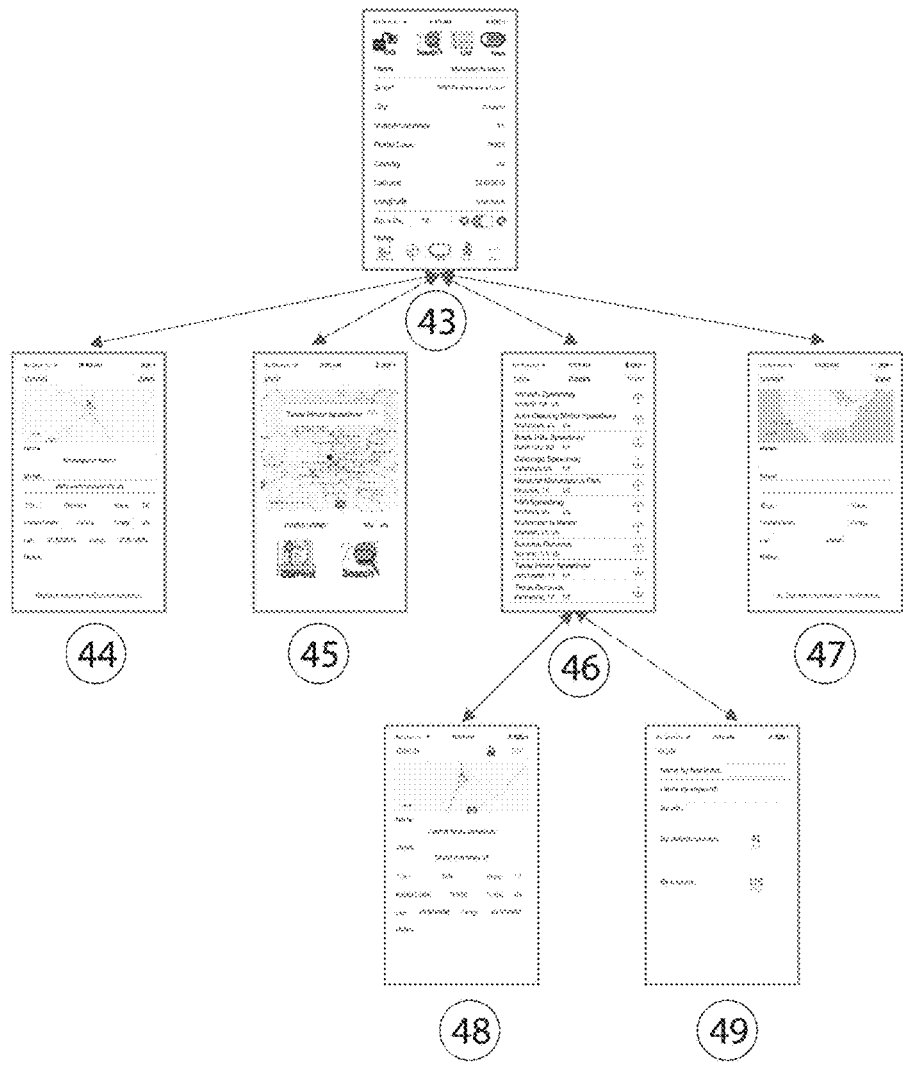
FIG. 43 is an illustration depicting the relationship between several screens in the software program of FIG. 1.
Figure 44:
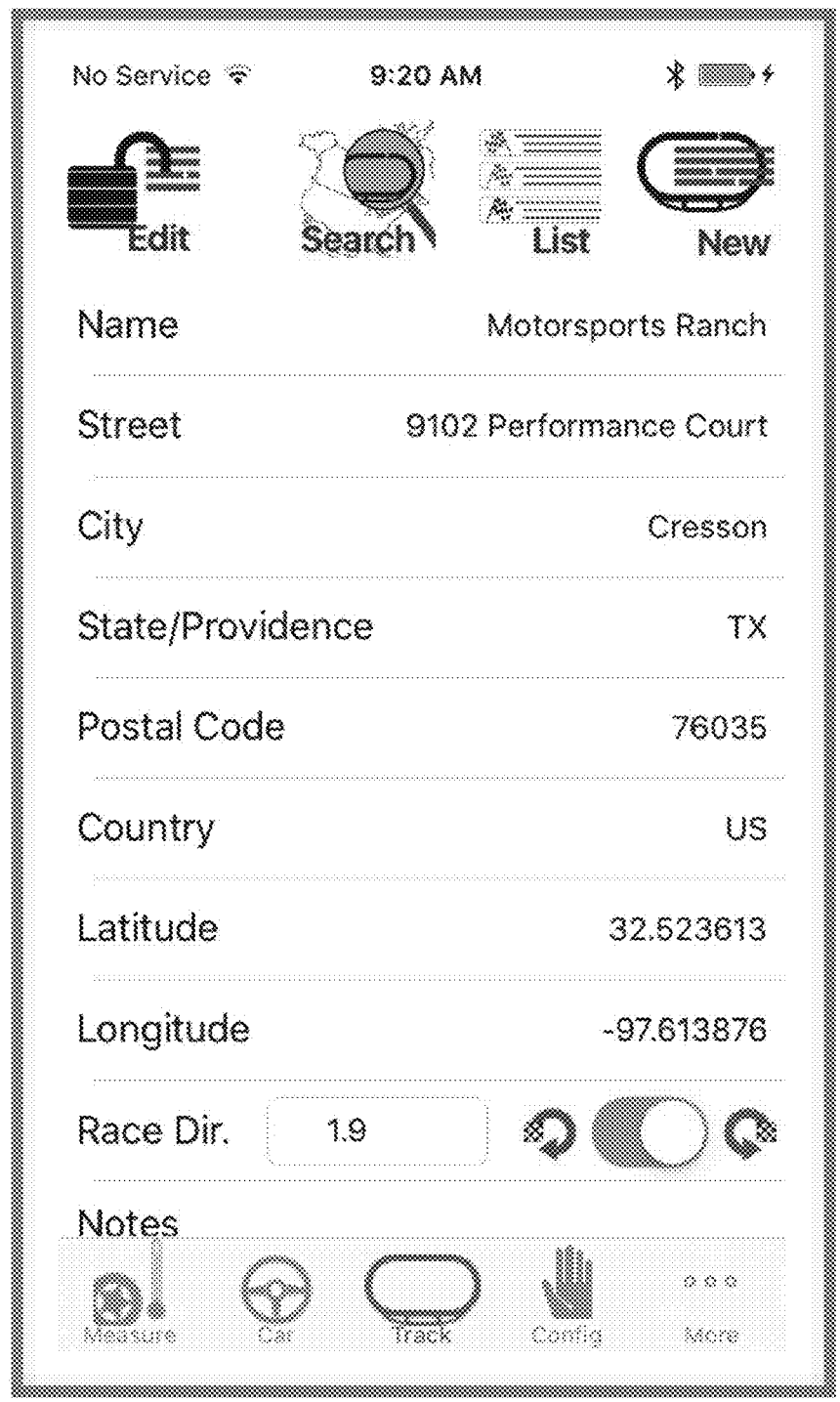
Figure 45:
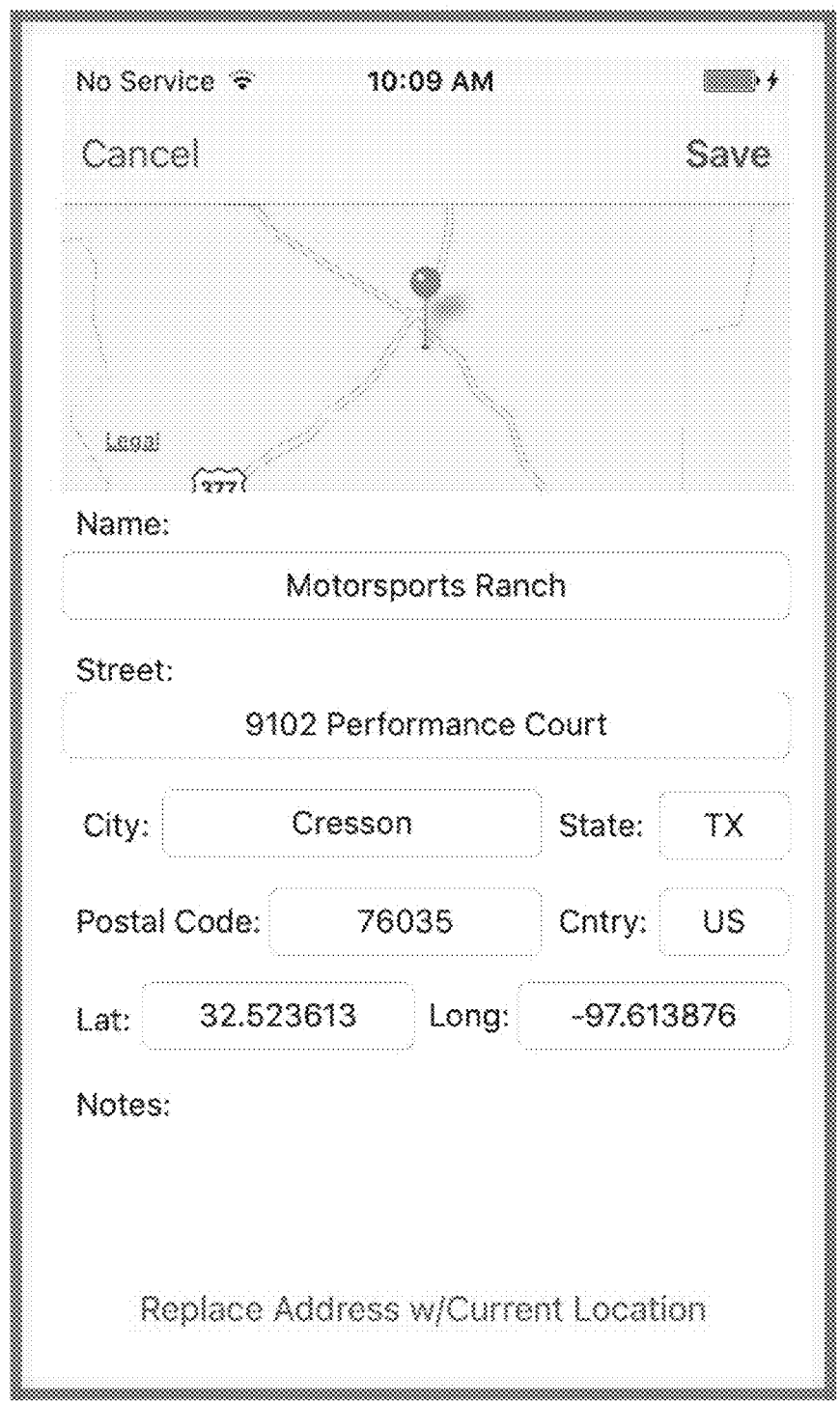
Figure 46:
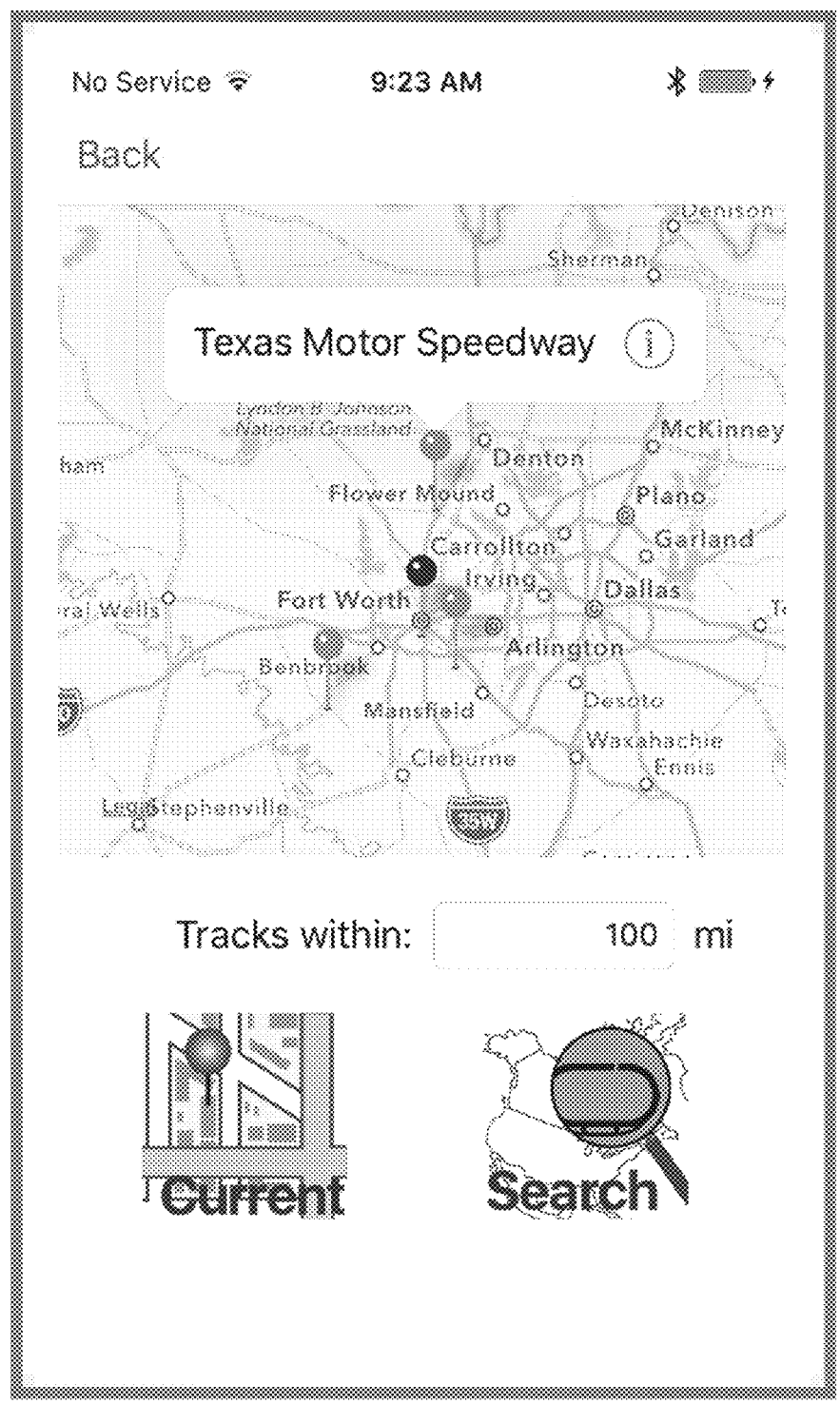
Figure 48:
Figure 49:
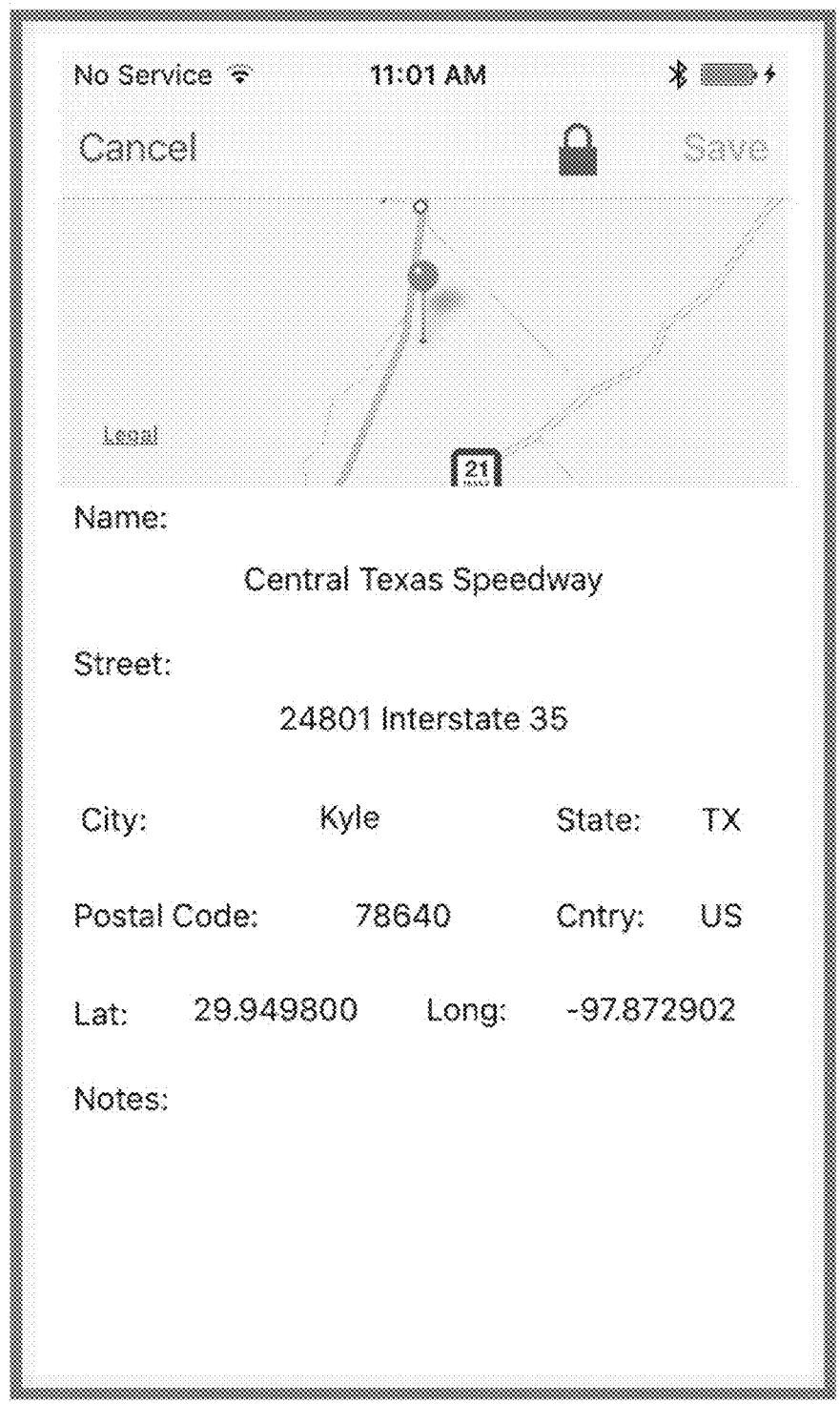
Figure 50:
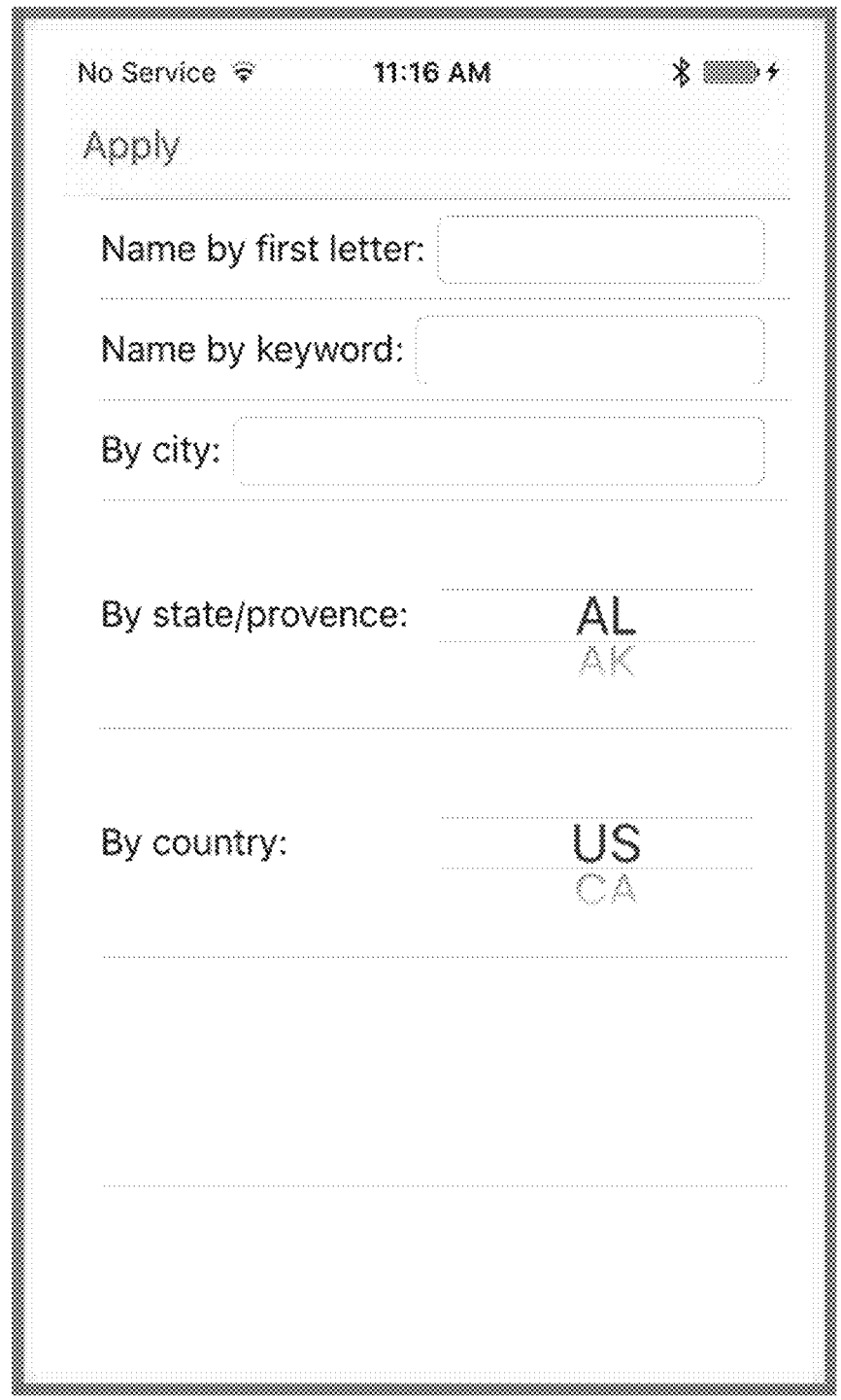
Figure 51:
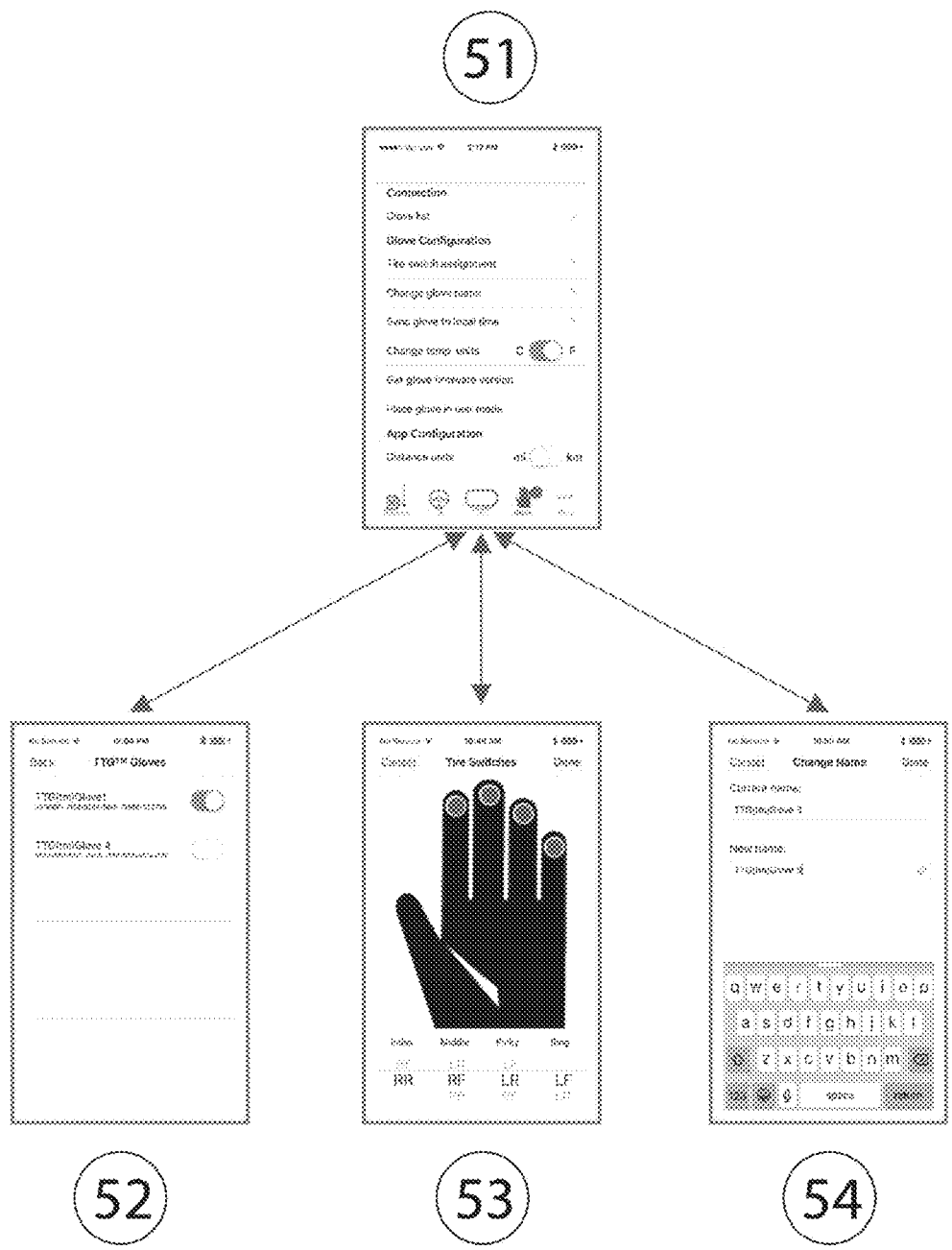
FIG. 51 is an illustration depicting the relationship between several screens in the software program of FIG. 1.
Figure 52:
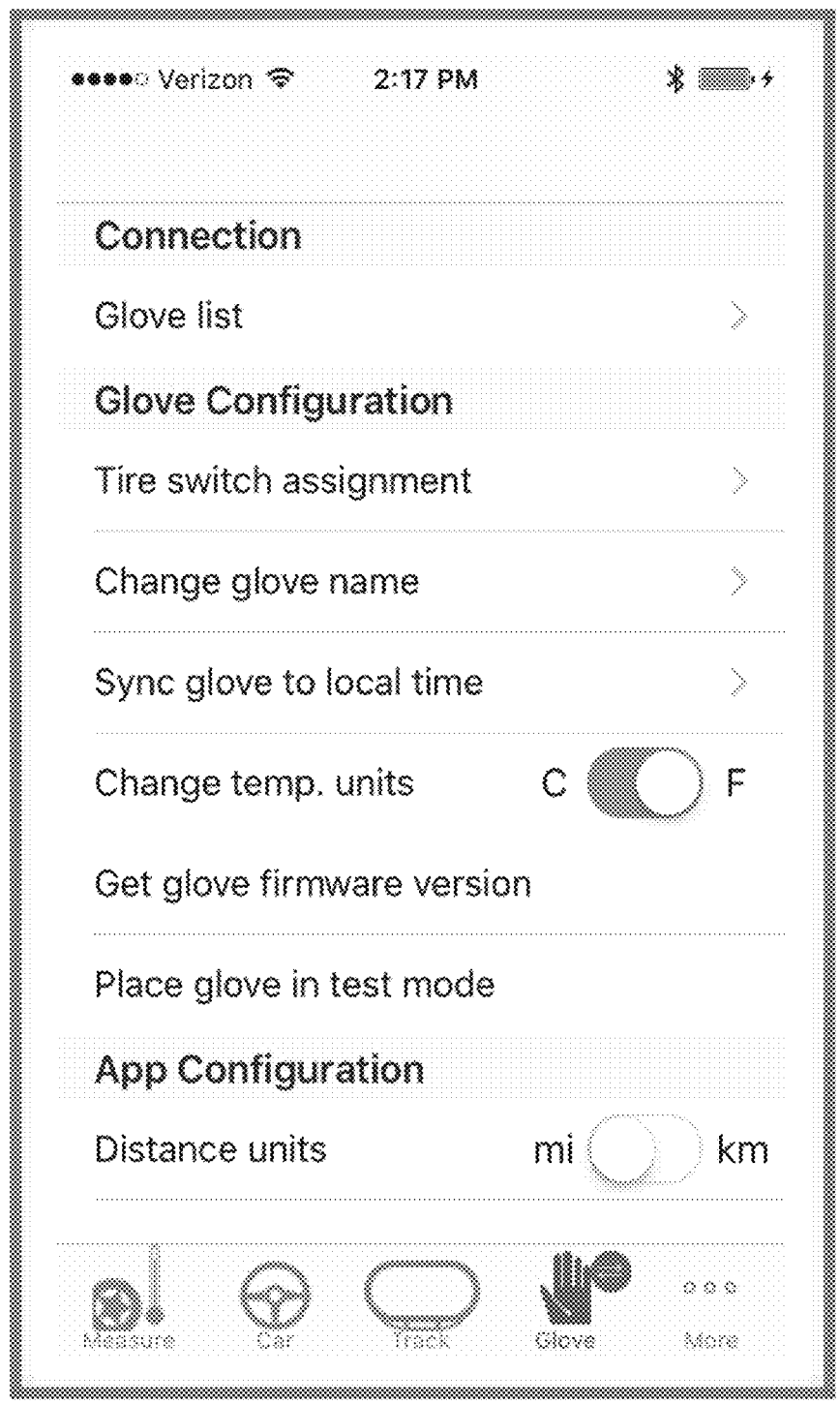
FIGS. 52-55 are enlarged versions of the screen captures depicted in FIG. 51.
Figure 53:
Figure 54:
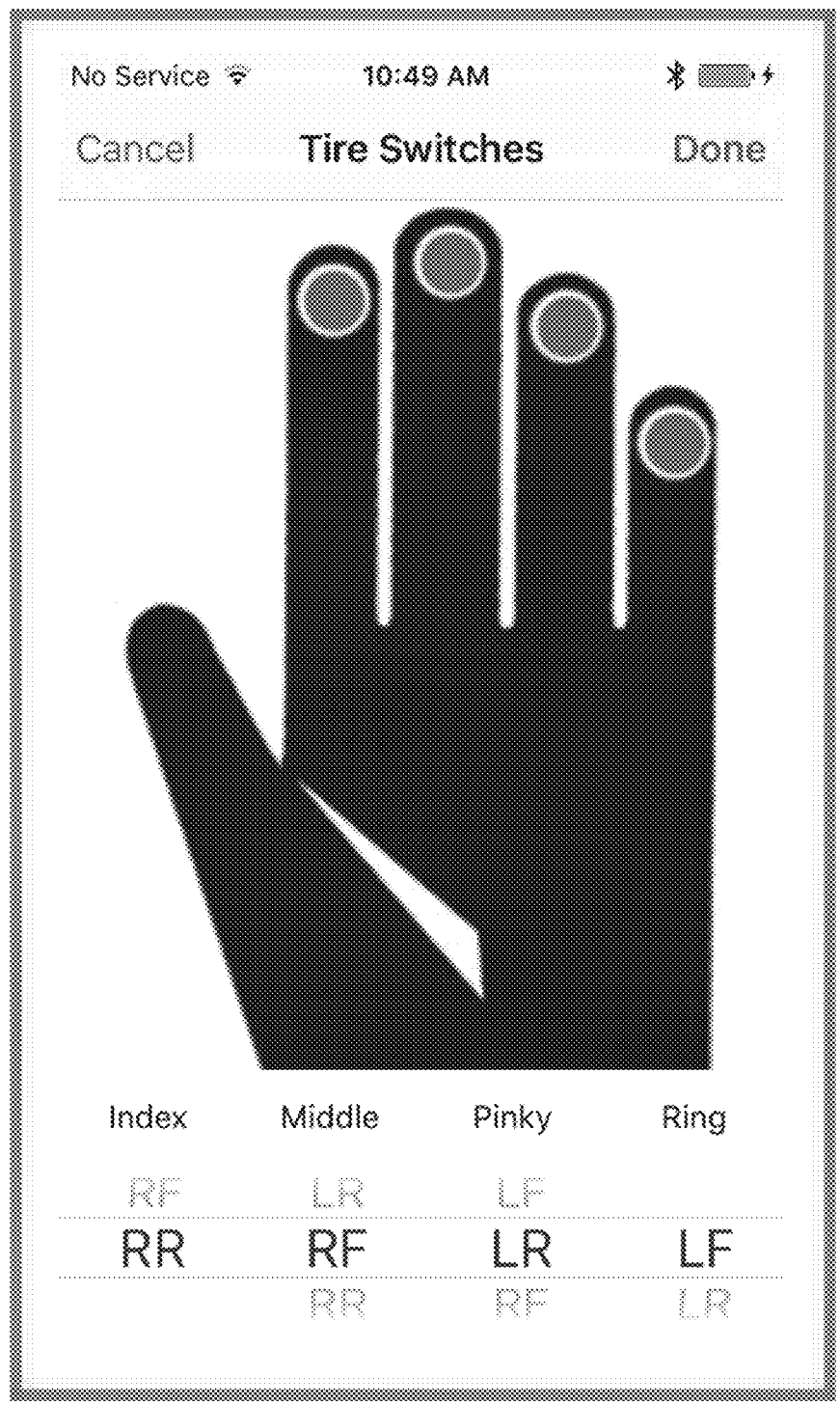
Figure 55:
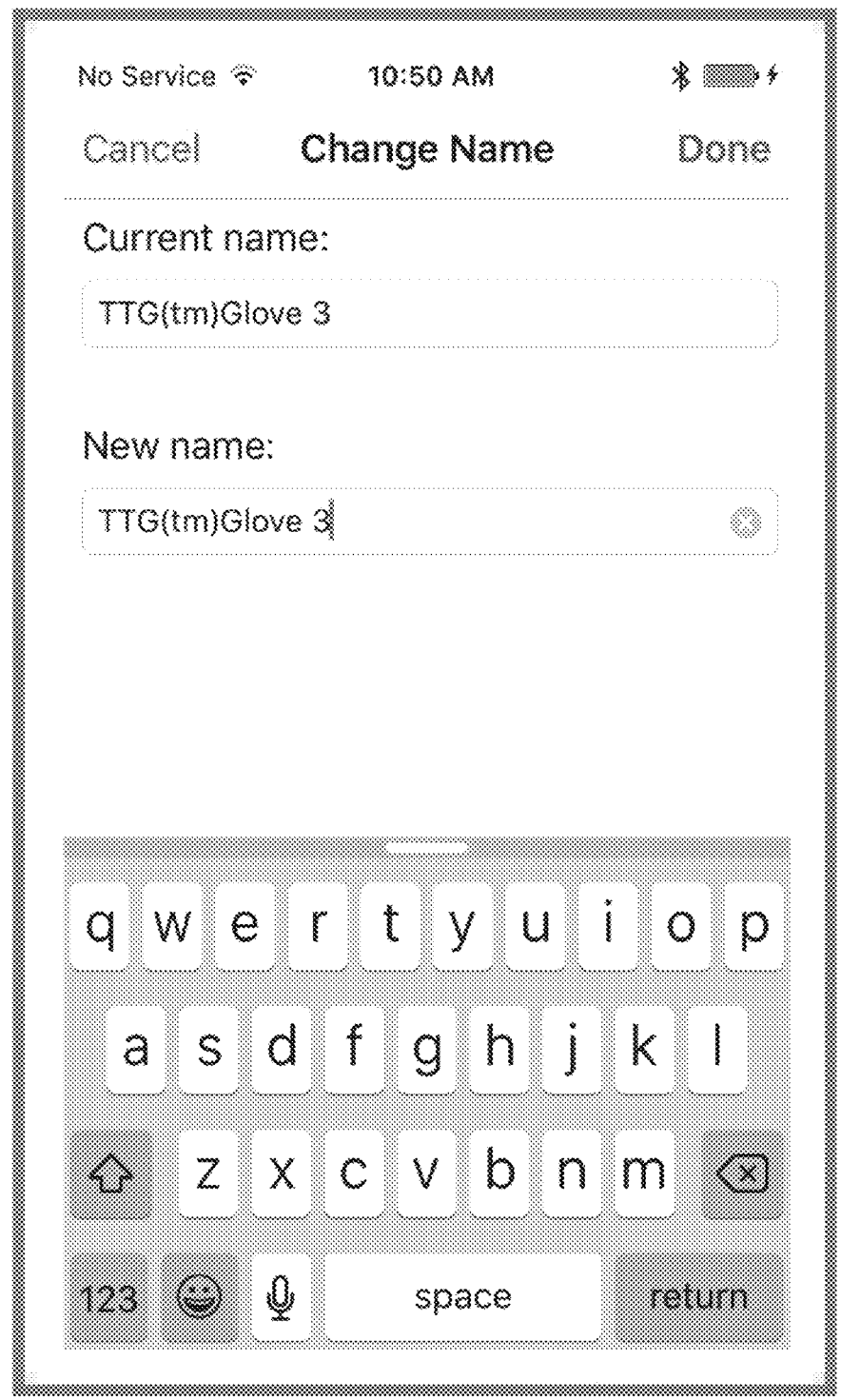
Figure 56:
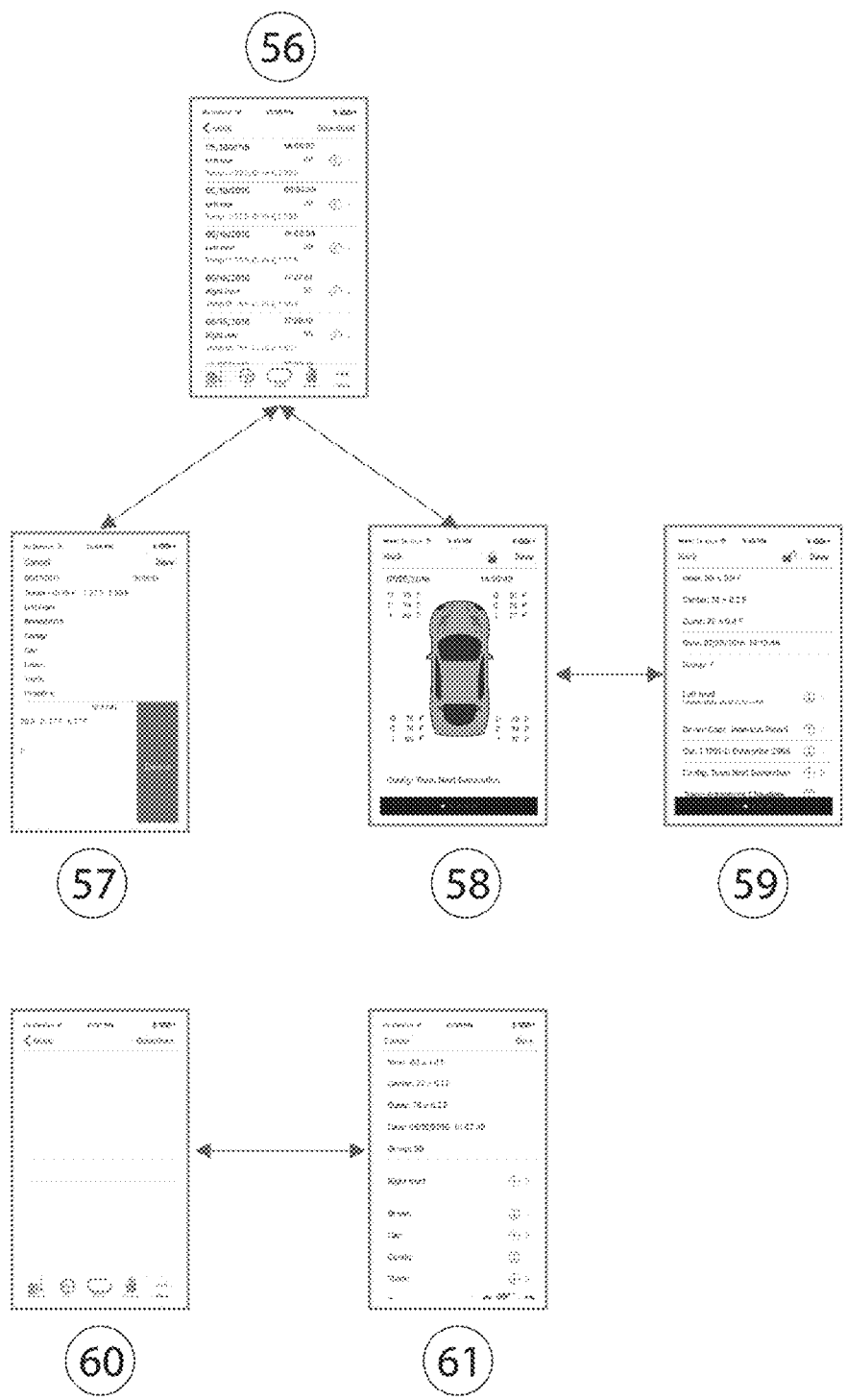
FIG. 56 is an illustration depicting the relationship between several screens in the software program of FIG. 1.
Figure 57:
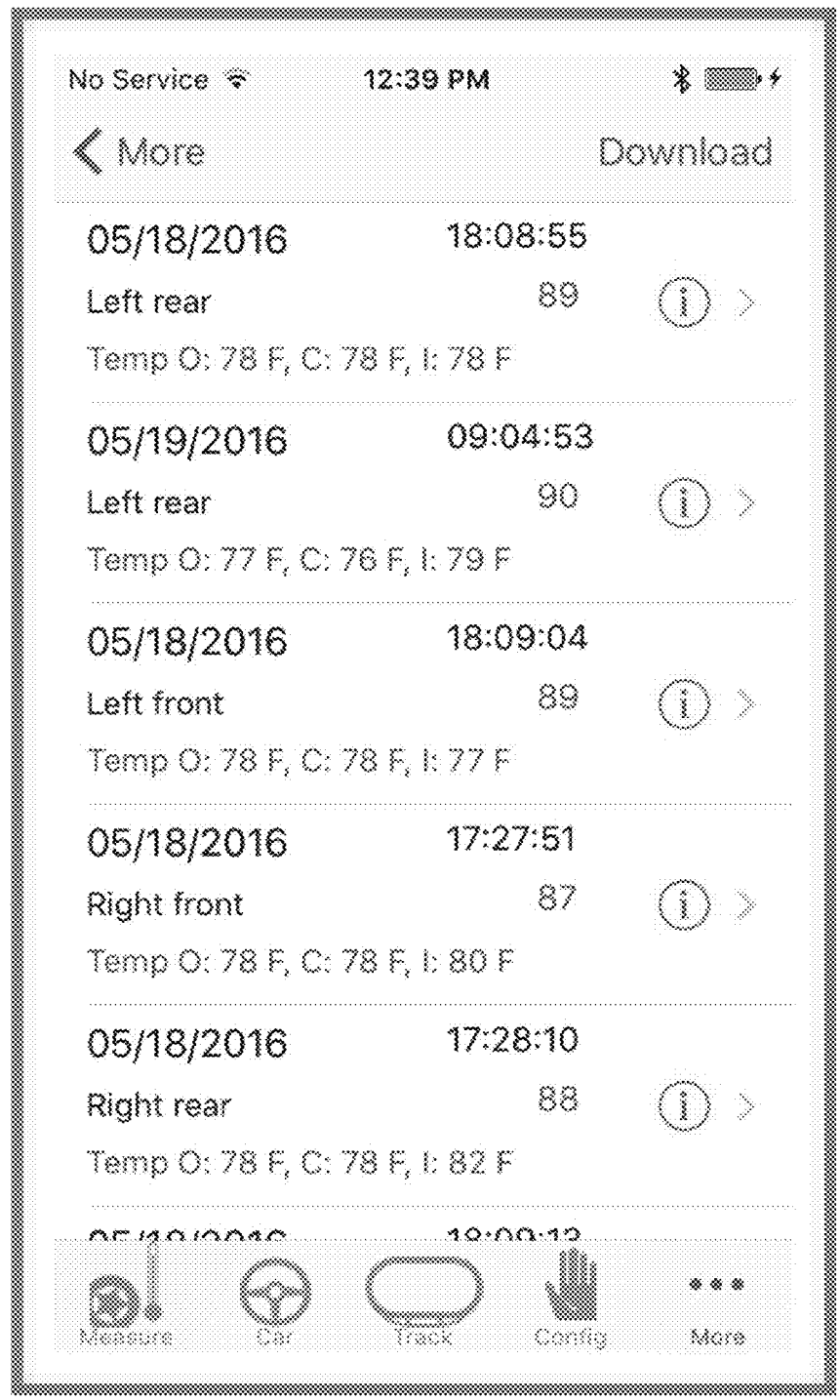
FIGS. 57-62 are enlarged versions of the screen captures depicted in FIG. 38.
Figure 58:
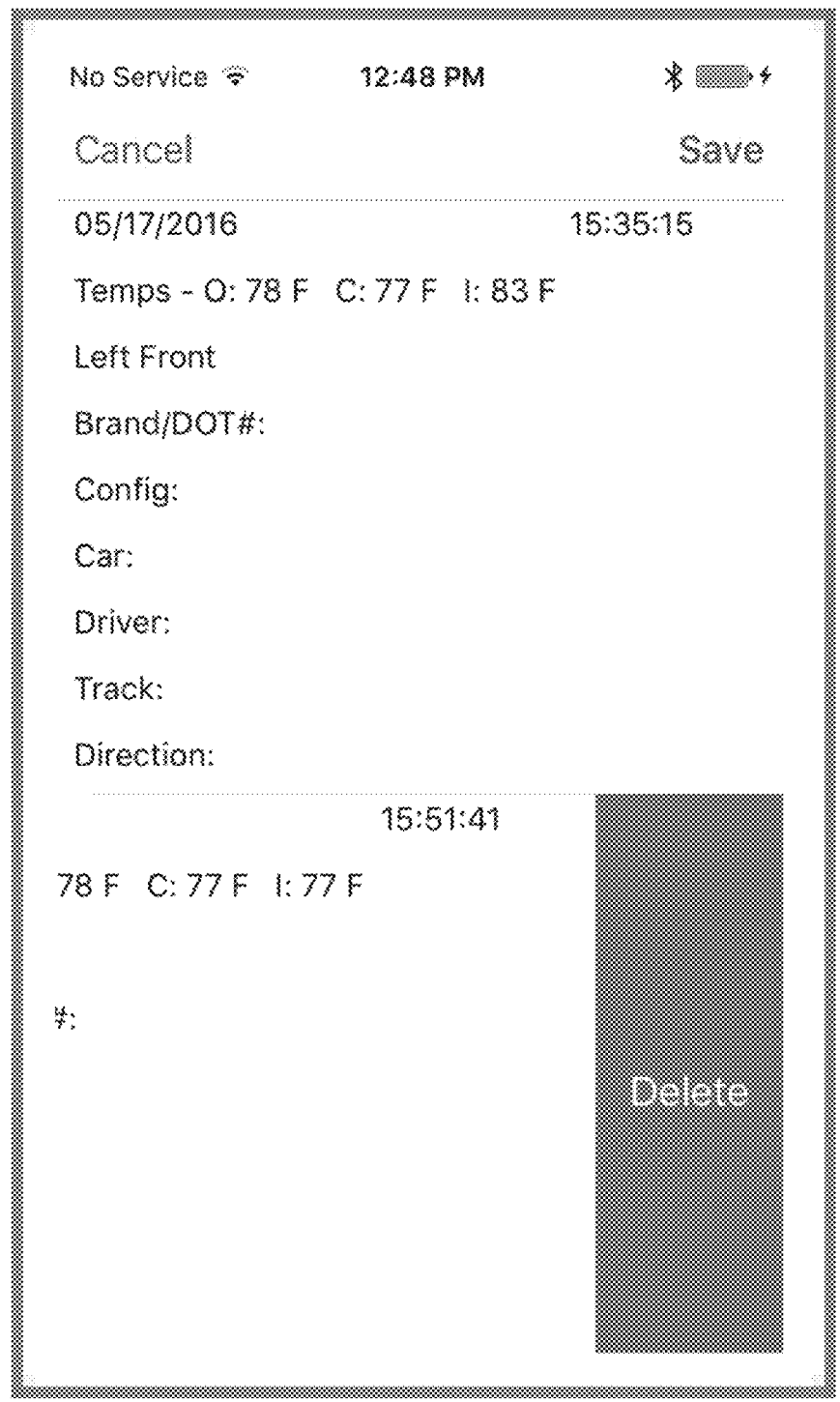
Figure 59:
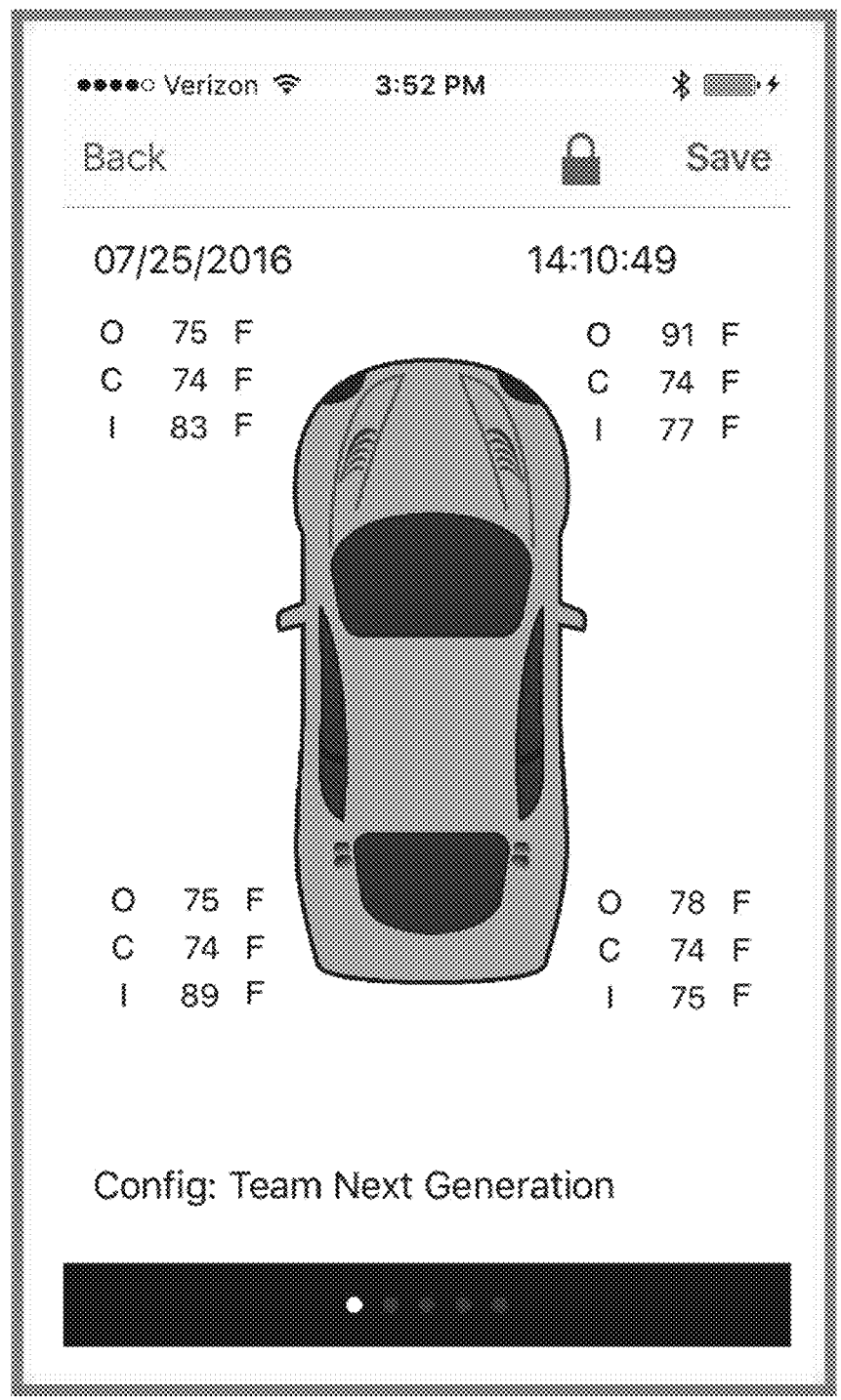
Figure 60:
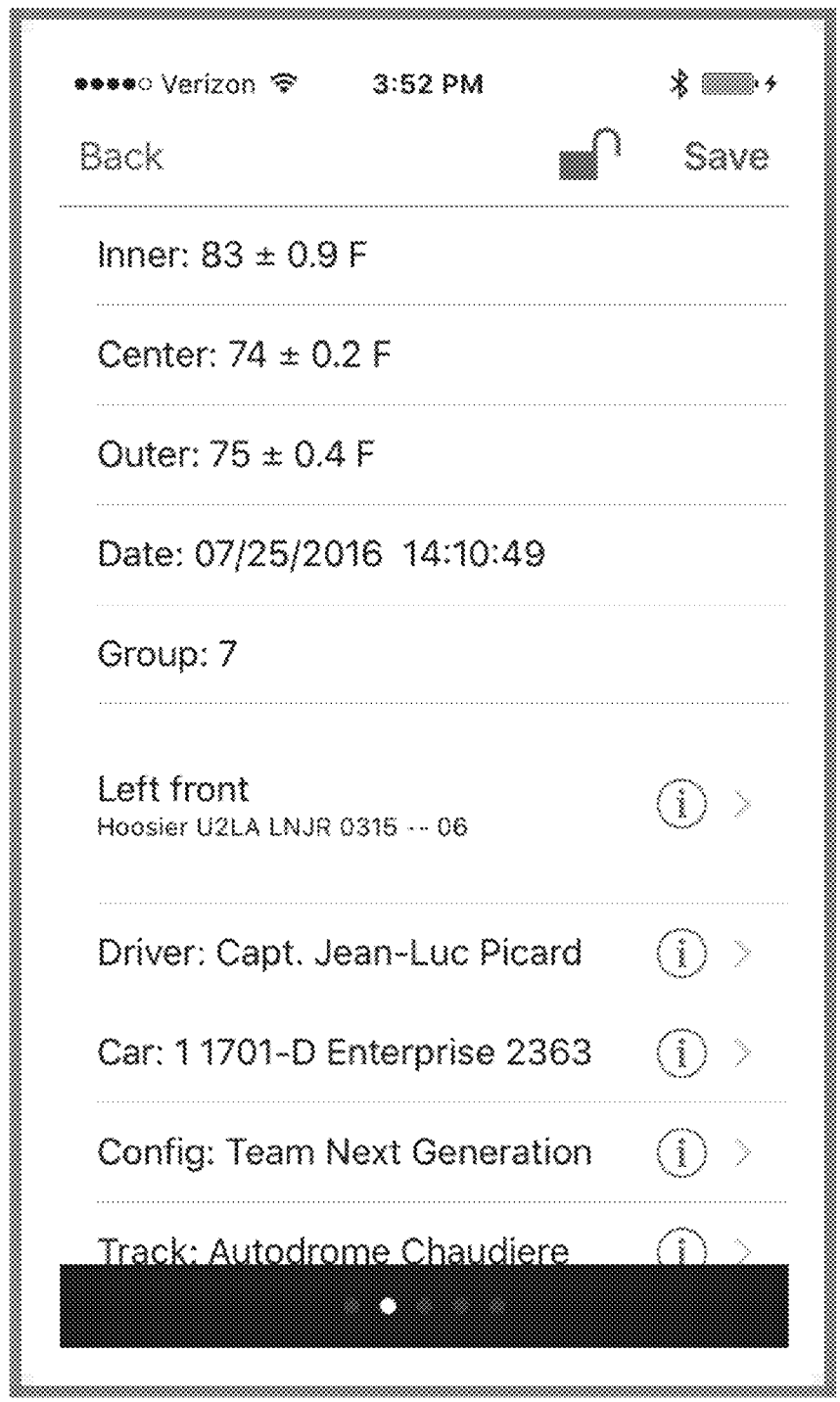
Figure 61:
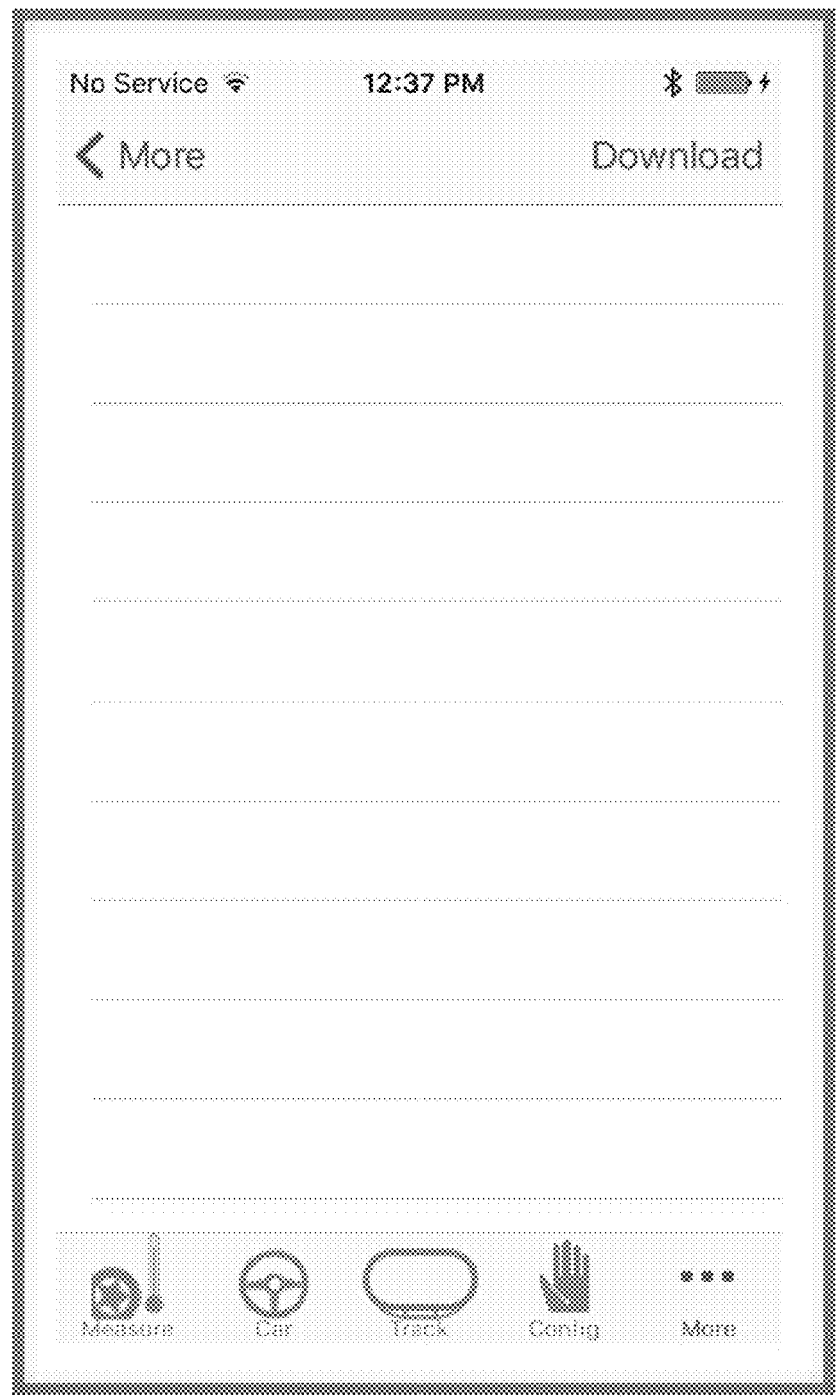
Figure 62:
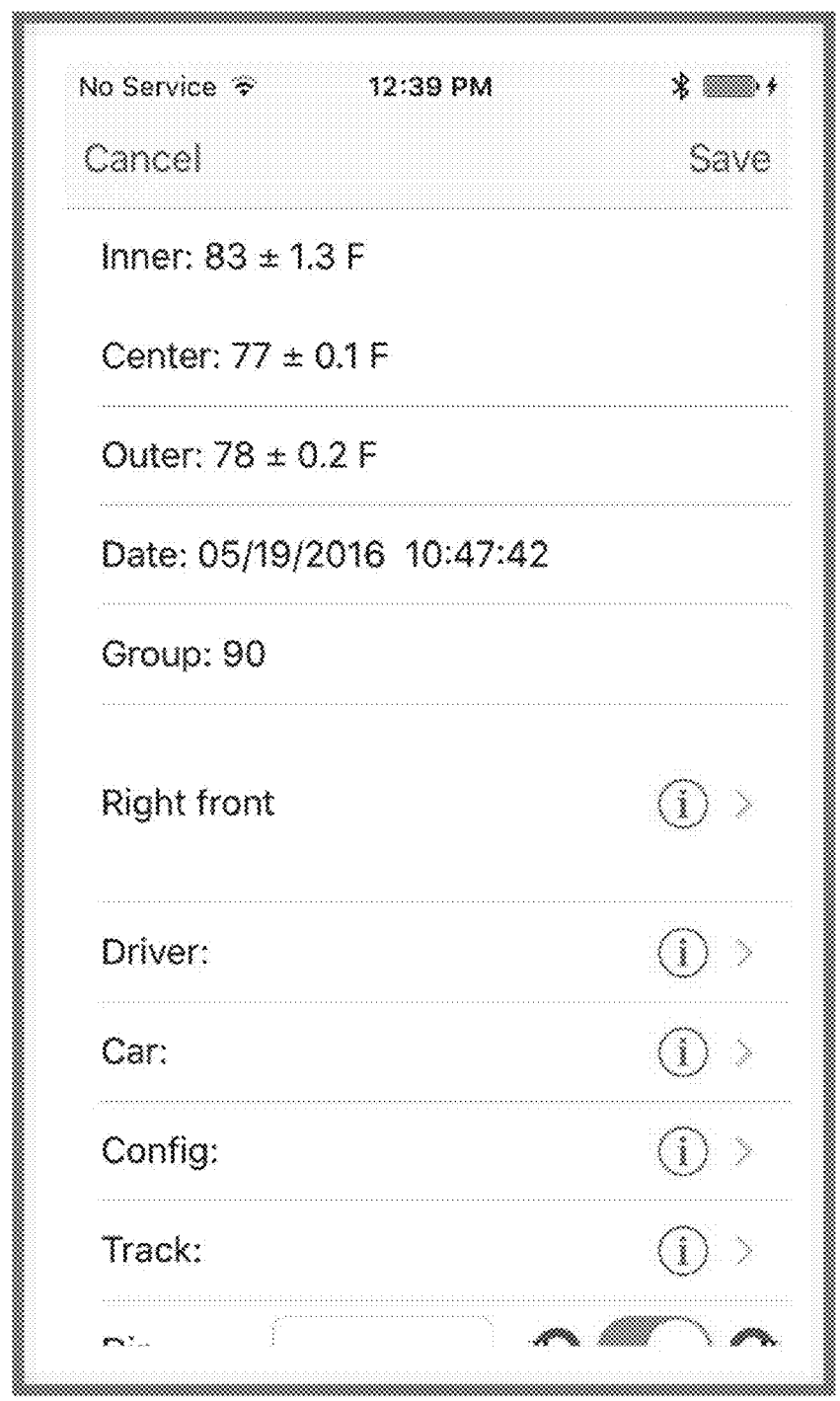
Figure 63:
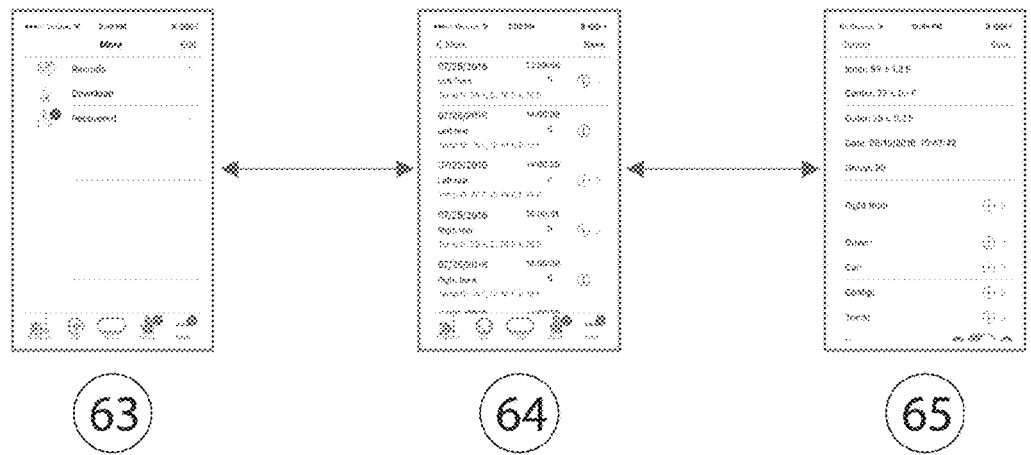
FIG. 63 is an illustration depicting the relationship between several screens in the software program of FIG. 1.
Figure 64:
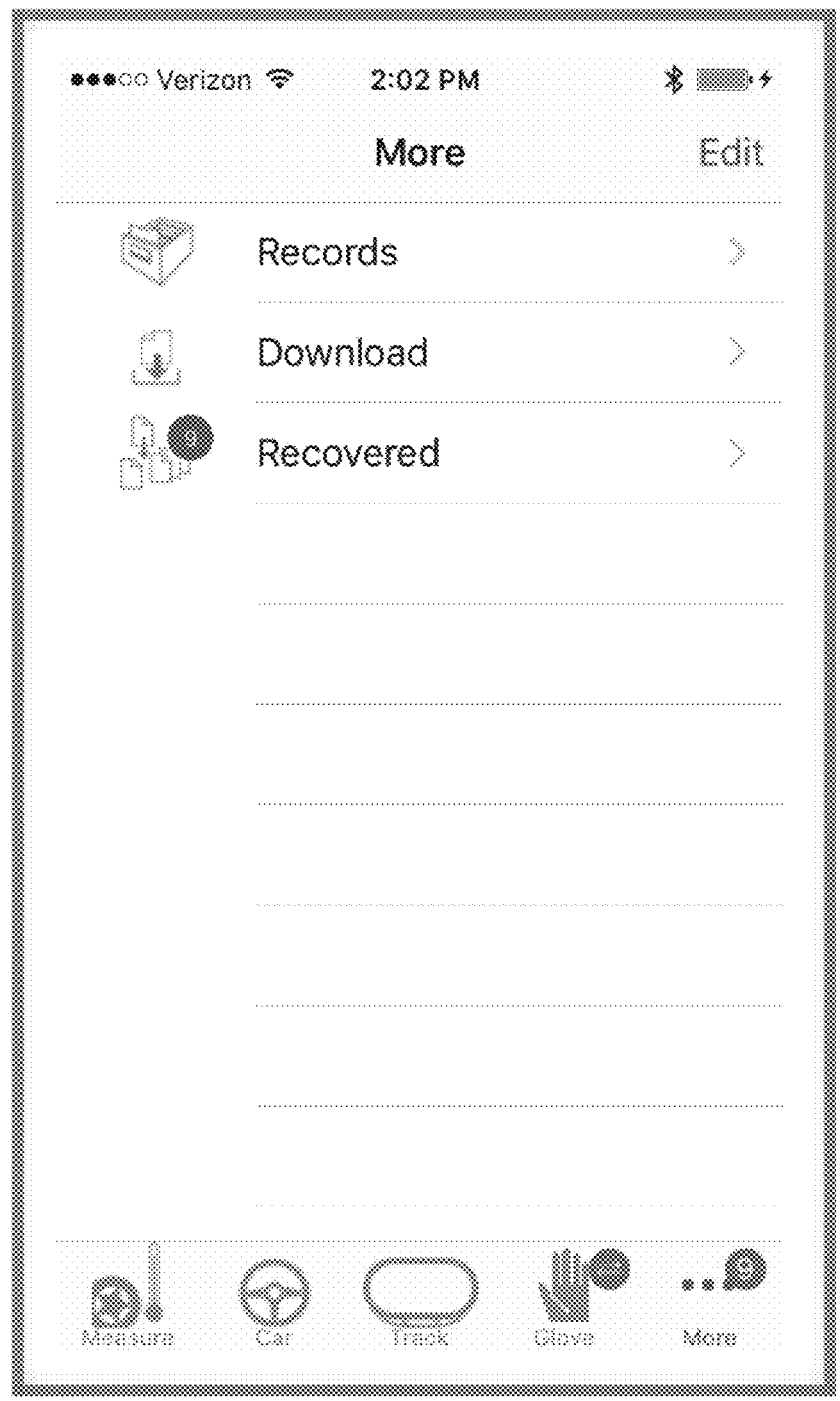
FIGS. 64-66 are enlarged versions of the screen captures depicted in FIG. 38.
Figure 65:
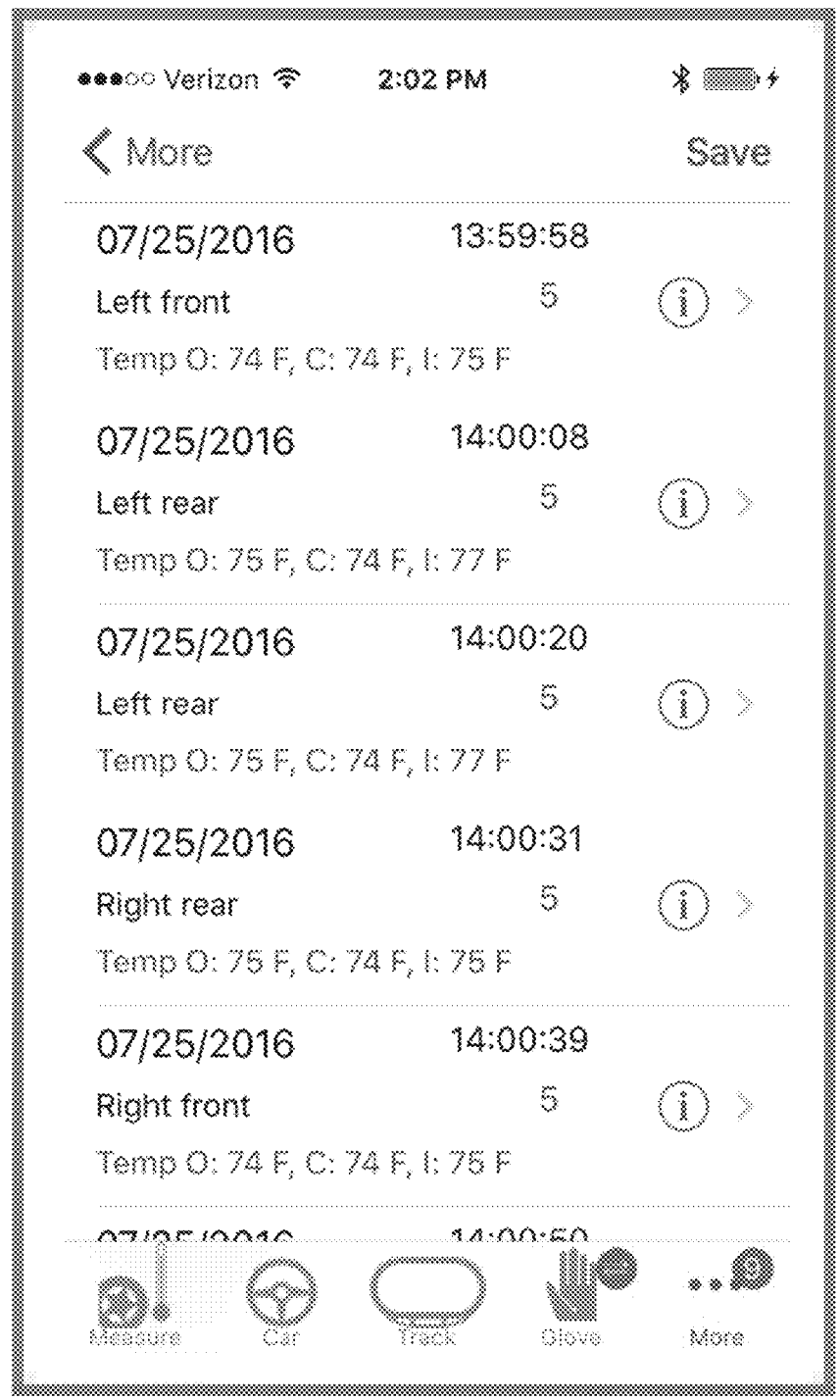

The TTG™ glove is preferably fully booted before opening the TTG™ GloveConnect application. Upon opening the application, the user may be prompted to allow the application to access the Bluetooth® hardware on the host device. If the Bluetooth® hardware has been disabled on the host device, it may be reactivated from Settings, and a dialog box to this effect will be launched to this effect as seen in FIG. 35.

Preferably, the application (or the host device it is running on) will notify the user if loss of wireless communications (e.g., the Bluetooth® Low Energy connection) occurs while the application is running in the background. The user may be asked to authorize the use of notifications for this purpose.

Figure 67:
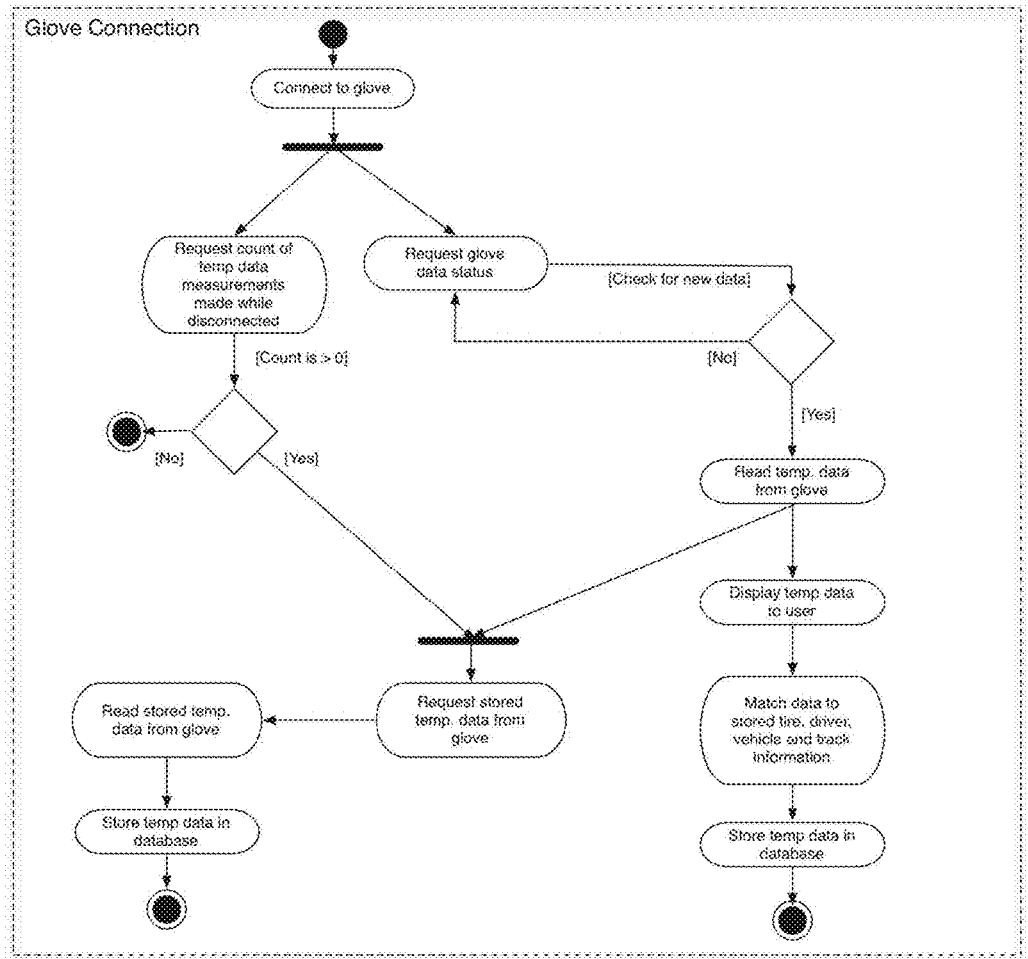
FIG. 67 is a generalized flowchart illustrating a preferred embodiment of the connection loop for the software disclosed herein.

FIG. 67 depicts a particular, non-limiting embodiment of a glove connection algorithm which may be utilized in embodiments of the systems and methodologies disclosed herein. As seen therein, the method 401 commences with the establishment of a communications connection 403 to the glove. A request 405 is made for as count of the temperature data measurements made while the glove was in a disconnected state. If the count is determined 409 to be not greater than 0, the process terminates. If the count is greater than 0, a request is made 423 for stored temperature data from the glove. The stored temperature data is read 421, and stored in a database 425, after which the process terminates.

Upon the establishment of a communications connection 403 to the glove, a request 407 is also made of the glove data status. A loop is entered in which continuous requests for new data 411 are made. If new data is found, the temperature data is read 413 from the glove and displayed 415 to the user. The data is then matched 417 to stored tire, driver, vehicle and track information. The data is then stored 419 in a database, and the process terminates.

Figure 68:
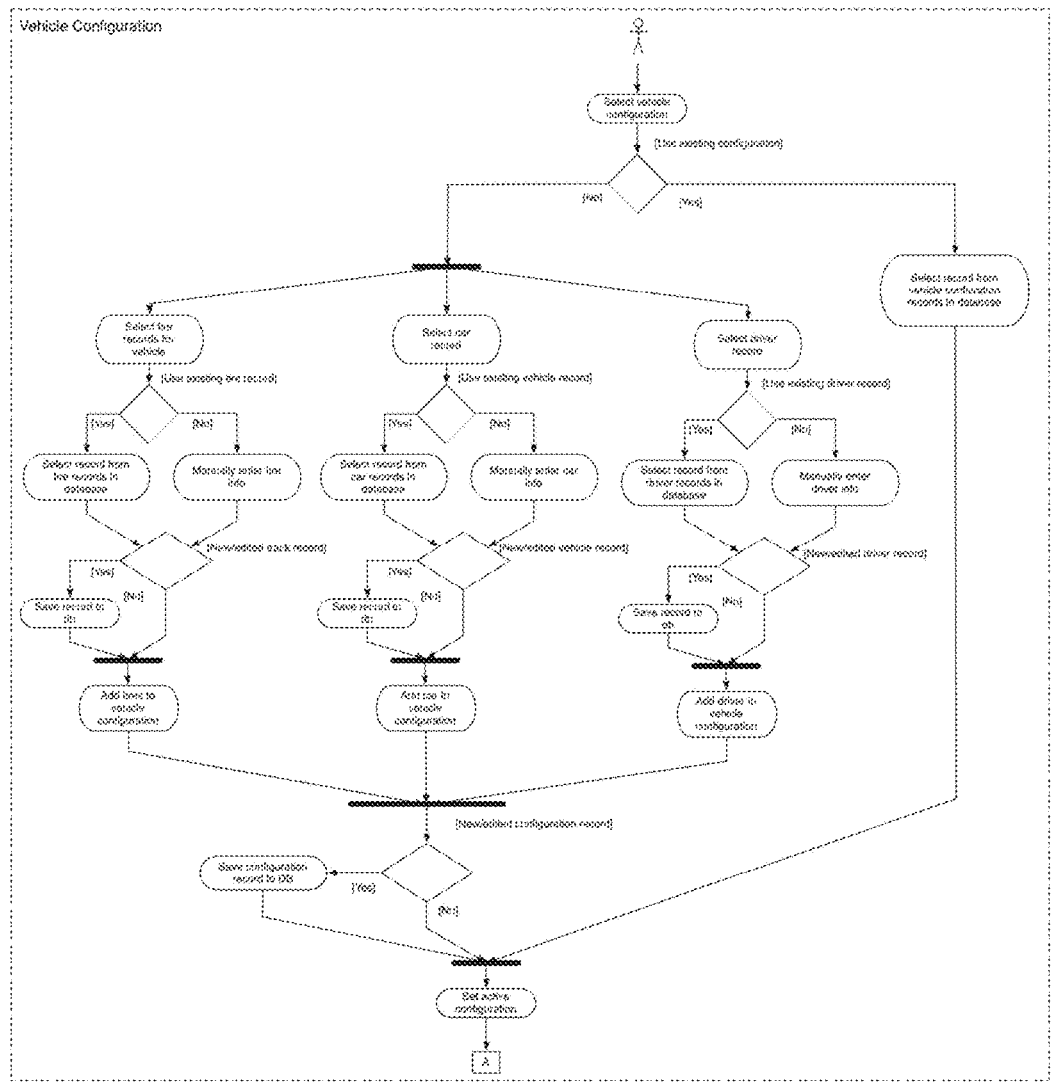
FIG. 68 is a generalized flowchart illustrating a preferred embodiment of a method for configuring a vehicle in accordance with the teachings herein.

FIG. 68 depicts a particular, non-limiting embodiment of a vehicle configuration algorithm which may be utilized in embodiments of the systems and methodologies disclosed herein. As seen therein, the method 501 commences with the selection 503 of a vehicle configuration. A determination is then made 505 as to whether the selected configuration is an existing configuration. If so, the appropriate configuration record is selected 507 from the vehicle configuration records in the database. That configuration is then set 509 as the active configuration, and the process terminates.

If the selected configuration is not an existing configuration, then one or more parallel processes are launched in which the tire records for the vehicle are selected 521, the car record is selected 523, and/or the driver record is selected 525. Each of these parallel processes involves determining 527 whether or not the existing records should be used. If so, the appropriate records are selected 529 from a database. If not, the appropriate information is manually entered 531. The determination is then made 533 as to whether the record is new or edited. If not, the record is added to the vehicle configuration 537. If so, the record is saved to a database 535 before being added to the vehicle configuration 537.

Figure 69:
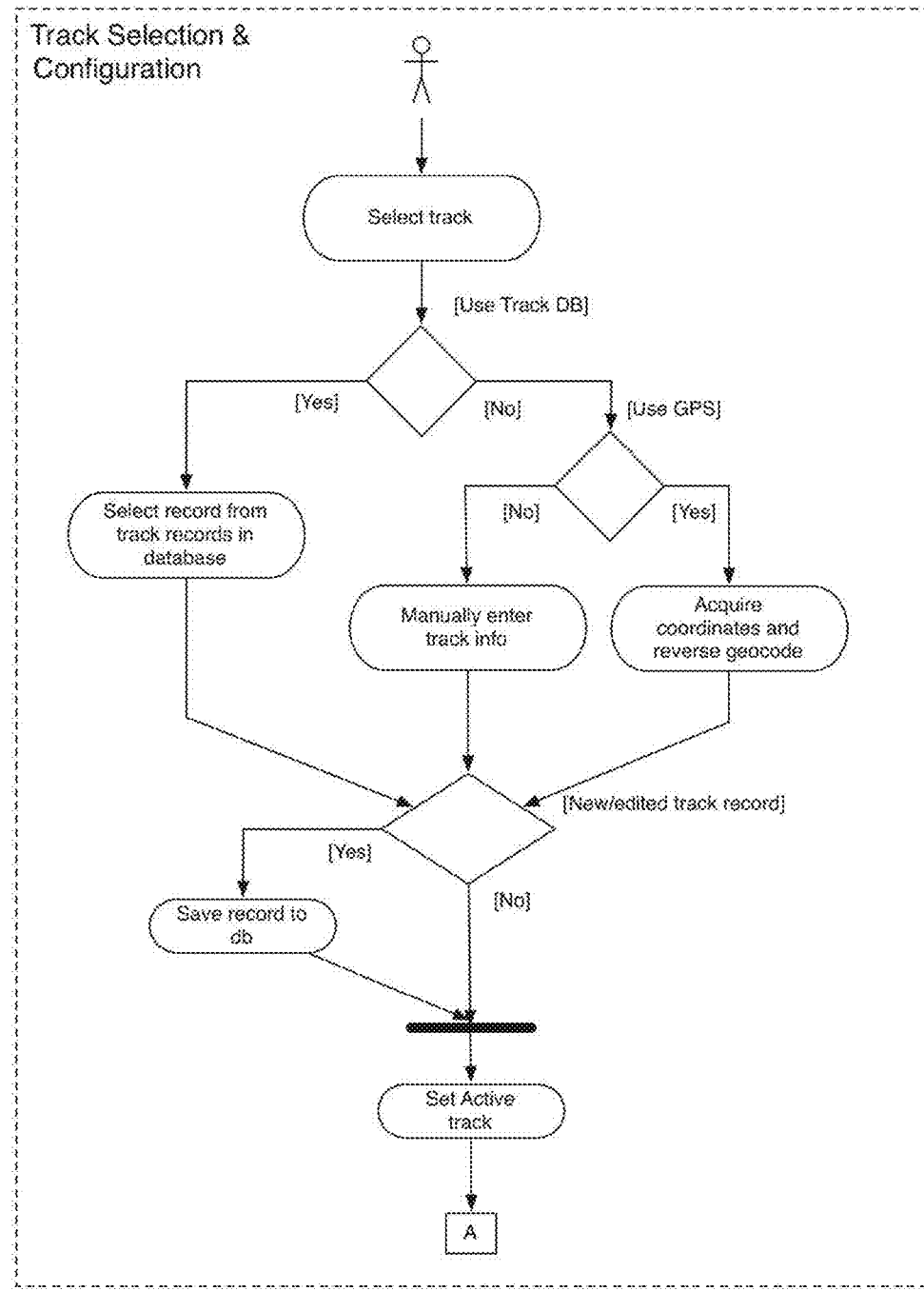
FIG. 69 is a generalized flowchart illustrating a preferred embodiment of a method for selecting and configuring a track record in accordance with the teachings herein.

FIG. 69 depicts a particular, non-limiting embodiment of a track selection and configuration algorithm which may be utilized in embodiments of the systems and methodologies disclosed herein. As seen therein, the method 601 commences with the selection 603 of a track. An election 605 is then made as to whether a track database should be used. If so, a record is selected 607 from the track database. If not, an election is made 615 as to whether GPS coordinates (e.g., of the device running the software) should be used to determine the track. If so, the GPS coordinates are acquired and used to determine the identity of the track via reverse geocoding 619. If not, the track information is manually entered 617 by the user.

A determination is them made as to whether the foregoing portion of the process resulted in a new or edited track record 609. If so, the new record is saved to a database 611, and is set as the active track. If not, the existing track record is set as the active track. The process then terminates, possibly by passing the result to another routine or process.

Figure 70:
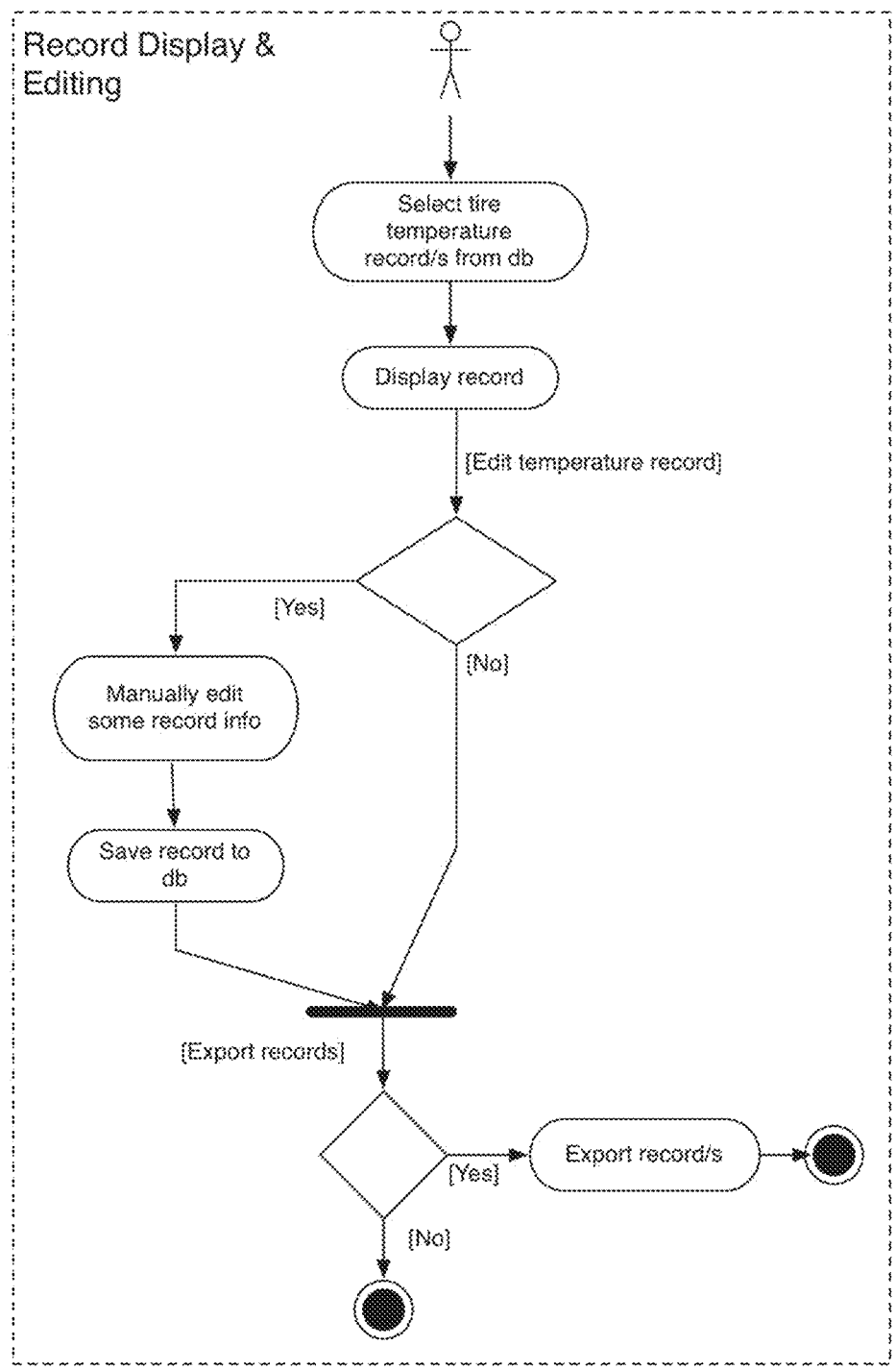
FIG. 70 is a generalized flowchart illustrating a preferred embodiment of a method for the recording and display of tire temperature records in accordance with the teachings herein.

FIG. 70 depicts a particular, non-limiting embodiment of a record display and editing algorithm which may be utilized in embodiments of the systems and methodologies disclosed herein. As seen therein, the method 701 commences with the selection 703 of one or more tire temperature records from a database. The record is displayed 705. A determination is then made 709 as to whether the record has been edited. If the record is not edited, then an election is made 713 as to whether the record should be exported. If so, the record is exported 715. If not, the process terminates.

If the record is edited, the user may manually edit 709 some of the information in the record. The record is then saved 711 to a database, and the determination is made as to whether the record should be exported as described above.

Figure 71:
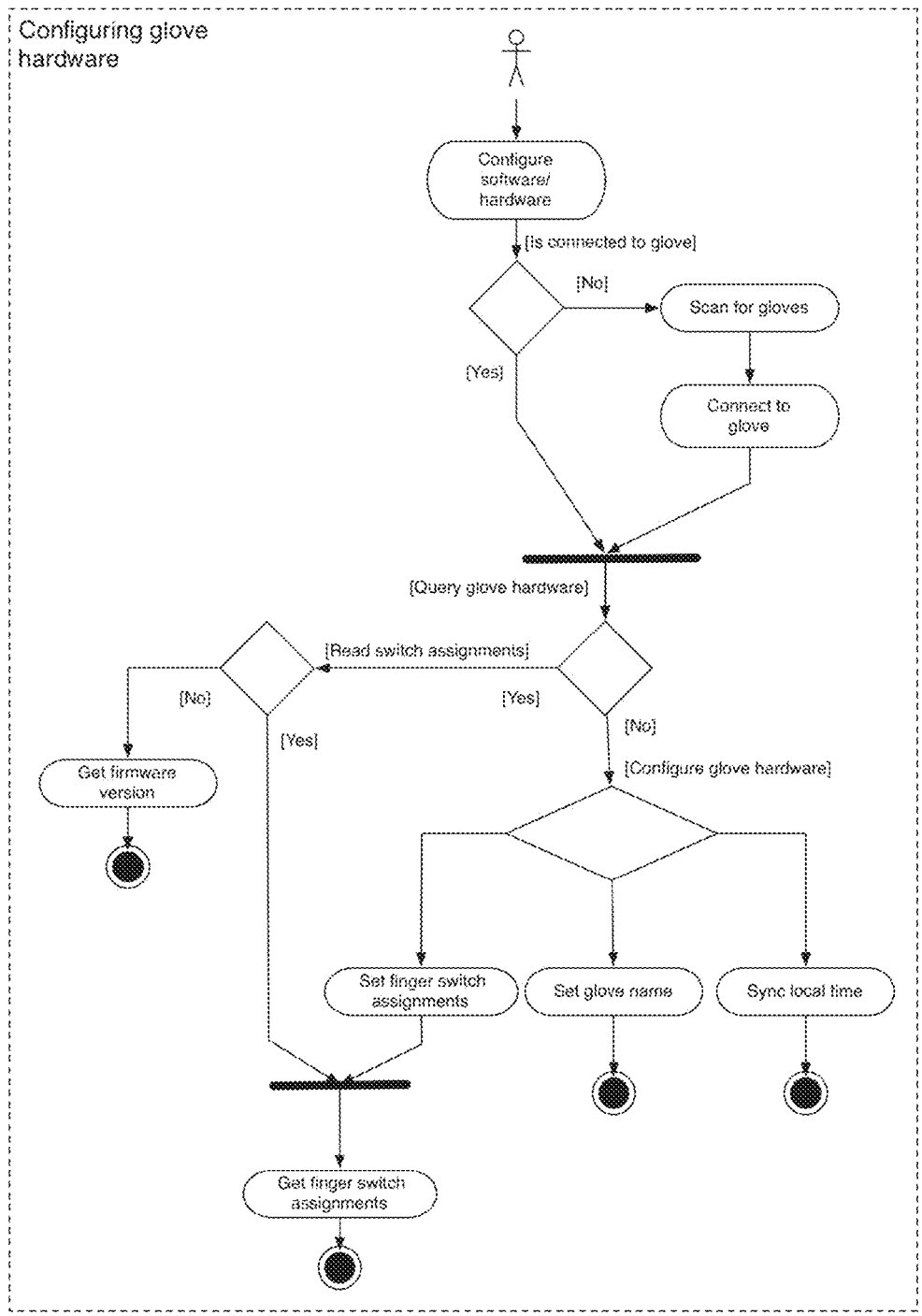
FIG. 71 is a generalized flowchart illustrating a preferred embodiment of a method for configuring temperature-sensing glove hardware in accordance with the teachings herein.

FIG. 71 depicts a particular, non-limiting embodiment of an algorithm for configuring glove hardware which may be utilized in embodiments of the systems and methodologies disclosed herein. As seen therein, the method 801 commences with the election 803 by the user to configure software or hardware. A determination is made 804 as to whether the device is connected to the glove. If so, the process passes to the next step. If not, the device scans 805 for a connection to the glove (or other hardware) and establishes a connection 807 to it.

A determination is then made 809 as to whether the hardware has been configured. If not, the switch assignments are read to determine whether the device has the latest firmware version installed. If not, the latest firmware version is requested 813, and the process terminates. If so, the process passes to the next step.

If it is determined that the hardware has not been configured, then it is configured 815. This may involve setting finger switch assignments 817, or obtaining them 823 if they have already been set. This may also involve setting the name 819 of the device, or syncing the local time 821. The process then terminates.

It will be appreciated from the above description of a preferred embodiment of the software disclosed herein that many of the various windows rendered by the software are arranged in interrelated groups such that these windows may be browsed in certain sequences to accomplish various tasks. Some of these sequences are depicted in FIGS. 38, 43, 51, 56 and 63 (the corresponding windows are depicted in the intervening figures).

Various modifications are possible to the systems, devices and methodologies disclosed herein without departing from the scope of the present disclosure. For example, while these systems, devices and methodologies have been principally illustrated with respect to an embodiment features the use of the software in conjunction with a temperature sensing glove, it is important to note that the software described herein may be used in conjunction with any instrument used to capture tire temperatures. This includes, for example, not only temperature sensing gloves, but also a variety of temperature sensing wands and probes.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A method for measuring the temperature of a tire, comprising:
   providing a temperature measuring instrument which is equipped with a plurality of temperature probes, wherein each of said plurality of temperature probes senses the temperature of a surface it comes into contact with;
   providing a software program installed on a mobile technology platform, wherein said mobile technology platform is equipped with a display and is in wireless communication with said temperature measuring instrument, and wherein said software program operates in conjunction with said mobile technology platform and said temperature measuring instrument to capture temperature readings sensed by said plurality of temperature probes;
   receiving user input from a user of said mobile technology platform, said user input specifying tire parameters for a set of tires on which temperature readings are to be captured, wherein said tire parameters identify (a) a set of tires, (b) a vehicle that the set of tires are to be used in conjunction with, and (c) a track at which the vehicle will be operated when the temperature readings are captured;
   creating a tire temperature measurement record from said user input;
   capturing a plurality of temperature readings from said temperature measuring instrument after said plurality of temperature probes have been placed into contact with the external surface of at least one member of said set of tires;
   adding the captured temperature readings to the tire temperature measurement record such that each captured temperature reading is associated with a tire, from the set of tires, that the captured temperature reading originated from; and
   displaying, on the display of the mobile technology platform, a summary of temperature readings captured for a vehicle.

2. The method of claim 1, wherein said instrument is a glove equipped with a plurality of finger portions, each of which covers a finger of the user, and a palm portion which covers the palm of a user and which is connected to the finger portions, wherein the glove is equipped with a plurality of temperature probes that sense the temperature of a surface they come into contact with, and wherein each of the plurality of finger portions has at least one of said plurality of temperature probes disposed thereon.

3. The method of claim 1, wherein said instrument has a longitudinally extending body, wherein a proximal end of said body has a gripping region adapted to be gripped by the hand of a user, and having a distal end with said plurality of temperature probes disposed thereon.

4. The method of claim 1, wherein each tire in the set of tires has an exterior surface which includes a center section and opposing side walls, and wherein capturing a plurality of temperature readings from said temperature measuring instrument includes capturing temperature readings taken from the center section and sidewalls of each tire from which temperature readings are captured.

5. The method of claim 1, wherein said tire parameters further identify the driver who was operating the vehicle at the time the temperature readings were captured.

6. In combination with a temperature measuring instrument that communicates wirelessly with a mobile technology platform, a software program installed on said a tangible memory device associated with said mobile technology platform which operates in conjunction with said temperature measuring instrument to capture temperature readings sensed by said plurality of temperature probes, said software containing suitable programming instructions which, when executed by at least one computer processor, perform the steps of
   (a) receiving input from a user of said mobile technology platform, said input specifying data for a tire temperature measurement record in which captured temperature readings will be stored, said data including
      (i) vehicle identification data which uniquely identifies a vehicle,
      (ii) a set of tires associated with said vehicle and from which temperature readings will be captured,
      (iii) tire identification data for each member of said set of tires which uniquely identifies that member,
      (iv) a track on which the vehicle will be driven and at which the temperature readings will be captured, and
      (v) a driver identification of a driver who will operate the vehicle on said track,
   (b) creating a tire temperature measurement record from said user input,
   (c) capturing temperature readings from said plurality of temperature probes after said plurality of temperature probes are placed into contact with the external surface of at least one member of said set of tires,
   (d) adding each captured temperature reading to the tire temperature measurement record such that each captured temperature reading is associated with the member from the set of tires from which the reading was captured, and
   (e) in response to user input on said mobile technology platform, displaying an image of a vehicle with a summary of temperature readings captured for that vehicle.

7. The combination of claim 6, wherein said instrument is a glove equipped with a plurality of finger portions, each of which covers a finger of the user, and a palm portion which covers the palm of a user and which is connected to the finger portions, wherein the glove is equipped with a plurality of temperature probes that sense the temperature of a surface they come into contact with, and wherein each of the plurality of finger portions has at least one of said plurality of temperature probes disposed thereon.

8. The combination of claim 6, wherein said instrument has a longitudinally extending body, wherein a proximal end of said body has a gripping region adapted to be gripped by the hand of a user, and having a distal end with said plurality of temperature probes disposed thereon.

* * * * *